US007237080B2

(12) United States Patent
Green et al.

(10) Patent No.: US 7,237,080 B2
(45) Date of Patent: Jun. 26, 2007

(54) PERSISTENT SNAPSHOT MANAGEMENT SYSTEM

(75) Inventors: Robbie A. Green, Apopka, FL (US); Patricio R. Muirragui, Longwood, FL (US); Louis P. Witt, Jr., Orlando, FL (US); Raymond C. Young, Orlando, FL (US); Donald D. Cross, Geneva, FL (US); Kai Zhang, Oviedo, FL (US); Brian M. McFadden, Altamonte Springs, FL (US); Corinne S. Duncan, Longwood, FL (US); Richard M. Tolpin, Orlando, FL (US); Alan L. Welsh, Altamonte Springs, FL (US)

(73) Assignee: Columbia Data Products, Inc., Altamonte Springs, FL (US)

( * ) Notice: Subject to any disclaimer, the term of this patent is extended or adjusted under 35 U.S.C. 154(b) by 0 days.

(21) Appl. No.: 11/322,722

(22) Filed: Dec. 22, 2005

(65) Prior Publication Data

US 2006/0107006 A1 May 18, 2006

Related U.S. Application Data

(63) Continuation of application No. 10/248,483, filed on Jan. 22, 2003, now abandoned.
(60) Provisional application No. 60/350,434, filed on Jan. 22, 2002.

(51) Int. Cl.
*G06F 12/06* (2006.01)
*G06F 13/00* (2006.01)
(52) U.S. Cl. .................. 711/162; 711/113; 711/154; 711/161
(58) Field of Classification Search ............ 711/100, 711/154, 159, 161, 162, 200, 113
See application file for complete search history.

(56) References Cited

U.S. PATENT DOCUMENTS 5,151,990 A   9/1992  Allen et al.

(Continued)

FOREIGN PATENT DOCUMENTS

WO    WO2004/059509 A1    7/2004

OTHER PUBLICATIONS

Kristian Torp, "Implementation Aspects of Temporal Databases," http://www.cs.auc.dk/ndb/phd_projects/torp.html (copyrighted 1998-2000).

(Continued)

*Primary Examiner*—Tuan V. Thai
(74) *Attorney, Agent, or Firm*—Parsons Hsue & de Runtz LLP

(57) ABSTRACT

A persistent snapshot is taken and maintained in accordance with a novel method and system for extended periods of time using only a portion of a computer readable medium of which the snapshot is taken. Multiple snapshots can be taken in succession at periodic intervals and maintained practically indefinitely. The snapshots are maintained even after powering down and rebooting of the computer system. The state of the object of the snapshot for each snapshot preferably is accessible via a folder on volume of the snapshot. A restore of a file or folder may be accomplished by merely copy that file or folder from the snapshot folder to a current directory of the volume. Alternatively, the entire computer system may be restored to a previous snapshot state thereof. Snapshots that occurred after the state to which the computer is restored are not lost in the restore operation. Different rule sets and scenarios can be applied to each snapshot. Furthermore, each snapshot can be written to within the context of the snapshot and later restored to its pristine condition. Software for implementing the systems and methods of snapshots in accordance with the present invention may comprise firmware of a hard disk drive controller or a disk controller board or within the HDD casing itself. The present invention further comprises novel systems and methods in which the systems and methods of taking and maintaining snapshots are utilized in creating and managing temporal data stores, including temporal database management systems. The implications for data mining and exploration, data analysis, intelligence gathering, and artificial intelligence (just to name a few areas) are profound.

12 Claims, 48 Drawing Sheets

U.S. PATENT DOCUMENTS

| | | | |
|---|---|---|---|
| 5,418,916 A | | 5/1995 | Hall et al. |
| 5,559,984 A | | 9/1996 | Nakano et al. |
| 5,644,751 A | | 7/1997 | Burnett |
| 5,649,152 A | | 7/1997 | Ohran et al. |
| 5,675,782 A | | 10/1997 | Montague et al. |
| 5,963,959 A | * | 10/1999 | Sun et al. ............... 707/200 |
| 6,041,394 A | | 3/2000 | Halligan et al. |
| 6,289,335 B1 | * | 9/2001 | Downing et al. ............ 707/3 |
| 6,473,775 B1 | | 10/2002 | Kusters et al. |
| 6,629,203 B1 | * | 9/2003 | Humlicek ............... 711/114 |
| 6,763,411 B1 | | 7/2004 | Witt, Jr. |
| 6,763,412 B1 | | 7/2004 | Witt, Jr. |
| 6,813,312 B2 | | 11/2004 | Tullberg et al. |
| 6,862,638 B2 | | 3/2005 | Witt, Jr. |
| 6,865,629 B2 | | 3/2005 | Witt, Jr. |
| 6,868,465 B2 | | 3/2005 | Witt, Jr. |
| 6,879,981 B2 | | 4/2005 | Rothschild et al. |
| 6,981,114 B1 | * | 12/2005 | Wu et al. ............... 711/162 |
| 2002/0064113 A1 | | 5/2002 | Geeslin |
| 2002/0103804 A1 | | 8/2002 | Rothschild et al. |
| 2002/0133537 A1 | | 9/2002 | Lau et al. |
| 2002/0133747 A1 | | 9/2002 | Ravid |
| 2003/0023822 A1 | | 1/2003 | Scott et al. |
| 2003/0115408 A1 | | 6/2003 | Milillo et al. |
| 2003/0182253 A1 | * | 9/2003 | Chen et al. ............... 707/1 |
| 2003/0182527 A1 | | 9/2003 | Witt, Jr. et al. |
| 2003/0220929 A1 | | 11/2003 | Tolpin et al. |
| 2003/0220948 A1 | | 11/2003 | Green et al. |
| 2003/0220949 A1 | | 11/2003 | Witt, Jr. et al. |
| 2004/0117646 A1 | | 6/2004 | Witt, Jr. |

OTHER PUBLICATIONS

Dr. Barry Devlin, "Managing Time in the Data Warehouse," INFODB, vol. 11, No. 1 (Feb. 1996).

John Bair, "It's About Time! Supporting Temporal Data in a Warehouse," vol. 10, No. 1 (Feb. 1996).

IBM Total Storage Network Attached Storage 200 Models 201 and 226 User's Reference Release 2, Nov. 2001.

* cited by examiner

Intentionally Omitted

Fig. 33

PERSISTENT SNAPSHOT MANAGEMENT SYSTEM

CROSS-REFERENCE TO RELATED APPLICATIONS

This application is a continuation of application Ser. No. 10/248,483, filed Jan. 22, 2003, now abandoned which application is incorporated herein in its entirety by this reference. This application also claims the benefit under 35 U.S.C. § 119(e) to the filing date of U.S. provisional patent application No. 60/350,434, titled, "Persistent Snapshot Management System," filed Jan. 22, 2002, which is incorporated herein by reference.

APPENDIX DATA

Program Source Code Code.txt Code.txt includes 83598 lines of code representing an implementation of a preferred embodiment of the present invention. The programming language is C++ and is intended to run on the Windows 2000 operating system. This program source code is incorporated herein by reference as part of the disclosure.

BACKGROUND OF INVENTION

Data of a computer system generally is archived on a periodic basis, such as at the end of each day; at the end of each week; at the end of each month; and/or at the end of each year. Data may also be archived before or after certain events or actions. When archived, the data is logically consistent, i.e., all of the data subjected to the archiving process at any point in time is maintained in the state as it existed at that particular point in time.

The archived data provides a means for restoring a computer system to a previous, known state, which may be necessary when performing disaster recovery such as occurs when data in a primary storage system is lost or corrupted. Data may be lost or corrupted if the primary storage system, such as a hard disk drive or other mass storage system, is physically damaged, if the operating system of the primary storage system crashes, or if files of the primary storage system are infected by a computer virus. By archiving the data on a periodic basis, the computer system always can be restored to its state as it existed at the most recent backup time, thereby minimizing any permanent data loss should disaster recovery actually be performed. The restoration may be of one or more files of the computer system or of the entire computer system itself.

There are numerous types of methods for archiving data. One type includes the copying of the data subject to the archive to a backup storage system. Typically, the backup storage system includes backup medium comprising magnetic computer tapes or optical disks used to store backup copies of large amounts of data, as is often associated with computer systems. Furthermore, each backup tape or optical disk can be maintained in storage indefinitely by sending it offsite. In order to minimize costs, such tapes and disks also can be reused on a rolling basis if such backup medium is rewriteable, or destroyed if not rewriteable and physical storage space for the backups is limited. In this later scenario, the "first in-first out" methodology is utilized in which the tape or disk having the oldest recording date is destroyed first.

One disadvantage to archiving data by making backups is that the data subject to the archiving process is copied in totality onto the backup medium. Thus, if 250 gigabytes of data is to be archived, then 250 gigabytes of storage capacity is required. If a terabyte of data is to be backed up, then a terabyte of storage capacity is required. Another related disadvantage is that as the amount of data to be archived increases, the period of time required to perform the backup increases as well. Indeed, it may take weeks to archive onto tape a terabyte of data. Likewise, it may take weeks if it becomes necessary to restore such amount of data.

Yet another disadvantage is that sometimes an "incremental" backup is made, wherein only the new data that has been written since the last backup is actually copied to the backup medium. This is in contrast to the "complete" backup of the data, wherein all the data subject to the archiving process is copied whether or not it is new. Restoring archived data from complete and incremental backups requires copying from a complete backup and then copying from the incremental backups thereafter made between the time point of the complete backup until the time point of the restoration. A fourth and obvious disadvantage is that when the backup medium in the archiving process is stored offline, the archived data must be physically retrieved and mounted for access and, thus, is not readily available on demand.

In view of the foregoing, it will be apparent that it is extremely inefficient to utilize backups for restoring data when, for example, only a particular user file or some other limited subset of the backup is required. To address this concern, a snapshot can be taken of data whereby an image of the data at the particular snapshot moment can later be accessed. The object of the snapshot for which the image is provided may be of a file, a group of files, a volume or logical partition, or an entire storage system. The snapshot may also be of a computer-readable medium, or portion thereof, and the snapshot may be implemented at the file level or at the storage system block level. In either case, the data of the snapshot is maintained for later access by (1) saving snapshot data before replacement thereof by new data in a "copy-on-write operation," and (2) keeping track of all the snapshot data, including the snapshot data still residing in the original location at the snapshot moment as well as the snapshot data that has been saved elsewhere in the copy-on-write operation. Typically, the snapshot data that is saved in the copy-on-write operation is stored in a specially allocated area on the same storage medium as the object of the snapshot. This area typically is a finite storage data of fixed capacity.

The use of snapshots has advantages over the archiving process because a backup medium separate and apart from a primary storage medium is not required, and the snapshot data is stored online and, thus, readily accessible. A snapshot also only requires storage capacity equal to that amount of data that is subjected to the copy-on-write operation; thus, all of the snapshot data need not be saved to a specifically allocated data storage area if all of the snapshot data is not to be replaced. The taking of a snapshot also is near instantaneous.

Advantageously, a snapshot may also be utilized in creating a backup copy of a primary storage medium onto a backup medium, such as a tape. As disclosed, for example, in Ohran U.S. Pat. No. 5,649,152, a snapshot can be taken of a base "volume" (a/k/a a "logical drive"), and then a tape backup can be made by reading from and copying the snapshot onto tape. During this archive process, reads and writes to the base volume can continue without waiting for completion of the archive process because the snapshot itself is a non-changing image of the data of the base volume as it existed at the snapshot moment. The snapshot in this instance thus provides a means by which data can continue to be read from and written to the primary storage medium while the backup process concurrently runs. Once the backup is created, the snapshot is released and the resources that were used for taking and maintaining the snapshot are made available for other uses by the computer system.

A disadvantage to utilizing snapshots is that a snapshot is not a physical duplication of the data of the object of the snapshot onto a backup medium. A snapshot is not a backup. Furthermore, if the storage medium on which the original object of the snapshot resides is physically damaged, then both the object and the snapshot can be lost. A snapshot, therefore, does not provide protection against physical damage of the storage medium itself.

A snapshot also requires significant storage capacity if it is to be maintained over an extended period of time, since snapshot data is saved before being replaced and, over the course of an extended period of time, much of the snapshot data may need saving. The storage capacity required to maintain the snapshot also dramatically increases as multiple snapshots are taken and maintained. Each snapshot may require the saving of overlapping snapshot data, which accelerates consumption of the storage capacity allocated for snapshot data. In an extreme case, each snapshot ultimately will require a storage capacity equal to the amount of data of its respective object. This is problematic as the storage capacity of any particular storage medium is finite and, generally, the finite data storage will not have sufficient capacity to accommodate this, leading to failure of the snapshot system.

Accordingly, snapshots generally are used solely for transient applications, wherein, after the intended purpose for which the snapshot is taken has been achieved, the snapshot is released and system resources freed, perhaps for the provision of a subsequent snapshot. Furthermore, because snapshots are only needed for temporary purposes, the means for tracking the snapshot data is usually stored in RAM memory of a computer and is lost upon the powering down or loss of power of the computer, and, consequently, the snapshot is lost. In contrast thereto, backups are used for permanent data archiving.

Accordingly, a need exists for an improved system and method that, but for protection against physical damage to the storage medium itself, provides the combined benefits of both snapshots and backups without the time and storage capacity constraints associated with snapshots and backups. One or more embodiments of the present invention meet this and other needs, as will become apparent from the detailed description thereof below and consideration of the computer source code incorporated herein by reference and disclosed in the incorporated provisional U.S. patent application.

BRIEF DESCRIPTION OF DRAWINGS

Further features and benefits of the present invention will be apparent from a detailed description of preferred embodiments thereof taken in conjunction with the following drawings, wherein similar elements are referred to with similar reference numbers, and wherein.

DETAILED DESCRIPTION

As a preliminary matter, it will readily be understood by those persons skilled in the art that the present invention is susceptible of broad utility and application in view of the following detailed description of preferred embodiments of the present invention. Many devices, methods, embodiments, and adaptations of the present invention other than those herein described, as well as many variations, modifications, and equivalent arrangements thereof, will be apparent from or reasonably suggested by the present invention and the following detailed description thereof, without departing from the substance or scope of the present invention. Accordingly, while the present invention is described herein in detail in relation to preferred embodiments, it is to be understood that this disclosure is illustrative and exemplary and is made merely for purposes of providing a full and enabling disclosure of preferred embodiments of the invention. The disclosure herein is not intended nor is to be construed to limit the present invention or otherwise to exclude any such other embodiments, adaptations, variations, modifications and equivalent arrangements, the present invention being limited only by the claims appended hereto or presented in any continuing application, and the equivalents thereof.

Exemplary Operating Environment

Figure 1:
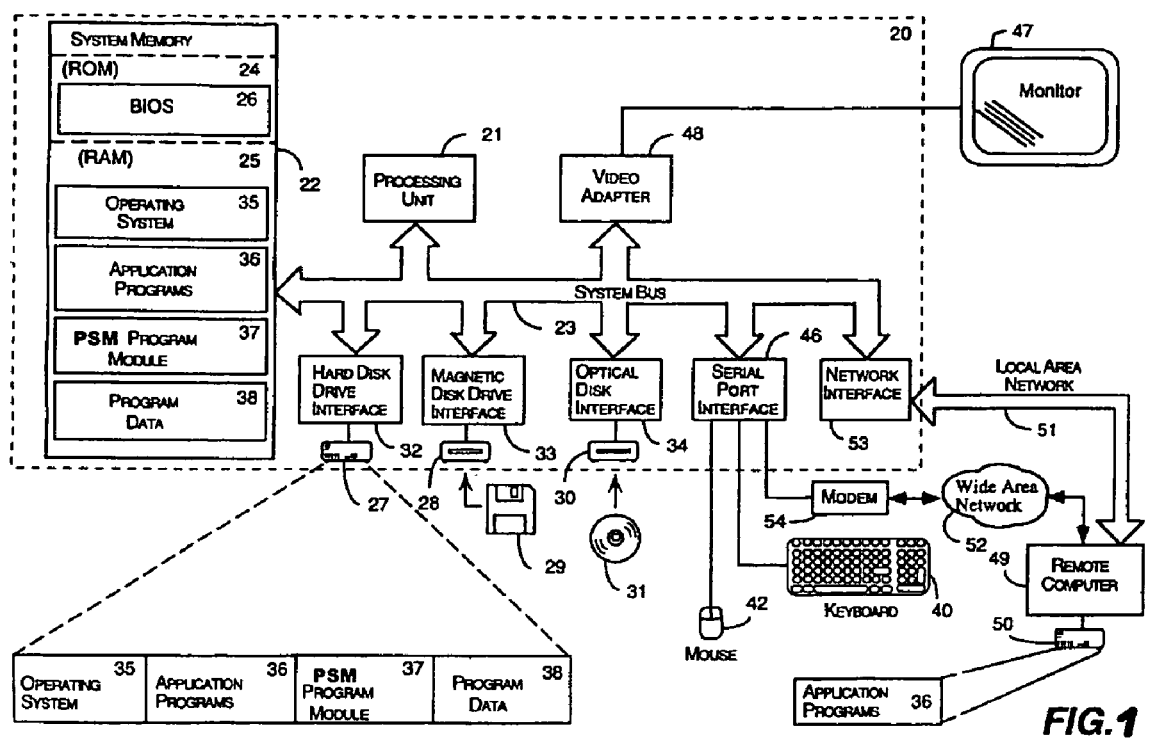
FIG. 1 is an overview of an exemplary operating environment for use with preferred embodiments of the present invention.

FIG. 1 and the following discussion are intended to provide a brief, general description of a suitable computing environment in which the present invention may be implemented. While the invention will be described in the general context of an application program that runs on an operating system in conjunction with a server or personal computer, those skilled in the art will recognize that the invention also may be implemented in combination with other program modules. Generally, program modules include routines, programs, components, data structures, and the like that perform particular tasks or implement particular abstract data types. Moreover, those skilled in the art will appreciate that the invention may be practiced with other computer system configurations, including hand held devices, multiprocessor systems, microprocessor based or programmable consumer electronics, minicomputers, mainframe computers, and the like. The present invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal or server computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the computer 20, such as during startup, is stored in ROM 24. The computer 20 further includes a hard disk drive 27, a magnetic disk drive 28, e.g., to read from or write to a removable disk 29, and an optical disk drive 30, e.g., for reading a CDR disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide nonvolatile storage for the computer 20. Although the description of computer readable media above refers to a hard disk, a removable magnetic disk, and a CDR disk, it should be appreciated by those skilled in the art that other types of media which are readable by a computer, such as magnetic cassettes, flash memory cards, digital video disks (DVDs), Bernoulli cartridges, and the like, may also be used in the exemplary operating environment.

A number of program modules may be stored in the drives and RAM 25, including an operating system 35, one or more application programs 36, the Persistent Storage Manager (PSM) module 37, and program data 38. A user may enter commands and information into the computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a game port or a universal serial bus (USB). A monitor 47 or other type of display device is also connected to the system bus 23 via an interface, such as a video adapter 48. In addition to the monitor 47, computers typically include other peripheral output devices (not shown), such as speakers or printers.

The computer 20 may operate in a networked environment using logical connections to one or more remote computers, such as a remote computer 49. The remote computer 49 may be a server, a router, a peer device, or other common network node, and typically includes many or all of the elements described relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the computer 20 is connected to the LAN 51 through a network interface 53. When used in a WAN networking environment, the computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communication's link between the computers may be used.

Exemplary Snapshot System

Figure 2:
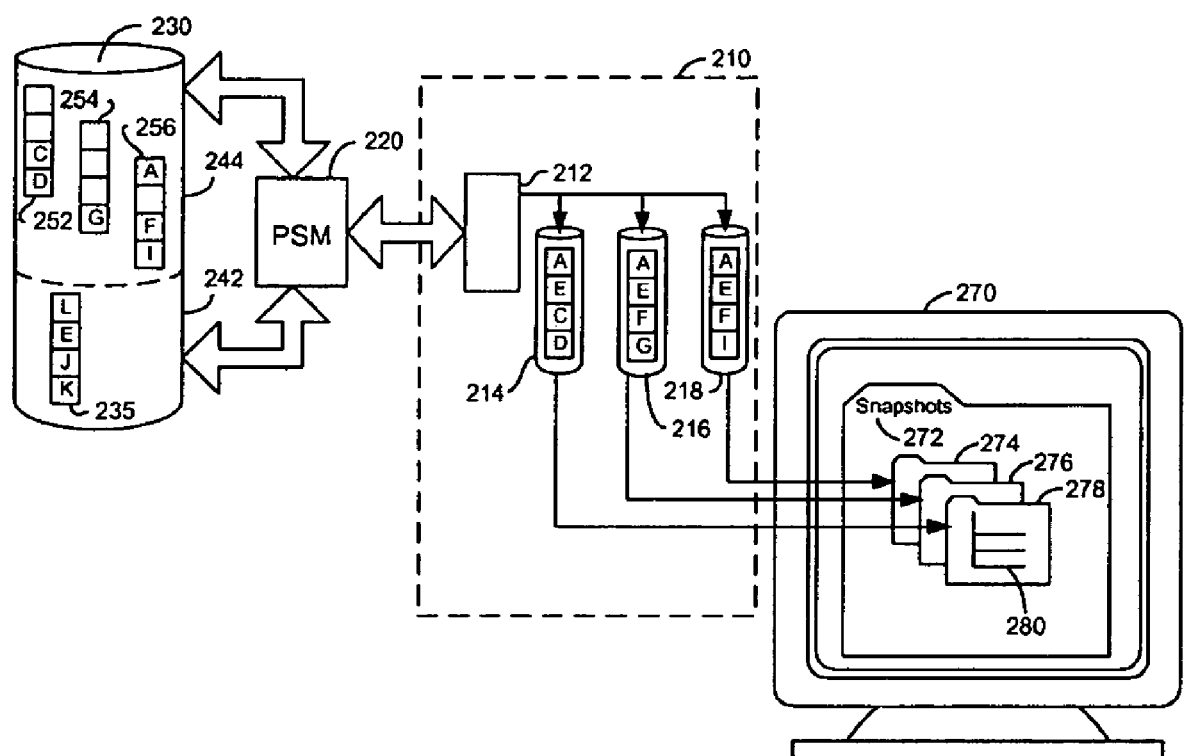
FIG. 2 is an overview of a preferred system of the present invention.

Turning now to FIG. 2, an exemplary snapshot system 200 of the present invention is illustrated. The purpose of a snapshot system 200 is to maintain the saved "current state" of memory of a computer system (or some portion thereof) including the contents of all memory bytes, hardware registers and status indicators. Typically, a snapshot is periodically "taken" so that a computer system can be restored in the event of failure. At the file level, snapshots enable previous versions of files to be brought back for review or to be placed back into use should that become necessary. As will be seen herein, the snapshot system of the present invention provides the above capabilities, and much more.

Such system 200 includes components of a computer system, such as an operating system 210. The system 200 also includes a persistent storage manager (PSM) module 220, which performs methods and processes of the present invention, as will be explained hereinafter. The system 200 also includes at least one finite data storage medium 230, such as a hard drive or hard disk. The storage medium 230 comprises two dedicated portions, namely, a primary volume 242 and a cache 244. The primary volume 242 contains active user and system data 235. The cache 244 contains a plurality of snapshot caches 252, 254, 256 generated by the PSM module 220.

The operating system 210 includes system drivers 212 and a plurality of mounts 214, 216, 218. The system 200 also includes a user interface 270, such as a monitor or display. The user interface 270 displays snapshot data 272 in a manner that is meaningful to the user, such as by means of conventional folders 274, 276, 278. Each folder 274, 276, 278 is generated from a respective mount 214, 216, 218 by the operating system 210. Each respective folder preferably displays snapshot information in a folder and file tree format 280, as generated by the PSM module 220. Specifically, as will be discussed in greater detail herein, the PSM module 220 in conjunction with the operating system 210 is able to display current and historical snapshot information by accessing both active user and system data 235 and snapshot caches 252, 254, 256 maintained on the finite data storage medium 230.

Methods and further processes for taking, maintaining, managing, manipulating, and displaying snapshot data according to the present invention will be described in greater detail hereinafter.

Exemplary Disk Level Operations

Figure 3:
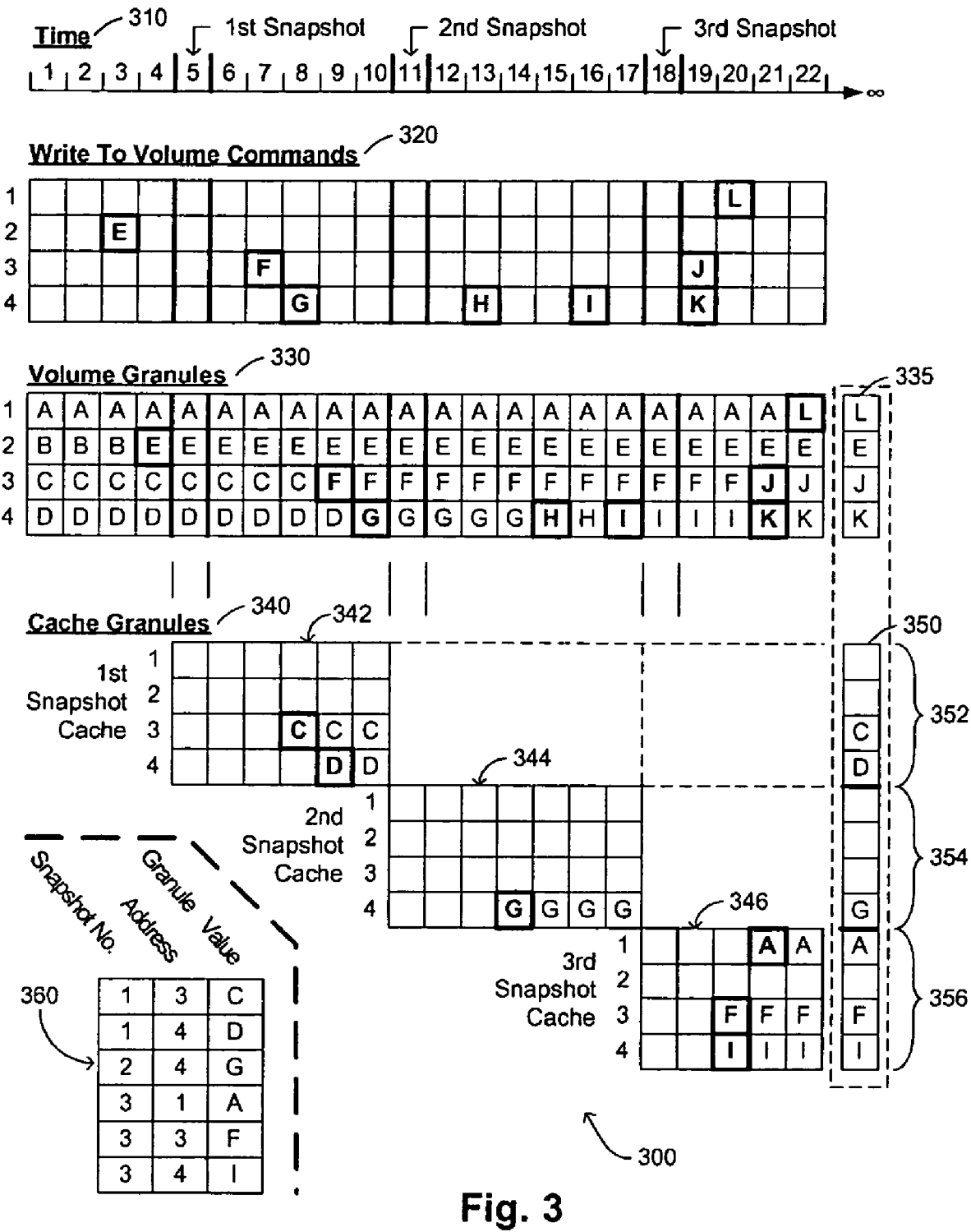
FIG. 3 is a graphical illustration of a first series of exemplary disk-level operations performed by a preferred snapshot system of the present invention.

Referring generally to FIGS. 3, and 5 through 11, a series of exemplary disk level operations performed by a preferred snapshot system of the present invention and associated methods of the same are illustrated. Turning first to FIG. 3, a first set of operations 300 ("Write to Volume") is shown in which "write" commands to a volume occur and the resulting impact on the snapshot caches are discussed.

FIG. 3 is divided generally into five separate but related sections. The first section 310 illustrates a timeline or time axis beginning on the left side of the illustration and extending to the right into infinity. The timeline shows only the first twenty two (22) discrete chronological time points along this exemplary timeline. It should be noted that the actual time interval between each discrete chronological time point and within each time point may be of any arbitrary duration. The sum of the duration of the chronological time points and of any intervening time intervals defines the exemplary time duration of the timeline depicted by FIG. 3. As will be discussed in greater detail hereinafter, three snapshots are taken between time 1 and time 22, namely, at times 5, 11, and 18.

The second section 320 of FIG. 3 graphically illustrates a series of commands to "write" new data to a volume of a finite data storage medium, such as a hard disk. The row numbers 1 through 4 of this grid identify addresses of the volume to which data will be written. Further, each column of this grid corresponds with a respective time point (directly above) from the timeline of section 310. It should be understood that a volume generally contains many more than the four addresses (rows) shown herein; however, only the first four address locations are necessary to describe the functionality of the present invention hereinafter. The letters (E, F, G, H, I, J, K, and L), shown within this grid, represent specific data for which a command to write such specific data to the volume at the corresponding address and at a specific time point has been received. For example, as shown in this section 320, a command has been received by the system to write data "E" to address 2 at time 3, to write data "F" to address 3 at time 7, and so on.

The third section 330 of FIG. 3 is also illustrated as a grid, which identifies the data values actually stored in the volume at any particular point in time. Each grid location identifies a particular volume granule at a point in time. Again, the row numbers 1 through 4 of the grid identify volume addresses and each column corresponds with a respective time point (directly above) from the timeline of section 310. For example, the data values stored in the volume at addresses 1 through 4 at time 13 are "AEFG," the data value stored in the volume at address 3 at time 21 is "J," the data values stored in the volume at addresses 2 through 3 at time 4 are "EC," and so on. Finally, column 335 identifies the data stored in the volume as of time 22. Upper case letters are used herein to identify data that has value, namely, data that has not been deleted or designated for deletion. In addition, the first time data is added to the volume, it is shown in bold.

The fourth section 340 of FIG. 3 graphically illustrates each snapshot specific cache created in accordance with the methods of the present invention. For illustrative purposes, only the three snapshot specific caches corresponding to the first, second, and third snapshots taken at times 5, 11, and 18, respectively, are shown. Each snapshot specific cache is illustrated in two different manners.

First, like sections 320 and 330, each snapshot specific cache 342, 344, 346 is illustrated as a grid, with rows 1 through 4 corresponding to volume address locations 1 through 4 and with each column corresponding to a respective point in time from the timeline in section 310. Each grid shows how each respective snapshot specific cache is populated over time. Specifically, it should be understood that a snapshot specific cache comprises potential granules corresponding to each row of address locations of the volume but only for point of time beginning when the respective snapshot is taken and ending with the last point of time just prior to the next succeeding snapshot. There is no overlap in points of time between any two snapshot specific caches.

Thus, each snapshot specific cache grid 342, 344, 346 identifies what data has been recorded to that respective cache and when such data was actually recorded. For example, as shown in the first snapshot specific cache grid 342, data "C" is written to address 3 at time 8 and is maintained in that address for this first cache thereinafter. Likewise, data "D" is written to address 4 at time 9 and maintained at that address for this first cache thereinafter. Correspondingly, in the second snapshot specific cache 344, data "G" is written to address 4 at time 14 and maintained at that address for this second cache thereinafter. In the third snapshot specific cache 346, data "A" is written to address 1 at time 21 and maintained at that address for this third cache thereinafter, data "F" is written to address 3 at time 20 and maintained at that address for this third cache thereinafter, and data "I" is written to address 4 at time 20 and maintained at that address for this third cache thereinafter. The shaded granules in each of the snapshot specific cache grids 342, 344, 346 merely indicate that no data was written to that particular address at that particular point in time in that particular snapshot specific cache; thus, no additional memory of the data storage medium is used or necessary.

The second manner of illustrating each snapshot specific cache is shown by column 350, which includes the first snapshot specific cache 352, the second snapshot specific cache 354, and the third snapshot specific cache 356. As explained previously, each snapshot specific cache only comprises potential granules corresponding to each row of address locations of the volume for points of time beginning when the respective snapshot is taken and ending with the last point of time just prior to the next succeeding snapshot. In other words, the first snapshot cache was being dynamically created between times 5 and 10 and actually changed from time 8 to time 9; however, at time 11, when the second snapshot was taken, the first snapshot cache became permanently fixed, as shown by cache 352. Likewise, the second snapshot cache was being dynamically created between times 11 and 17 and actually changed from time 13 to time 14; however, at time 18, when the third snapshot was taken, the second snapshot cache became permanently fixed, as shown by cache 354. Finally, the third snapshot cache is still in the process of being dynamically created beginning at time 18, and changed from time 19 to time 20 and from time 20 to time 21; however, this cache 356 will not actually become fixed until a fourth snapshot (not shown) is taken at some point in the future. Thus, even though cache 356 has not yet become fixed, it can still be accessed and, as of time 22, contains the data as shown.

Further, it should be understood that the shaded granules in each of the snapshot specific caches 352,354,356 merely indicate that no data was written or has yet been written to that particular address when that particular cache was permanently fixed in time (for caches 352, 354) or as of time 22 (for cache 356); thus, no additional memory of the data storage medium has been used or was necessary to create the caches 352,354,356. Stated another way, only the data shown in the fifth section of FIG. 3, table 360, is necessary to identify the first three snapshot caches 352,354,356 as of time 22.

Although it should be self evident from FIG. 3 how data is written to the volume and the impact such writes have on the cache in light of when snapshots are taken, it will nevertheless be helpful to examine the impacts of each write command shown in section 320 on the system on a time point by time point basis. First, before proceeding with such analysis, it should be understood or observed that no write commands are shown at a time point in which a snapshot is taken. This is intentional. In the preferred embodiment of the present invention, to maintain the integrity of the data on the volume and stored in the cache, whenever a write command is received by the system, the next snapshot is delayed until such write command has been performed and completed.

Now, proceeding with the time point by time point analysis of FIG. 3, at time 1, the data values stored in addresses 1 through 4 of the volume are previously set to "ABCD." The status of the system does not change at time 2.

However, at time 3, a command to write data "E" to address 2 is received. Data "E" is written to this address at time 4, replacing data "B." Data "B" is not written to any snapshot cache because no snapshots have yet been taken of the volume. Thus, at time 5, when the first snapshot is taken, the values of the volume are "AECD." It should be noted that although the snapshot has been taken at time 5, there is no need, yet, to record any of the data in the volume to snapshot cache because the current volume accurately reflects what the state of the volume is or was at time 5. Since the volume is still the same as it was at time 5, nothing changes at time 6.

At time 7, a command to write data "F" to address 3 is received. Data "F" will be replacing data "C" on the volume; however, because data "C" is part of snapshot 1, data "F" is not immediately written to this address. First, data "C" must be written to the first snapshot cache, as shown at time 8 in cache grid 342. Once data "C" has been written to the first snapshot cache, data "F" can then be safely written to address 3 of the volume, which is shown at the next time point, time 9. This process is generally described as the "copy on write" process in conventional snapshot parlance. The copy on write process is repeated for writing data "G" to the volume and writing data "D" to the first snapshot cache but it is staggered in time from the previous copy on write process.

The second snapshot is taken at time 11. The volume at that point is "AEFG." Again, as stated previously, it is at this point that the first snapshot cache 342 is permanently fixed, as shown by granules 352. It is no longer necessary to add any further information to this first snapshot cache 352.

Continuing with FIG. 3, at time 13, a command to write data "H" to address 4 is received. Data "H" will be replacing data "G;" however, because data "G" is part of snapshot 2, data "H" is not immediately written to this address. The copy on write process is performed so that data "G" is written to the second snapshot cache at time 14 as shown in grid 344. Once data "G" has been written to the second snapshot cache, data "H" can be safely written to address 4 of the volume at time 15. At time 16, a command to write data "I" to address 4 is received. Importantly, it should be noted that data "I" immediately (at time 17) replaces data "H" in the volume and "H" is not written to the snapshot cache. The reason for this is because data "H" was not in the volume at the point in time at which any of the previous snapshots were taken. Because address 4 of the volume changed twice between snapshots, only the starting and ending value of this address are captured by the snapshots. Intermediate data "H" is lost.

The third snapshot is taken at time 18. The volume at that point is now "AEFI." Again, as stated previously, it is at this point that the second snapshot cache 344 is permanently fixed, as shown by granules 354. It is no longer necessary to add any further information to this second snapshot cache 354.

At time 19, commands to write data "J" to address 3 and data "K" to address 4 are received. Data "J" will be replacing data "F" and data "K" will be replacing data "I;" however, because data "F" is part of snapshots 1 and 2 and because data "I" was part of snapshot 2, data "J" and "K" are not immediately written to these addresses. The copy on write process is performed for each address so that data "F" and "I" are written to the third snapshot cache at time 20 as shown in grid 346. Once this has occurred, data "J" and "K" can be safely written to addresses 3 and 4, respectively, of the volume at time 21. These particular copy on write procedures are included so that one can easily see the different state of the cache for addresses 3 and 4 for each different snapshot cache 352,354,356. Specifically, it was not necessary to include data "F" as part of the second snapshot cache 354, even though it was on the volume at the time of the second snapshot.

Finally, at time 20 a command to write data "L" to address 1 is received. Data "L" will be replacing data "A;" however, because data "A" is part of snapshots 1,2,and 3, data "L" is not immediately written to this address. The copy on write process is performed so that data "A" is written to the third snapshot cache at time 21 as shown in grid 346. Once data "A" has been written to the third snapshot cache, data "L" can be safely written to address 1 of the volume at time 22. This particular copy on write procedure is included herein to illustrate that, even though data "A" was part of snapshots 1 and 2, it did not need to be written to cache until it was actually replaced. Further, it is not necessary to copy data "A" to the first or second snapshot caches 352,354 it only needs to be part of the third snapshot cache 356. Again, the third snapshot cache 356 will becomes fixed as soon as the next snapshot is taken.

Finally, it should be noted that data "E," which is part of all three snapshots is not written to cache because it is never replaced during the time duration of FIG. 3.

Figure 4:
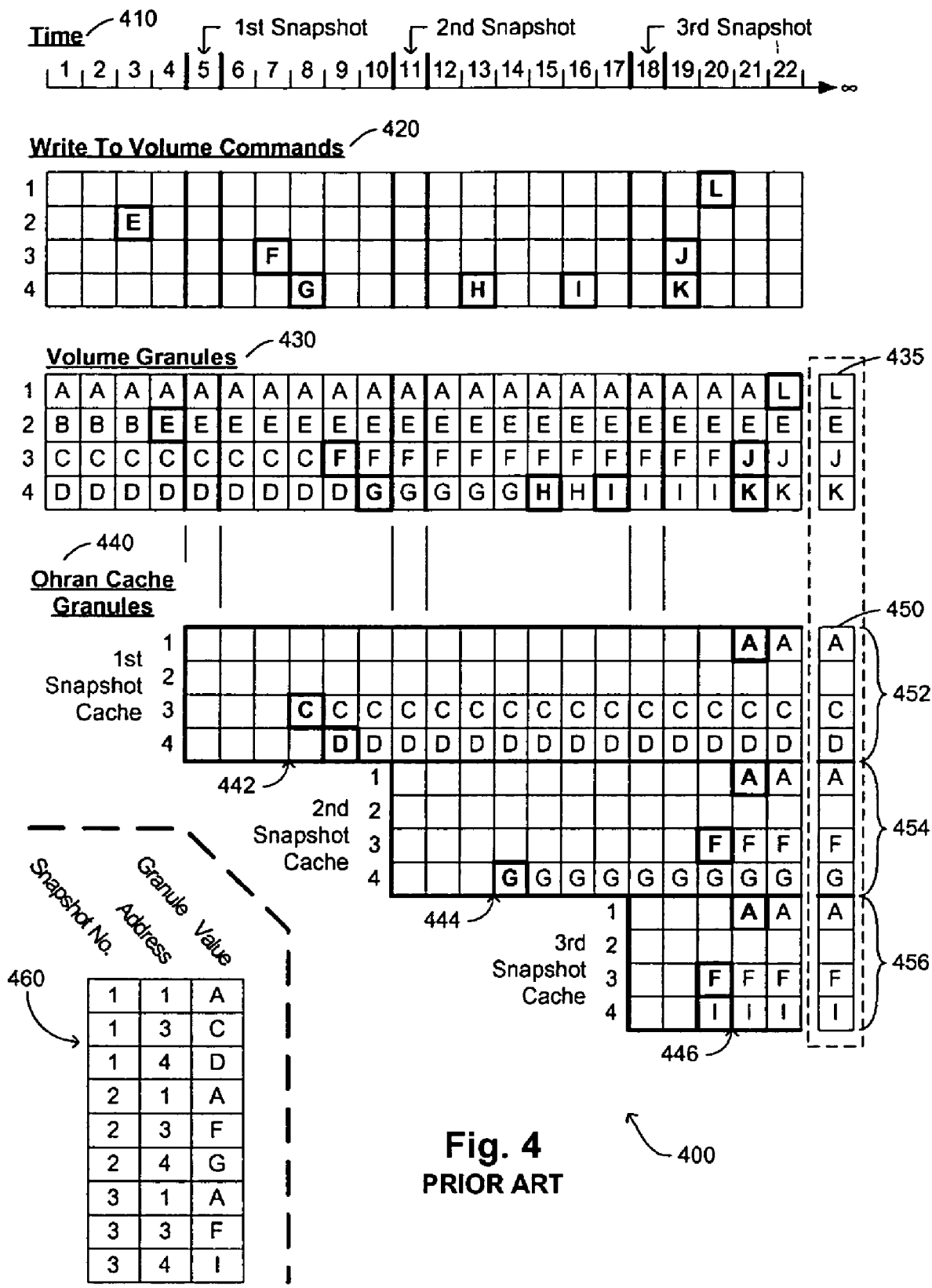
FIG. 4 is a graphical illustration of a series of exemplary disk-level operations performed by a prior art snapshot system.

Turning briefly now to FIG. 4, a set of operations 400 performed by a prior art snapshot system, as implemented by Ohran U.S. Pat. No. 5,649,152, is illustrated. For ease of comparison, FIG. 4 is laid out in a similar format to that of FIG. 3. For example, sections 410, 420, and 430 of FIG. 4 correspond to sections 310, 320, and 330 of FIG. 3. Further, the state of the volume as of time 22, as shown by column 435 in FIG. 4, is the same as the state of the volume as of time 22, as shown by column 335 in FIG. 3. Contrasts between operation 300 of the present invention and operation 400 of FIG. 4 (Ohran) are most evident by comparing, respectively, sections 440, 450, and 460 of FIG. 4 with sections 340, 350, and 360 of FIG. 3.

Unlike the present invention, each snapshot cache 442, 444, and 446 begins at its respective time of snapshot (time 5, 11, and 18, respectively) but then continues ad infinitum, as long as the system is maintaining snapshots in memory, rather than stopping at the point in time just prior to the next snapshot being taken. The result of this is that the same data is recorded redundantly in each snapshot cache 452, 454, and 456. For example, data "A" is stored not only in the third snapshot cache 456 at address 1 but also at address 1 in the first and second snapshot caches 452,454, respectively. Likewise, data "F" is stored not only in the third snapshot cache 456 at address 3 but also in the second snapshot cache 454 also at address 3. The redundancy of this prior art system is illustrated as well with reference to table 460, which may be contrasted easily with table 360 in FIG. 3. Although the amount of data that must be stored by the prior art system shown in table 460 of FIG. 4 does not appear to be substantially greater than that of table 360 in FIG. 3, it should be apparent to one skilled in the art that, with the passage of time, with changes to data stored on the volume, and as more and more snapshots of the volume are taken, the amount of memory required to store snapshots of the prior art system 400 and the amount of redundancy of data storage grows exponentially greater than that of the system 300 of the present invention.

Figure 5:
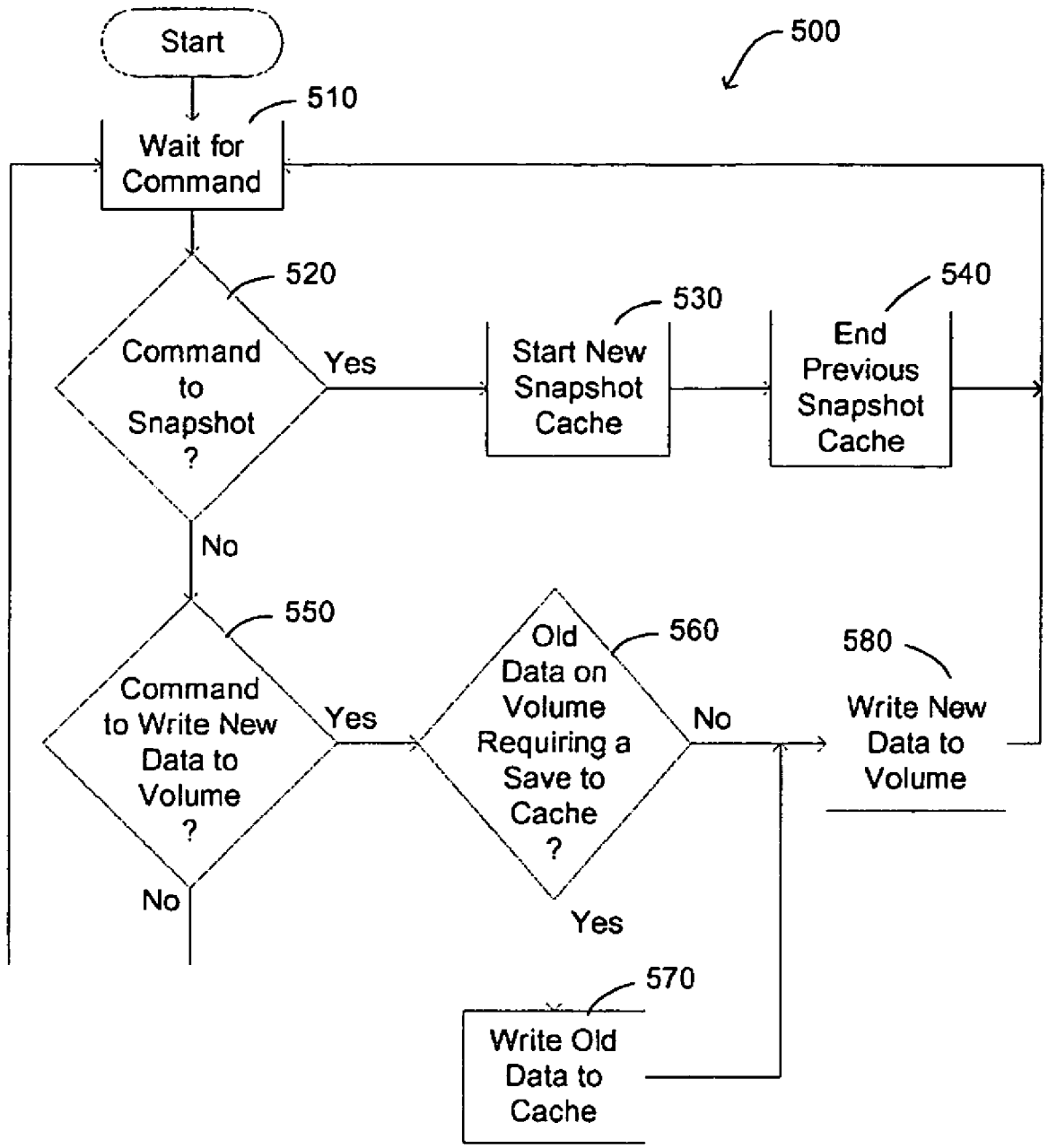
FIG. 5 is a flowchart showing method performed by a preferred embodiment of the present invention implementing the operations of FIG. 3.

Turning now to FIG. 5, a method 500 for performing the first series of operations 300 from FIG. 3 are illustrated. First, the system waits (Step 510) until a command is received from the system, from an administrator of the system, or from a user of the system. If a command to take a snapshot is received (Step 520), then a new snapshot cache is started (Step 530) and the previous snapshot cache, if one exists, is ended (Step 540). The process then returns to Step 510 to wait for another command.

If the determination in Step 520 is negative, then the system determines (Step 550) whether a command to write new data to the volume has been received. If not, then the system returns to Step 510 to wait for another command. If so, then the system determines (Step 560) whether the data on the volume that is going to be overwritten needs to be cached. For example, from FIG. 3, data "B" and "H" did not need to be cached. On the other hand, data "C," "D," "G," "F," "I," and "A," form FIG. 3, all needed to be cached. If the determination in Step 560 is positive, then the data to be overwritten on the volume is written (Step 570) to snapshot cache. If the determination in Step 560 is negative or after Step 570 has been performed, then the new data is written (Step 580) to the volume. The process then returns to Step 510 to wait for another command.

Figure 6A:
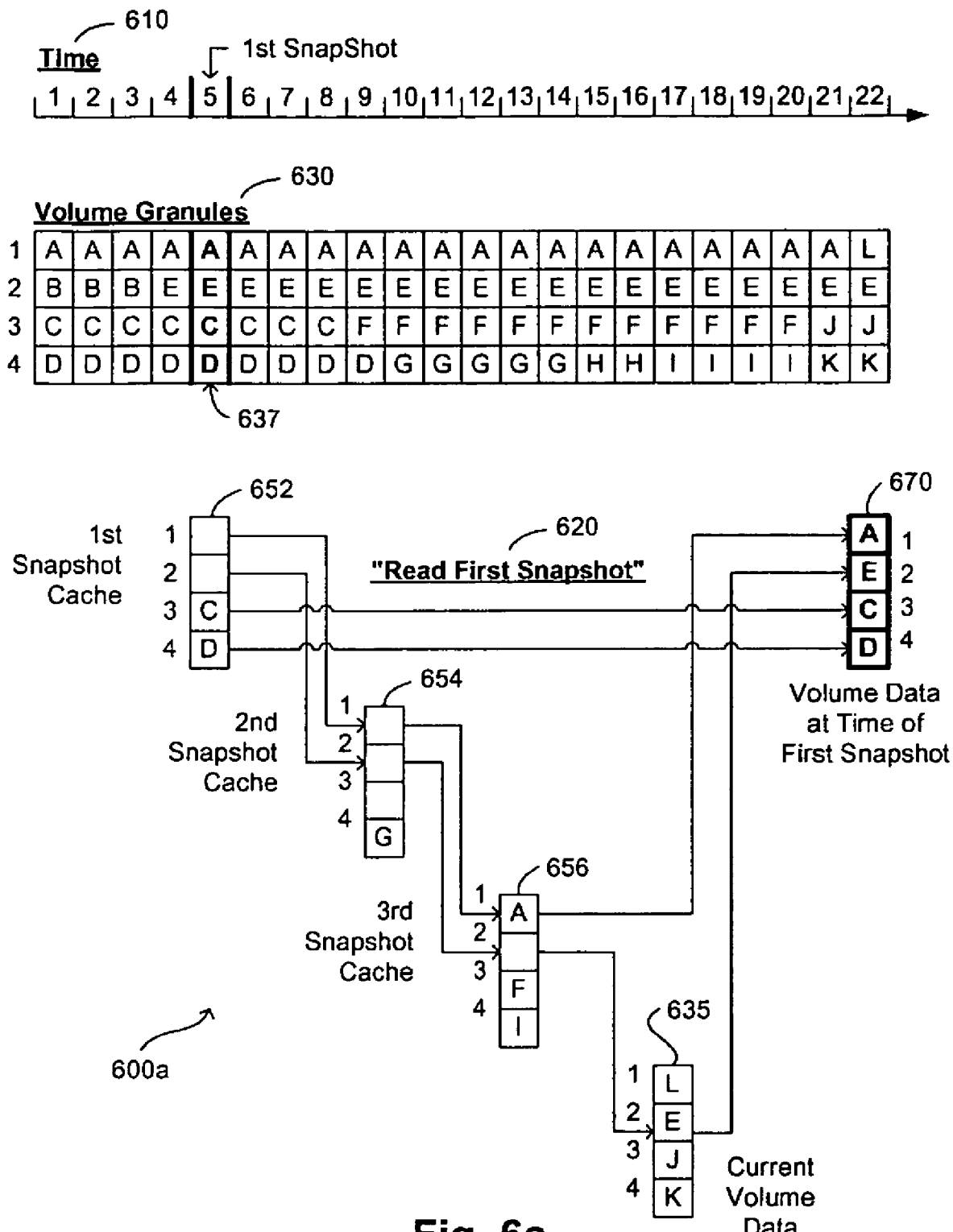
FIGS. 6a and 6b are graphical illustration of a second series of exemplary disk-level operations performed by a preferred snapshot system of the present invention.
Figure 6B:
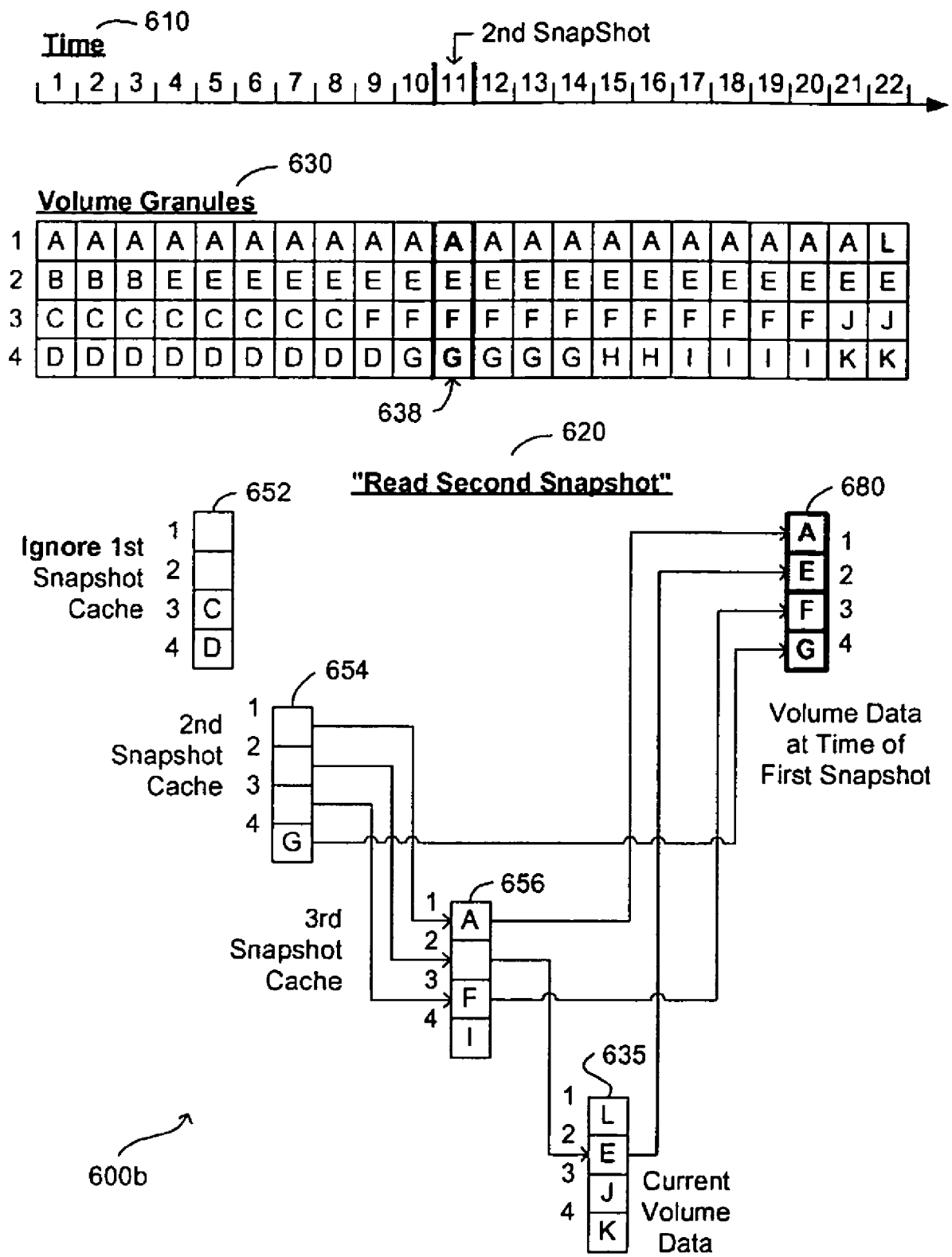

Turning now to FIGS. 6a and 6b, a second set of operations 600a, 600b, respectively, ("Read First and Second Snapshots") are shown in which "read snapshot" commands are received and the system, by means of accessing the current volume and the relevant snapshot caches, is able to reconstruct what the volume looked like at an historical point in time at which the respective snapshot was taken. FIGS. 6a and 6b are divided generally into three separate but related sections 610, 630, 620.

Turning first to FIG. 6a, the first section 610 illustrates a timeline or time axis. This timeline 610 is the same as the timeline 310 previously discussed in FIG. 3. As will be recalled, the first snapshot from FIG. 3 was taken at time 5 and, for ease of reference, is shown again in FIG. 6a. The second section 630 of FIG. 6a graphically illustrates the volume, as it existed in the past, and the data stored therein at any particular point in time along timeline 610. Again, this historical volume grid 630 is identical to the volume grid 330 from FIG. 3. The third section 620 of FIG. 6a graphically illustrates the operations that are performed by the system to "read" the first snapshot (i.e., to correctly identify what data was contained in the volume when the first snapshot was taken).

Column 637 identifies what data was contained in the volume at time 5, when the first snapshot was taken; however, it is assumed that the system only has access to the data from the current volume 635, as it exists immediately after time 22, and to the snapshot caches 652, 654, and 656. Thus, after the proper procedures are performed, column 670 should match column 637.

To determine the data on the volume at the first snapshot, it is first necessary to examine the first snapshot cache 652. Each separate address granule is examined and, if any granule has any data therein, such data is written to column 670. As shown, the first snapshot cache has data "C" at address 3 and data "D" at address 4. These are written to column 670 at addresses 3, 4, respectively.

Next, each address granule for which data has not yet been obtained (i.e., addresses 1 and 2) of the second snapshot cache 654 is then examined. If any of these addresses have data therein, such data is written to column 670 at its respective address. The second snapshot 654 does not have any data in addresses 1 or 2; therefore, no new data is written to column 670.

The same process is then repeated for each successive snapshot until there are no more snapshot. As shown, addresses 1 and 2 of the third snapshot cache 656 are next examined, and data "A" from address 1 in the third snapshot cache 656 is written to address 1 of column 670.

Once all snapshot caches have been examined, any addresses for which no data was found from such snapshot caches is obtained directly from the relevant address(es) of the current volume 635. In this case, data "E" is obtained from the current volume at address 2 and written to column 670.

As shown, the data 637 in the volume at time 5 was correctly reconstructed in column 670 by following the above process.

Likewise, turning to FIG. 6b, the ability to reconstruct the data 638 in the volume at time 11, when the second snapshot was taken, may be done in a similar manner to that described with reference to FIG. 6a. The primary difference between FIGS. 6a and 6b is that to reconstruct the volume at the second snapshot, any prior snapshot caches are ignored. In this case, the first snapshot cache 652 is irrelevant to the process of constructing column 680. The process, thus, begins with the second snapshot cache 654 and proceeds in a similar manner to that described for FIG. 6a, but with a different outcome. In this manner, the data 638 in the volume at time 11 is correctly reconstructed in column 680.

Figure 7:
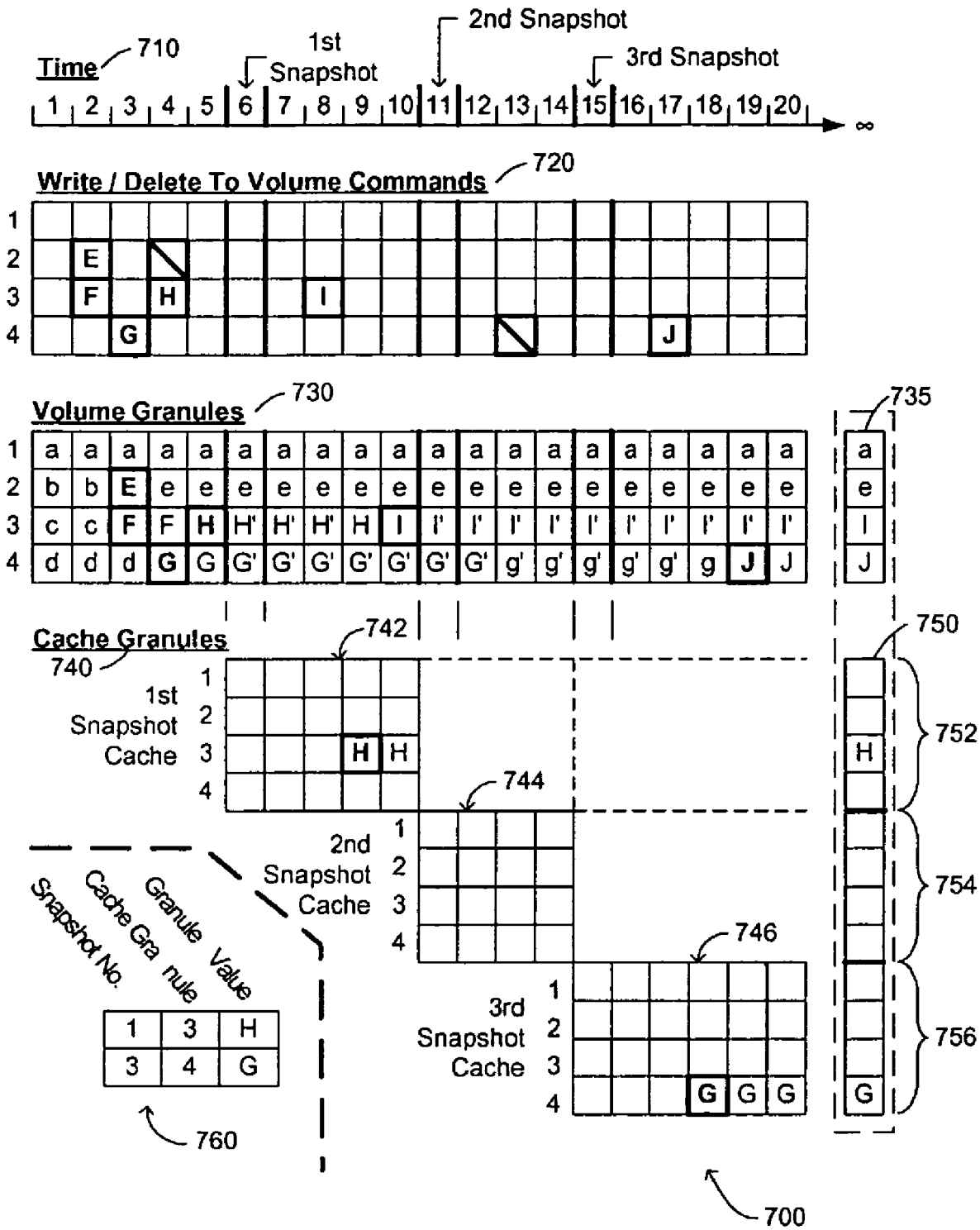
FIG. 7 is a graphical illustration of a third series of exemplary disk-level operations performed by a preferred snapshot system of the present invention.

Turning now to FIG. 7, a third set of operations 700 ("Write/Delete to Volume") is shown in which "write and/or delete" commands to a volume occur and the resulting impact on the snapshot caches are discussed. Like FIG. 3, FIG. 7 is divided generally into five separate but related sections. The first section 710 illustrates a timeline or time axis similar to the timeline 310 of FIG. 3; however, the timeline 710 shows only the first twenty (20) discrete chronological time points along this exemplary timeline. In contrast with previous Figs., the three snapshots shown in FIG. 7 are taken at times 6, 11, and 15.

The second section 720 of FIG. 7 graphically illustrates a series of commands to "write" new data to a volume or to "delete" existing data from a volume. The letters (E, F, G, H, I, and J), shown within this grid, represent specific data for which a command to "write" such specific data to the volume at the corresponding address and at a specific time point has been received. In contrast, a command to delete data from the volume is illustrated by an address and time granule in this grid 720 with a slash mark or reverse hash symbol. For example, as shown in this section 720, a command has been received by the system to write data "E" to address 2 at time 2, to write data "F" to address 3 at time 2, to delete the value of data (whatever data that happens to be) on the volume at address 2 at time 4, and so on.

The third section 730 of FIG. 7 is also illustrated as a grid, which identifies the data values actually stored in the volume at any particular point in time. Upper case letters are used, as they were in FIG. 3, to identify active data on the volume that has value, namely, data that has not been deleted or designated for deletion and is currently "in use." In addition, the first time any new data is added to the volume, it is shown in bold. In contrast, lower case letters residing on the volume represent memory space on the volume that is available for use. For example, volume addresses 1 through 4 at time 1 contain data "a" through "d," respectively, each of which represents old and unwanted data, such as files or information previously subjected to delete commands. The prime symbols marking letters (for example H", at address 3 at time 6) represent granules of data, which were identified as being on the volume when a snapshot is taken but which have not yet been recorded to snapshot cache. The letters marked with a prime symbol, therefore, represent data that are "primed" for recording to a snapshot cache prior to any replacement (overwriting). As will be discussed hereinafter, both data in use (upper case letters) and data understood as deleted (lower case letters) can be primed for cache recording. Finally, column 735 identifies the data actually stored in the volume as of time 20.

The fourth section 740 of FIG. 7 graphically illustrates each snapshot specific cache created in accordance with the methods of the present invention. For illustrative purposes, only the three snapshot specific caches corresponding to the first, second, and third snapshots taken at times 6, 11, and 15, respectively, are shown. As was done in FIG. 3, each snapshot specific cache is illustrated in two different manners: as snapshot specific cache grids 742, 744, 746, which shows how each snapshot cache changed over time, and, in column 750, which shows the current states of each such snapshot specific caches 752, 754, 756. It should be recalled that the first snapshot specific cache 752 became fixed as of time of the second snapshot shown in this FIG. 7, namely, at time 11, and that the second snapshot specific cache 754 became fixed as of time of the third snapshot shown in this FIG. 7, namely, at time 15. Finally, the third snapshot cache 756 is still in the process of being dynamically created as of time 20 and will not actually become fixed until a fourth snapshot (not shown) is taken at some point in the future. Thus, even though cache 356 has not yet become fixed, it can still be accessed and, as of time 20, contains the data as shown.

Further, it should be understood that the shaded granules in each of the snapshot specific caches 752, 754, 756 merely indicate that no data was written or has yet been written to that particular address when that particular cache was permanently fixed in time (for caches 752, 754) or as of time 20 (for cache 756); thus, no additional memory of the data storage medium has been used or was necessary to create the caches 752, 754, 756. Stated another way, only the data shown in the fifth section of FIG. 7, table 760, is necessary to identify the first three snapshot caches 752, 754, 756 as of time 20.

Although it should be self evident from FIG. 7 how data is written to or deleted from the volume and the impact such writes and deletes have on the cache in light of when snapshots are taken, it will nevertheless be helpful to examine the impacts of each write and delete command shown in section 720 on the system on a time point by time point basis.

Now, proceeding with the time point by time point analysis of FIG. 7, at time 1, the data values stored in addresses 1 through 4 of the volume are previously set to "abcd," which are undesired data (because they are lower case).

At time 2, commands to write data "E" to address 2 and data "F" to address 3 are received. At time 3, a command to write data "G" to address 4 is received. Data "E" is written to address 2 at time 3, replacing data "b;" data "F" is written to address 3 also at time 3, replacing data "c;" and data "G" is written to address 4 at time 4, replacing data "d." Data "b" and "c" and "d" are not written to any snapshot cache for either of two reasons: they are lower case, which means they are undesirable and do not need to be cached, and they have been overwritten prior to the first snapshot and thus do not get cached.

At time 4, a command to write data "H" to address 3 is received. Data "H" is written to address 3 at time 5, replacing data "F." It should be noted that data "H" merely replaces data "F" in the volume.

At time 4, a command to delete the data stored at address 2 is received. Thus, data "E" becomes data "e" at time 4 in the volume. Thus, at time 6, when the first snapshot is taken, the values of the volume are "aeHG." Data "H" and "G" are now "primed," as denoted by the prime symbol to indicate that such data should be written to cache if they are ever overwritten by different data. As will become apparent, it is not necessary to write such data to cache if it is merely designated for deletion because it will still be accessible at its respective address location on the volume until it is actually overwritten.

It should be noted that although the snapshot has been taken at time 6, there is no need, yet, to record any of the (upper case) data in the volume to snapshot cache because the current volume accurately reflects what the state of the volume is or was at time 6. Since the volume is still the same as it was at time 6, nothing changes at time 7.

The second snapshot is taken at time 11. The volume at that point is "aeIG." Data "I" is now "primed," as denoted by the prime symbol, and data "G" remains primed. Again, as stated previously, it is at this point that the first snapshot cache 752 is permanently fixed. It is no longer necessary to add any further information to this first snapshot cache 742.

At time 13, a command to delete the data stored at address 4 is received. Thus, data "G"" becomes data "g"" in the volume at time 13. The third snapshot is taken at time 15. The volume at that point is "aeIg." Data "I" remains "primed" and data "g," although now designated as ready for deletion, also remains primed. Again, as stated previously, it is at this point that the second snapshot cache 754 is permanently fixed (with no data stored therein). It is no longer necessary to add any further information to this second snapshot cache 744.

Then, at time 17, a command to write data "J" to address 4 is received. Data "J" will be replacing data "g," again, which has already been designated for deletion. However, because data "g" was part of both snapshots 2 and 3, data "J" is not immediately written to this address. The copy on write process is performed so that data "G" is written to the third snapshot cache at time 18 as shown in grid 746. Once data "G" has been written to the third snapshot cache 746, data "J" can be safely written to address 4 of the volume at time 19.

Finally, it should be noted that data "I," which is part of two of the snapshots remains primed because it has not yet been overwritten and, thus, has not yet been written to cache during the time duration of FIG. 7.

Figure 8:
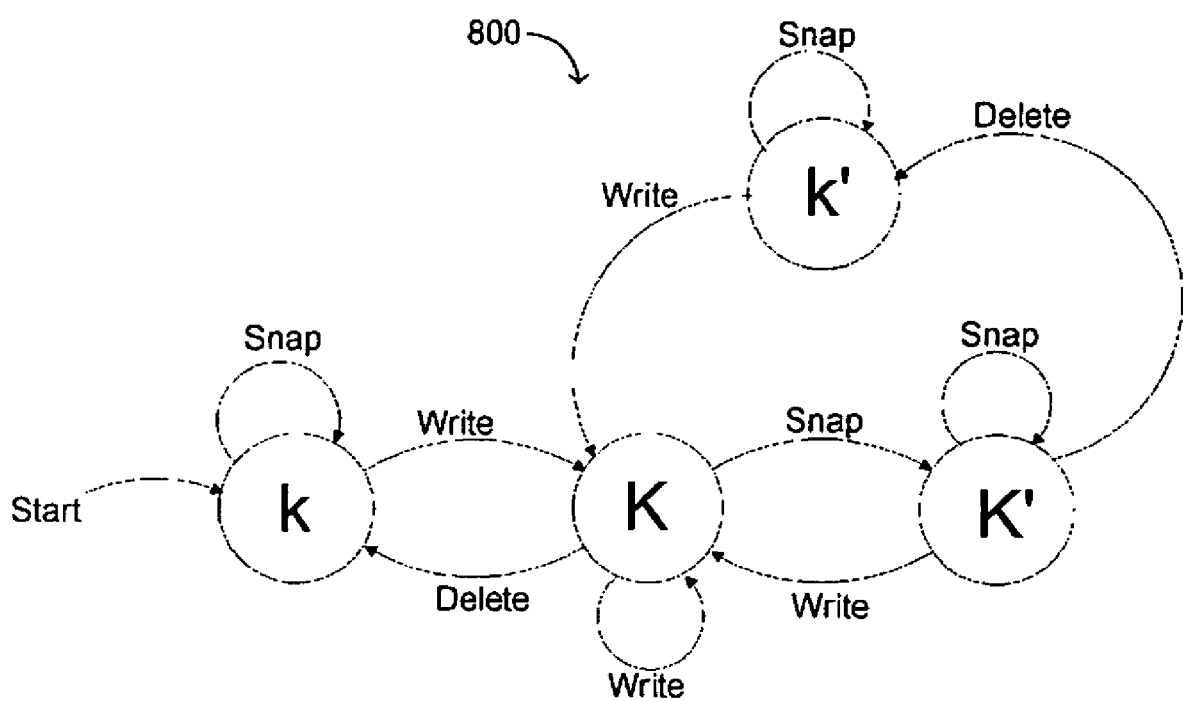
FIG. 8 is a state diagram showing a preferred embodiment of the present invention implementing the operations of FIG. 7.

Turning briefly to FIG. 8, a state diagram 800, illustrates the various states an exemplary data "K" may go through according to the process described in FIG. 7.

Figure 9:
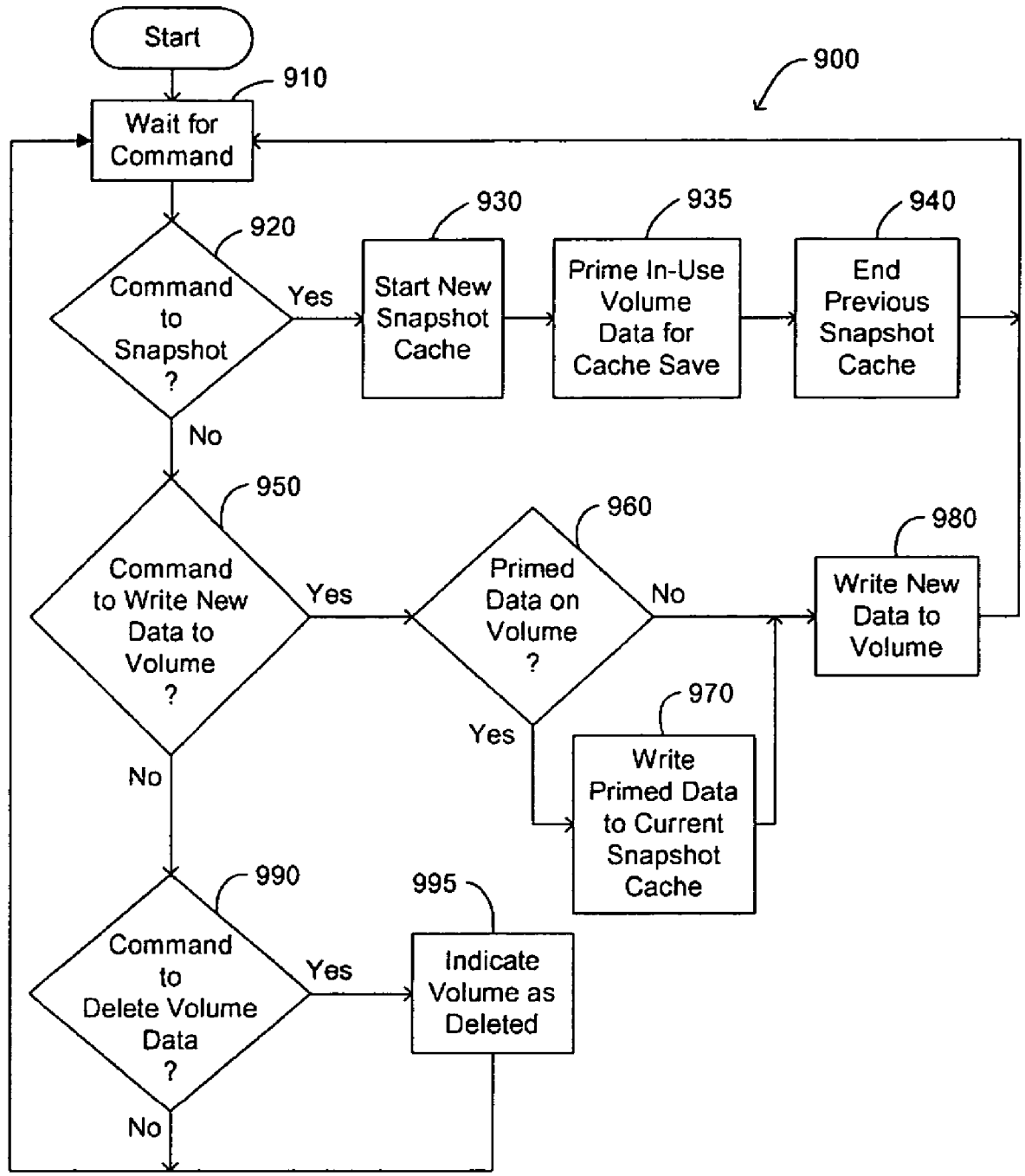
FIG. 9 is a flowchart showing method performed by a preferred embodiment of the present invention implementing the operations of FIG. 7.

Turning now to FIG. 9, a method 900 for performing the series of operations 700 from FIG. 7 are illustrated. First, the system waits (Step 910) until a command is received from the system, from an administrator of the system, or from a user of the system. If a command to take a snapshot is received (Step 920), then a new snapshot cache is started (Step 930), all in use data (i.e., data in upper case letters using the convention of FIG. 7) on the volume is primed (Step 935) for later caching, and the previous snapshot cache, if one exists, is ended (Step 940). The process then returns to Step 910 to wait for another command.

If the determination in Step 920 is negative, then the system determines (Step 950) whether a command to write new data to the volume has been received. If so, then the system determines (Step 960) whether the data on the volume that is going to be overwritten needs to be cached (i.e., has the data been "primed"?). For example, from FIG. 7, only data "H" and "G" needed to be cached. If the determination in Step 960 is positive, then the data to be overwritten on the volume is written (Step 970) to the current snapshot cache. If the determination in Step 960 is negative or after Step 970 has been performed, then the new data is written (Step 980) to the volume. The process then returns to Step 910 to wait for another command.

If the determination in Step 950 is negative, then the system determines (Step 990) whether a command to delete data from the volume has been received. If not, then the process returns to Step 910 to wait for another command. If so, then the system designates or indicates (Step 995) that the particular volume data can be deleted and the associated space on the volume is available for new data. The process then returns to Step 910 to wait for another command.

Figure 10A:
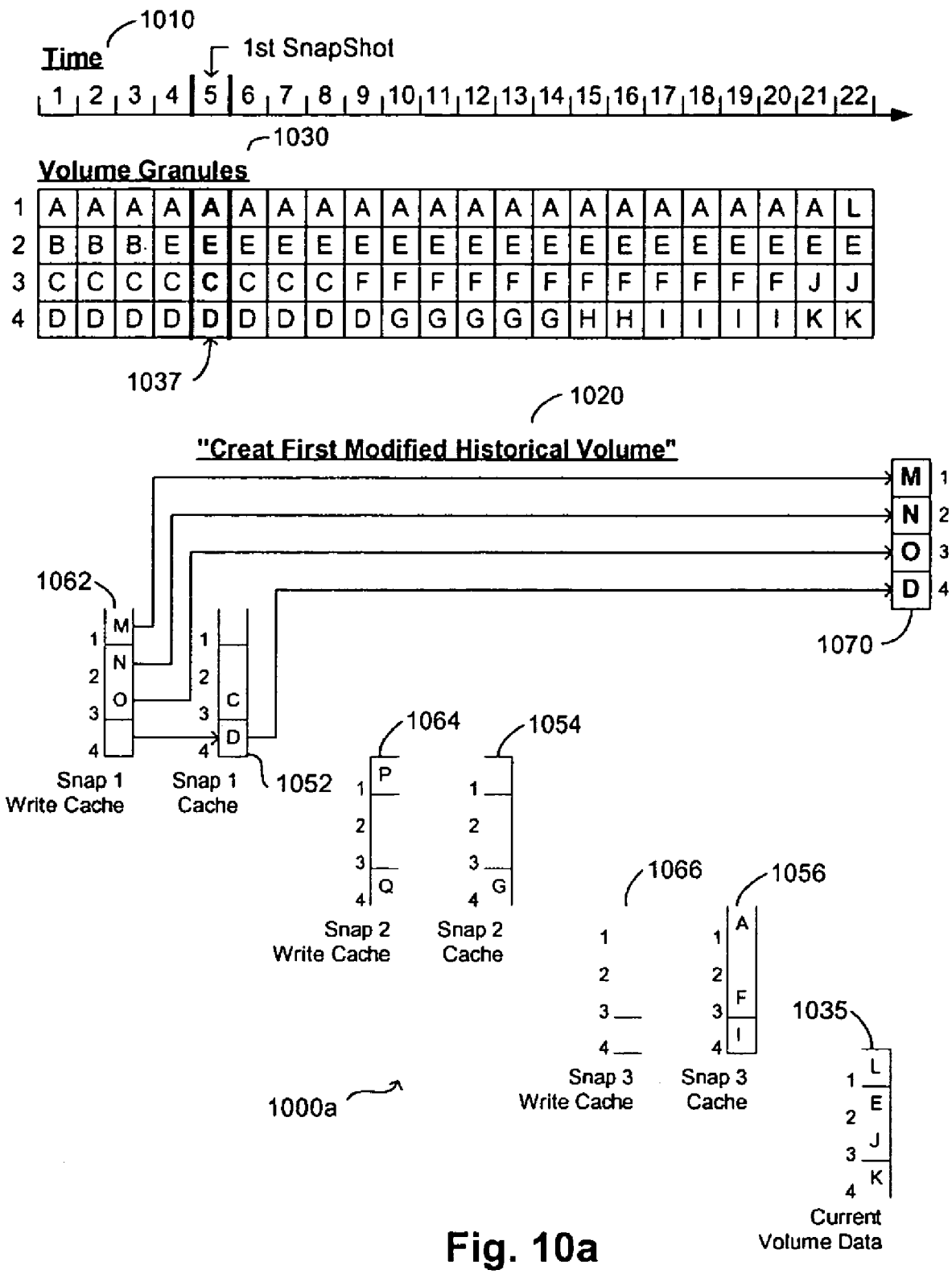
FIGS. 10a and 10b are graphical illustration of a fourth series of exemplary disk-level operations performed by a preferred snapshot system of the present invention.
Figure 10B:
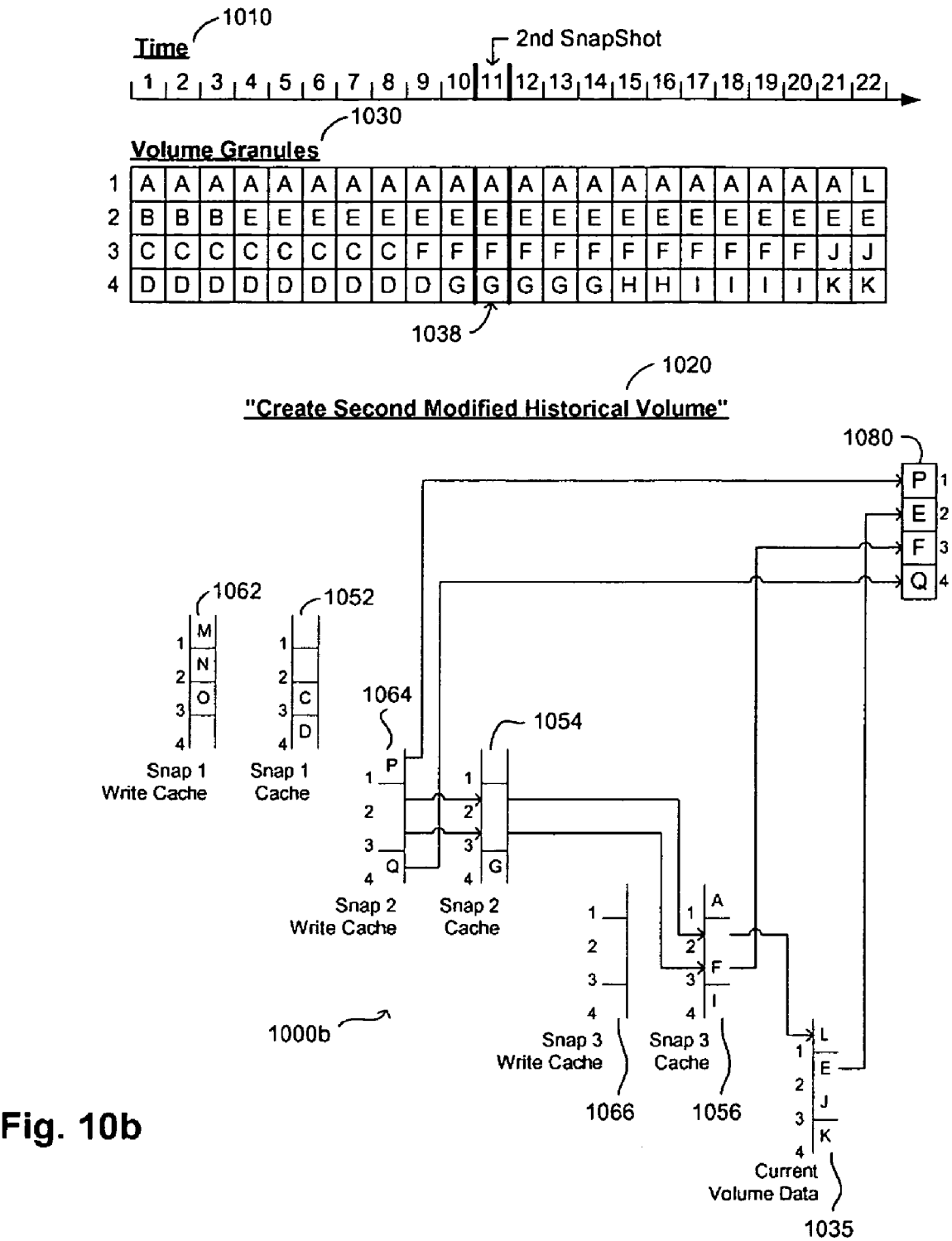

Turning now to FIGS. 10a and 10b, a fourth set of operations 1000a, 1000b, respectively, ("Create First and Second Modified Historical Volumes") are shown in which a "create modified volume at a snapshot moment" command is received. The system (i) reconstructs what the volume looked like at an historical point in time at which the respective snapshot was taken and then (ii) enables such volume to be modified. Modifications to such volumes may be made directly by a system administrator or system user at the granule level of the cache; however, more than likely, modifications are made at a system administrator user interface level or at an interface level of the system user. Such modifications at the interface level are then mapped by the system to the granule level of the cache. The process of making modified historical volumes will now be discussed in greater detail.

FIGS. 10a and 10b are divided generally into three separate but related sections 1010, 1030, 1020. Turning first to FIG. 10a, the first section 1010 illustrates a timeline or time axis. This timeline 1010 is the same as the timeline 310 previously discussed in FIG. 3. As will be recalled, the first snapshot from FIG. 3 was taken at time 5 and, for ease of reference, is shown again in FIG. 10a. The second section 1030 of FIG. 10a graphically illustrates the volume, as it existed in the past, and the data stored therein at any particular point in time along timeline 1010. Again, this historical volume grid 1030 is identical to the volume grid 330 from FIG. 3. The third section 1020 of FIG. 10a graphically illustrates the operations that are performed by the system to "create a modified historical volume." From previous discussions, it will be appreciated that snapshot caches 1052, 1054, and 1056 are read only. In order to make them read write (or at least to appear read write at the system administrator or system user level), the system creates corresponding write snapshot caches 1062, 1064, and 1066. When created, these write snapshot caches 1062, 1064, and 1066 are empty (i.e., all granules are shaded to illustrate that no data is contained therein). As previously stated, the system enables data to be written to particular addresses of such write snapshot caches 1062, 1064, and 1066 either directly or after mapping of data modifications from the user interface level to the cache granule level. For purposes of this example and as shown in FIGS. 10a and 10b, write snapshot caches 1062 and 1064 each have data already written to particular addresses therein.

The process of creating a modified first historical volume 1070 then is quite similar to the process of recreating an actual historical volume, as illustrated by column 670 from FIG. 6a. For example, column 1037 identifies what data was originally contained in the volume at time 5, when the first snapshot was taken. The system could recreate such information based on its access to the data from the current volume 1035, as it exists immediately after time 22, and to the read only snapshot caches 1052, 1054, and 1056.

The process of creating the modified first historical volume, however, starts first with the write snapshot cache corresponding to the snapshot to which the system is being reverting. In FIG. 10a, the system starts with write snapshot cache 1062. If any data exists in any address therein, it is immediately written to the modified historical volume 1070 at the corresponding address location (in this case, addresses 1 through 3 are written directly from the write snapshot cache 1062 data). From then on, the read process described in FIG. 6a is followed for each remaining address location. In this case, only address 4 needs to be recreated. Thus, after the above procedures are performed, column 1070 does not match column 1037 except at address 4.

Likewise, turning to FIG. 10b, the ability to create a modified second historical volume 1080 then is quite similar to the process of recreating an historical volume, as illustrated by column 680 from FIG. 6b. Caches 1052 and 1062 are ignored. The system starts with write snapshot cache 1064. If any data exists in any address therein, it is immediately written to the modified historical volume 1080 at the corresponding address location (in this case, addresses 1 and 4 are written directly from the write snapshot cache 1064 data). From then on, the read process described in FIG. 6b is followed for each remaining address location. In this case, address 2 data "E" is ultimately obtained from the current volume 1035, as it exists immediately after time 22. Address 3 data "F" is ultimately obtained from read only snapshot cache 1056. Thus, after the above procedures are performed, column 1080 does not match column 1038 except at addresses 2 and 3.

Figure 11:
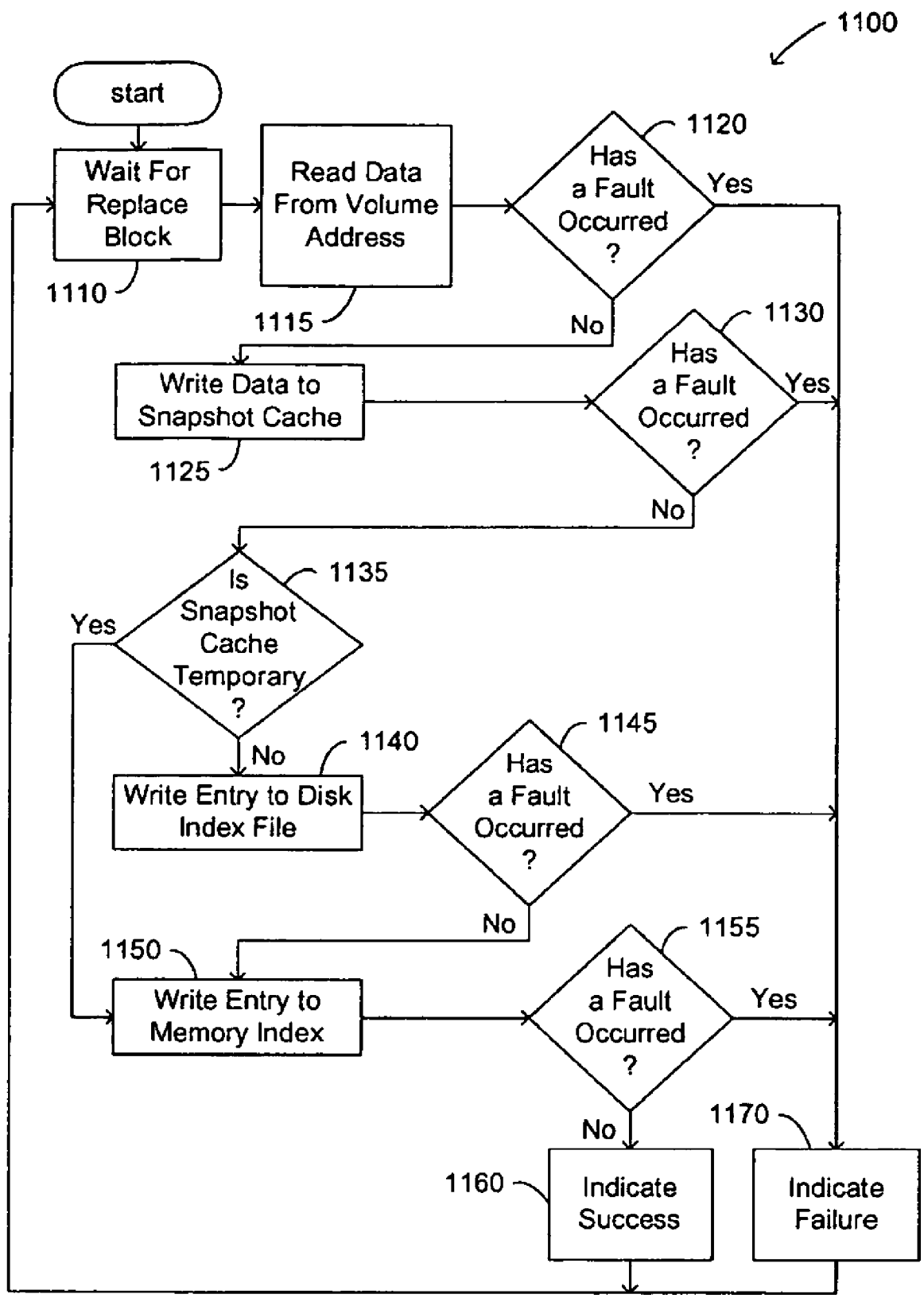
FIG. 11 is a flowchart illustrating a preferred secure copy-on-write method as used by preferred embodiments of the present invention.

Turning briefly to FIG. 11, an exemplary method 1100 for performing copy on write procedures, in a preferred manner, is illustrated. Such method provides a fairly secure or safe method of performing such copy on write procedures that ensures that no information is lost or prematurely cached or overwritten in the process, even in the event of a power failure or power loss in the middle of such procedure.

Specifically, the system waits (Step 1110) for a request to replace a block of data on the volume. Step 1110 is triggered, for example, when a command to write old data to cache is received (as occurs in Step 570 of FIG. 5), when a request to write primed data to the current snapshot is received (as occurs in Step 970 of FIG. 9), or the like. When this occurs, the old or primed data is read (Step 1115) from the volume address.

The system then checks (Step 1120) to determine whether a fault has occurred. If so, the system indicates (Step 1170) that there has been a failure, and the write on copy process is halted. If the determination in Step 1120 is negative, then the system writes (Step 1125) the old or primed data to the current snapshot cache.

Again, the system then checks (Step 1130) to determine whether a fault has occurred. If so, the system indicates (Step 1170) that there has been a failure, and the write on copy process is halted. If the determination in Step 1130 is negative, then the system determines (Step 1135) whether the snapshot cache is temporary. If so, then the system merely writes (Step 1150) an entry to the memory index. If the snapshot cache is not temporary, then the system writes (Step 1140) an entry to the disk index file.

Again, the system then checks (Step 1145) to determine whether a fault has occurred. If so, the system indicates (Step 1170) that there has been a failure, and the write on copy process is halted. If the determination in Step 1145 is negative, then the system also writes (Step 1150) an entry to the memory index.

Finally, the system again checks (Step 1155) to determine whether a fault has occurred. If so, the system indicates (Step 1170) that there has been a failure, and the write on copy process is halted. If the determination in Step 1155 is negative, then the system indicates (Step 1160) that the write to the cache was successful and the system then allows the new data to be written to the volume over the old data that was cached.

As will be apparent from the foregoing detailed description, this preferred embodiment of a method of the present invention provides a means for taking and maintaining a snapshot that is highly efficient in its consumption of the finite storage capacity allocated for the snapshot data, even when multiple snapshots are taken and maintained over extended periods of time.

Exemplary System Administrator and User Interfaces

Before continuing with the detailed description of further aspects, systems and methodologies of the present invention, it will be useful to quickly examine a number of system administrator and system user interfaces, in FIGS. 12 through 32, that provide one preferred means for interacting with the snapshot system of the present invention.

Figure 12:
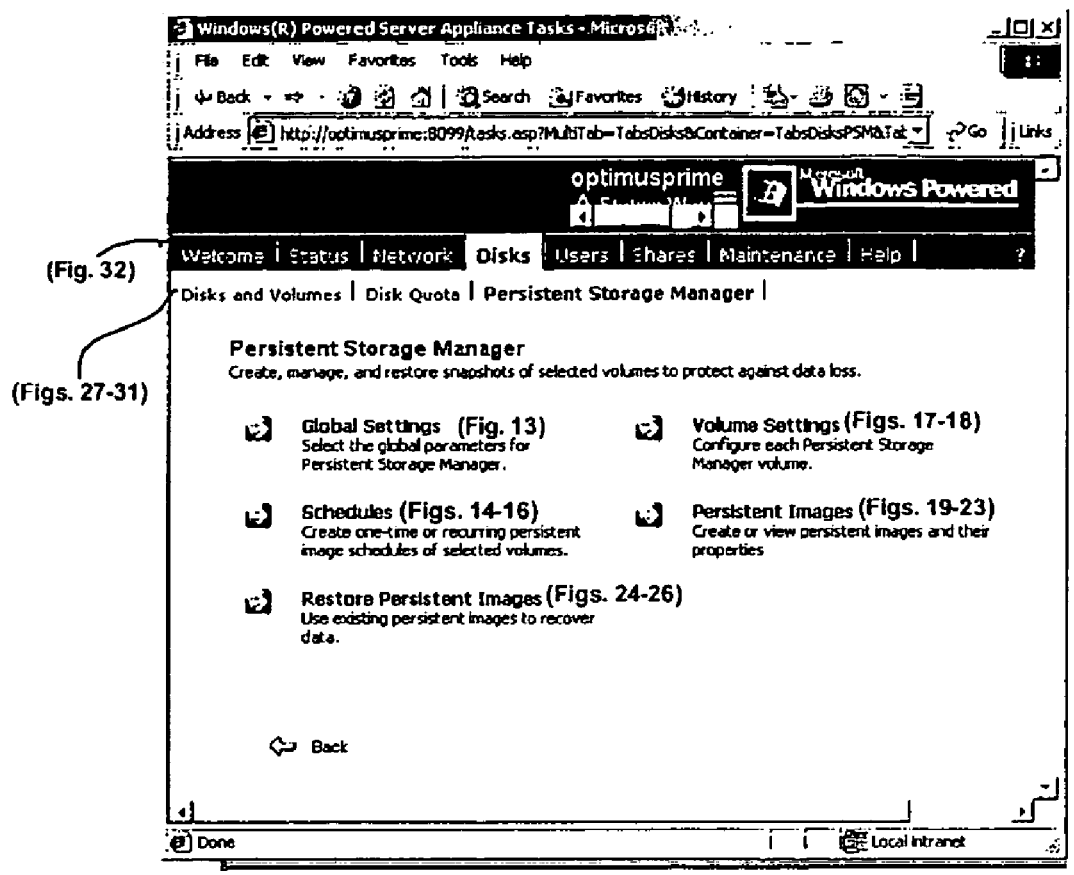
FIGS. 12–32 illustrate user screen shots of a preferred implementation of the methods and systems of the present invention.

Turning first to FIG. 12, a screen shot illustrates a preferred control panel for use with the present invention. The control panel includes buttons and folders across the top of the page and links within the main window. Specifically, a link to "Global Settings" forwards the user to FIG. 13; a link to "Schedules" forwards the user to FIG. 14; a link to "Volume Settings" forwards the user to FIG. 17; a link to "Persistent Images" forwards the user to FIG. 19; a link to "Restore Persistent Images" forwards the user to FIG. 24; folder "Disks and Volumes" takes the user to FIG. 27; and button "Status" at the top of the page forwards the user to FIG. 32.

Figure 13:
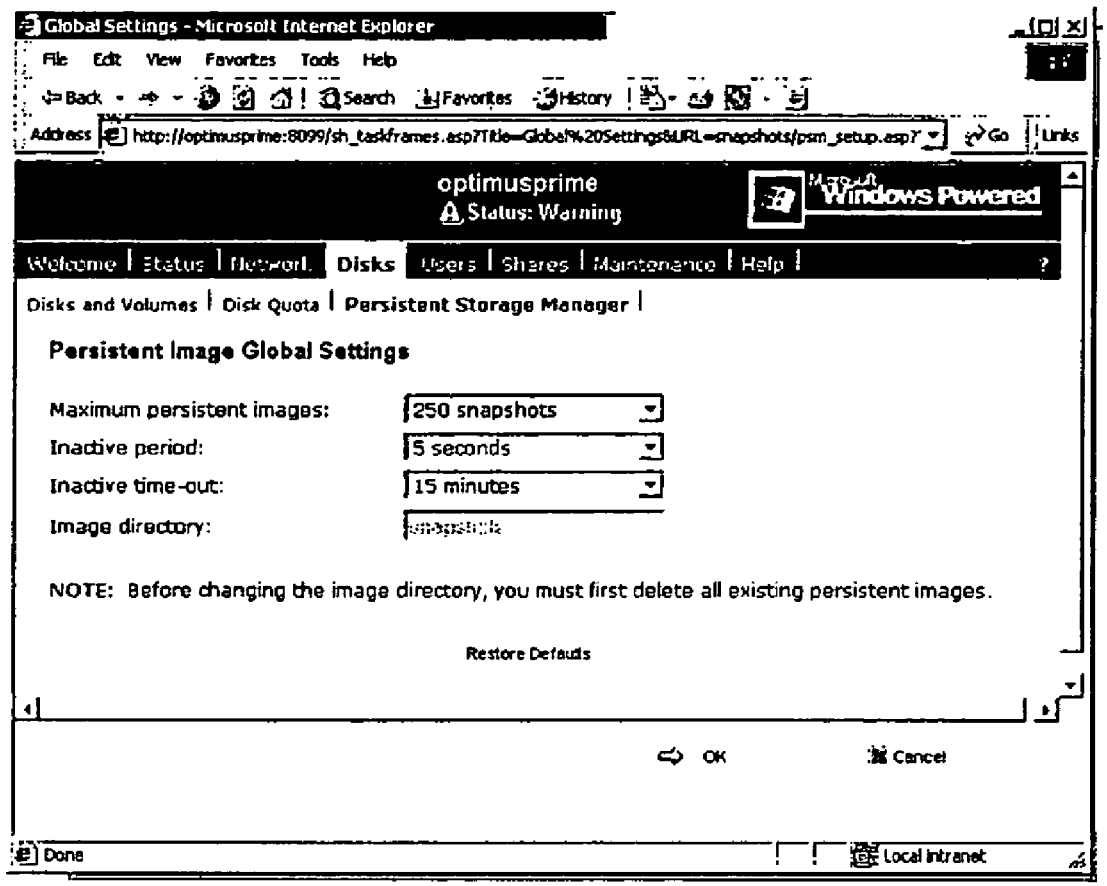

FIG. 13 illustrates a screen shot of the Global Settings page. The variables that are modifiable by the user are shown in the main window.

Figure 14:
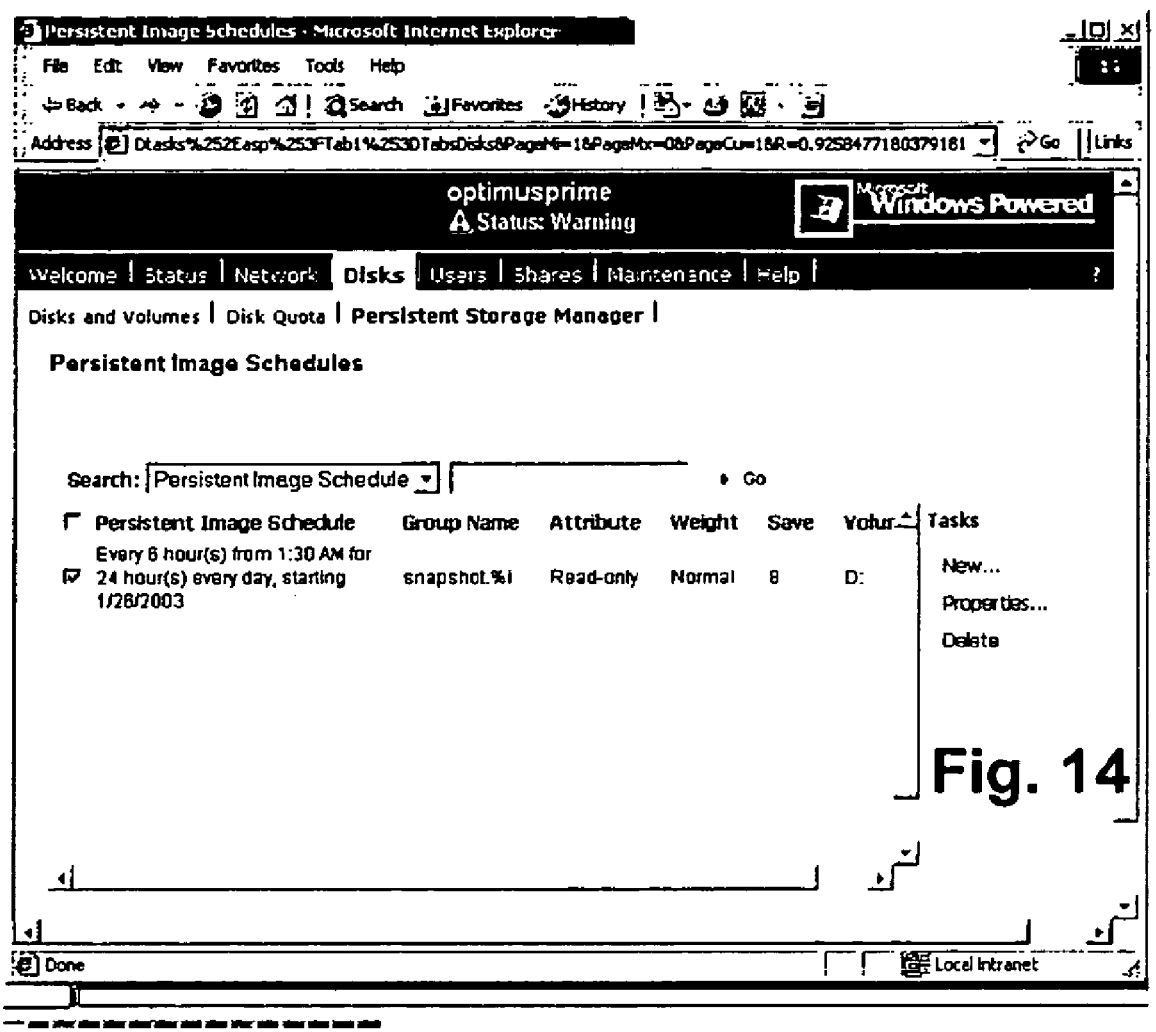
Figure 15:
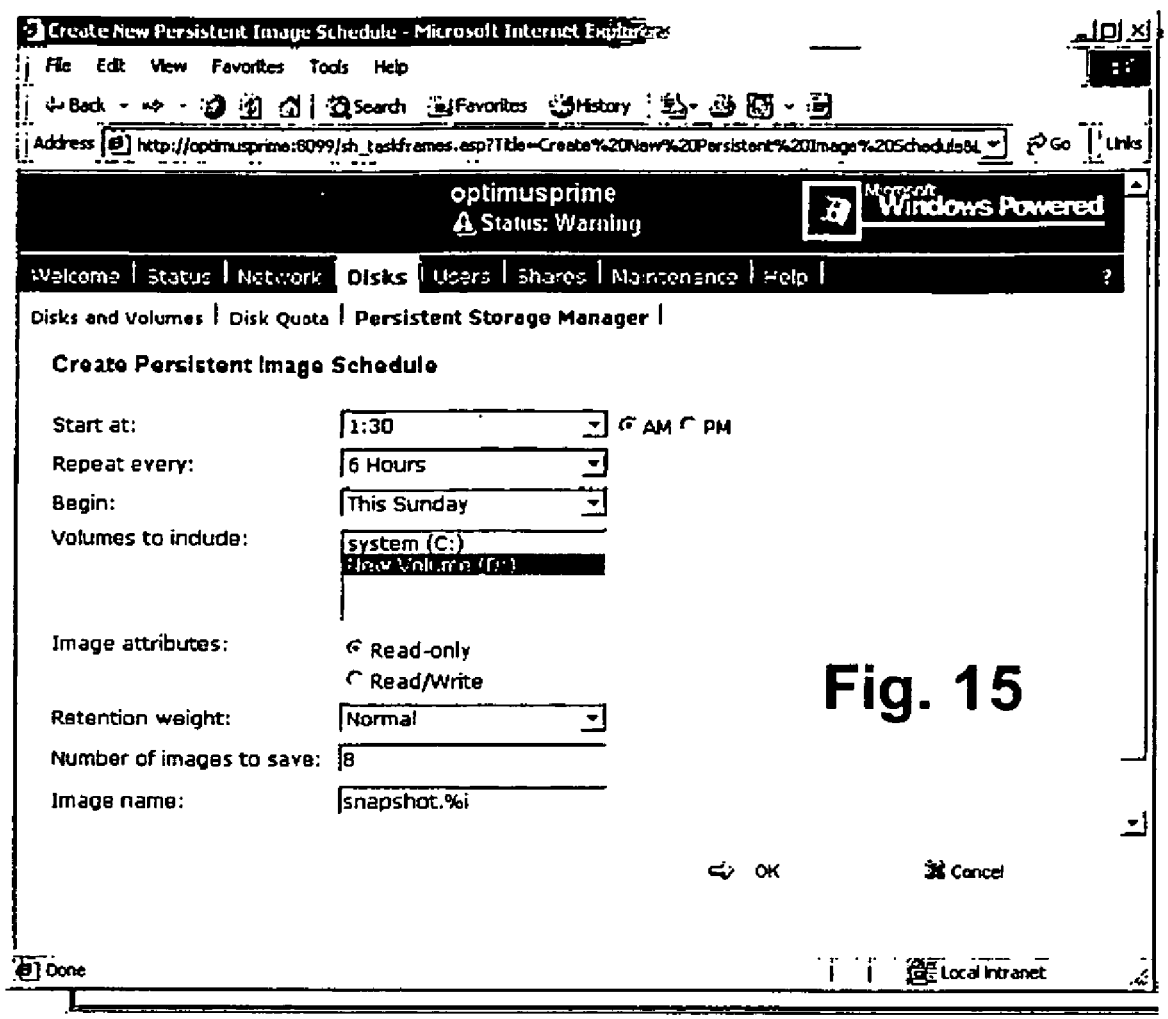
Figure 16:
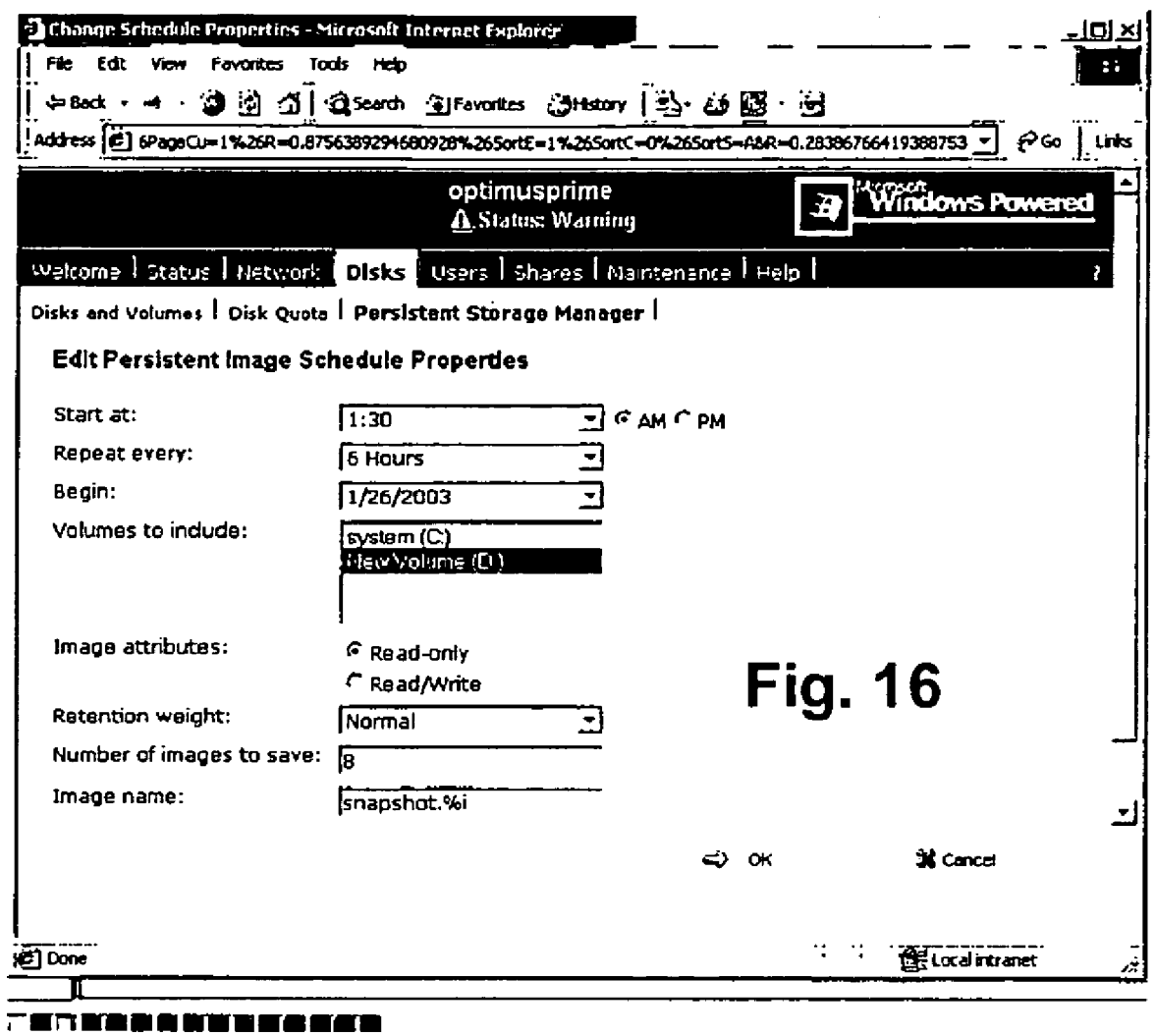

FIG. 14 illustrates a screen shot of the Schedules page. This page shows what snapshots are currently scheduled to be taken and relevant parameters of the same. The button on the right called "New" allows the user to schedule a new snapshot, which occurs on the page shown in FIG. 15. The button on the right called "Properties" enables the user to edit a number of properties and variables associated with the specific scheduled snapshot selected by the box to the left of the page, which occurs on the page shown in FIG. 16. The button on the right called "Delete" allows the user to delete a selected scheduled snapshot.

Figure 17:
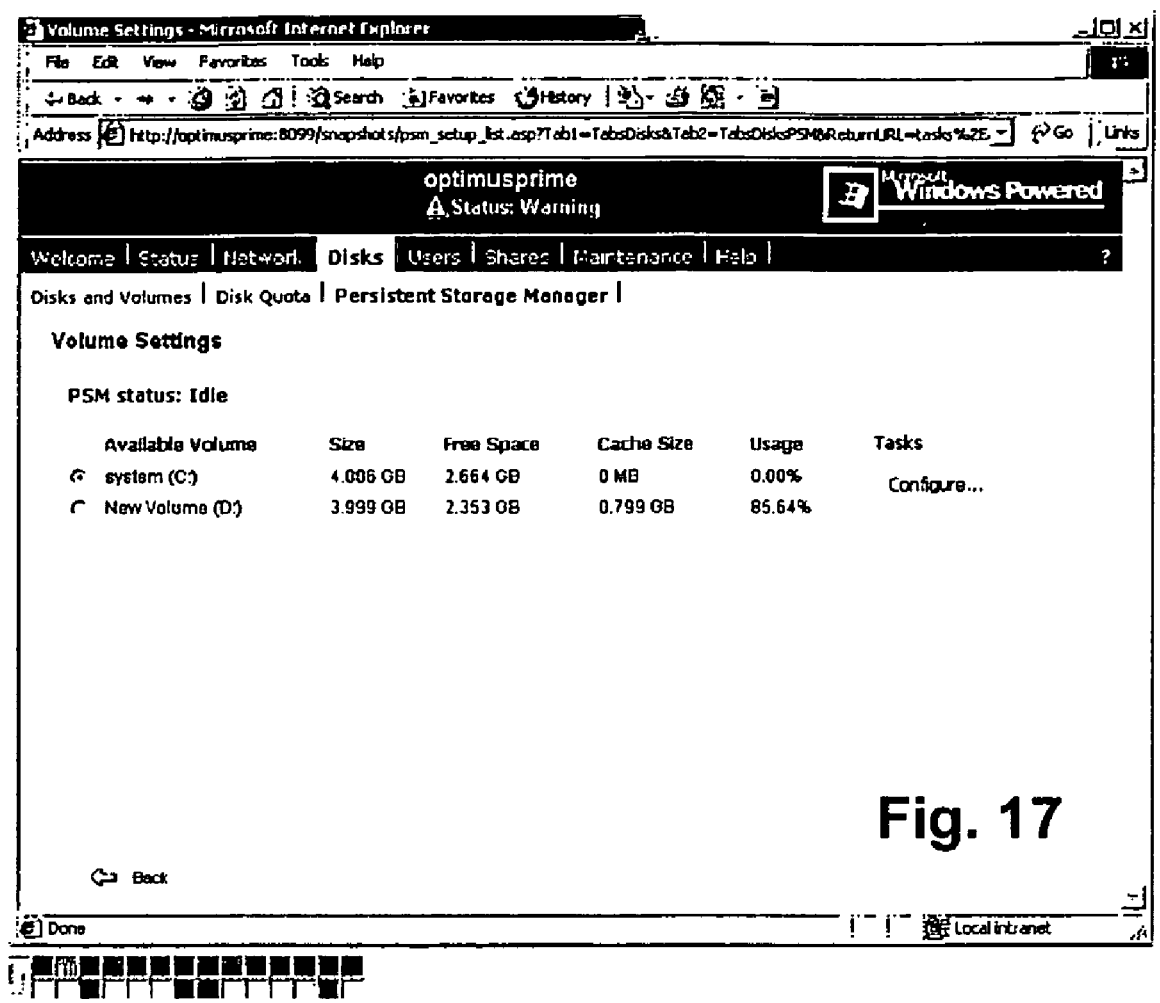
Figure 18:
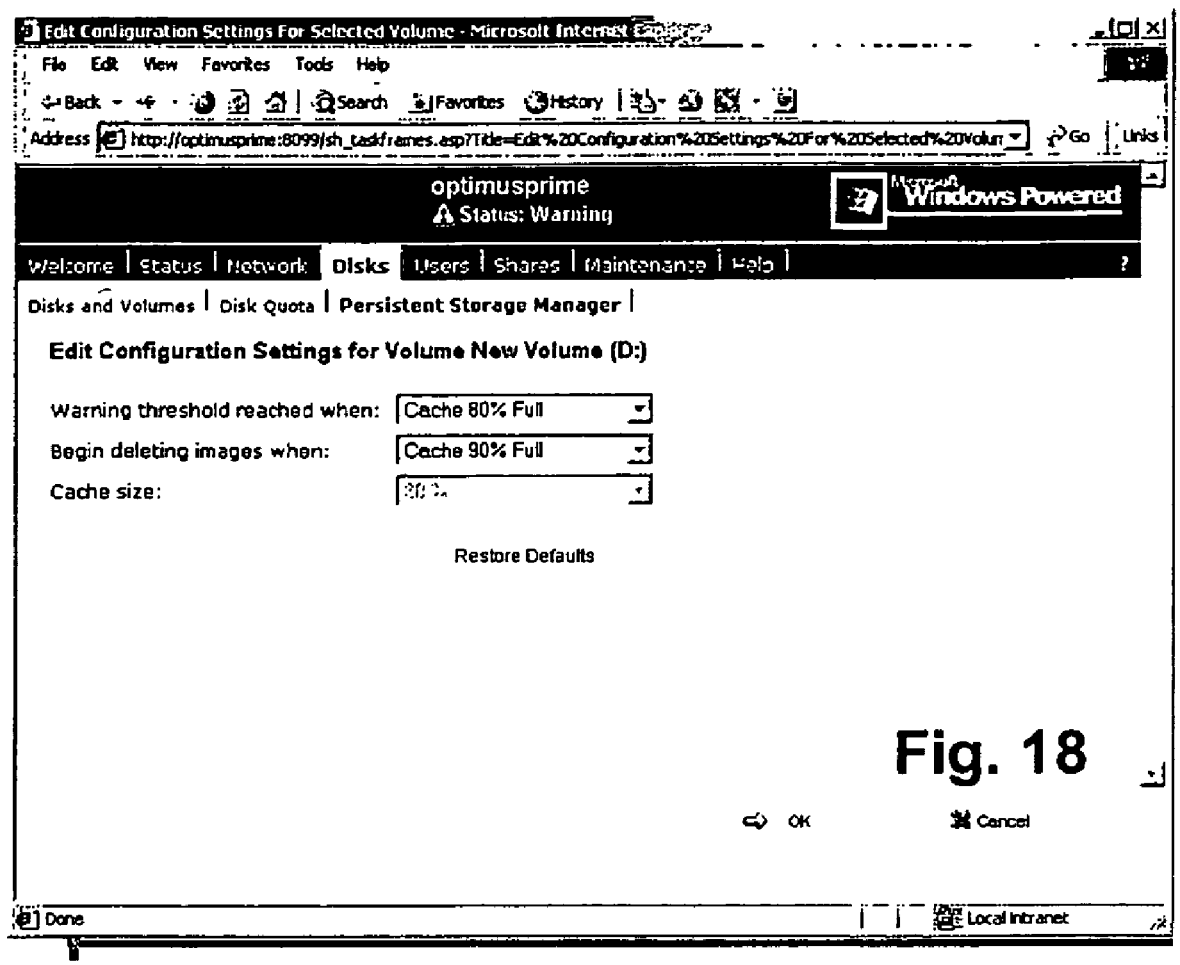

FIG. 17 illustrates a screen shot of the Volume Settings page. This page lists all available volumes that may be subject to snapshots. By selecting one of the listed volumes and the button on the right called "Configure," the user is taken to the screen shot shown in FIG. 18, in which the user is enabled to edit configuration settings for the selected volume.

Figure 19:
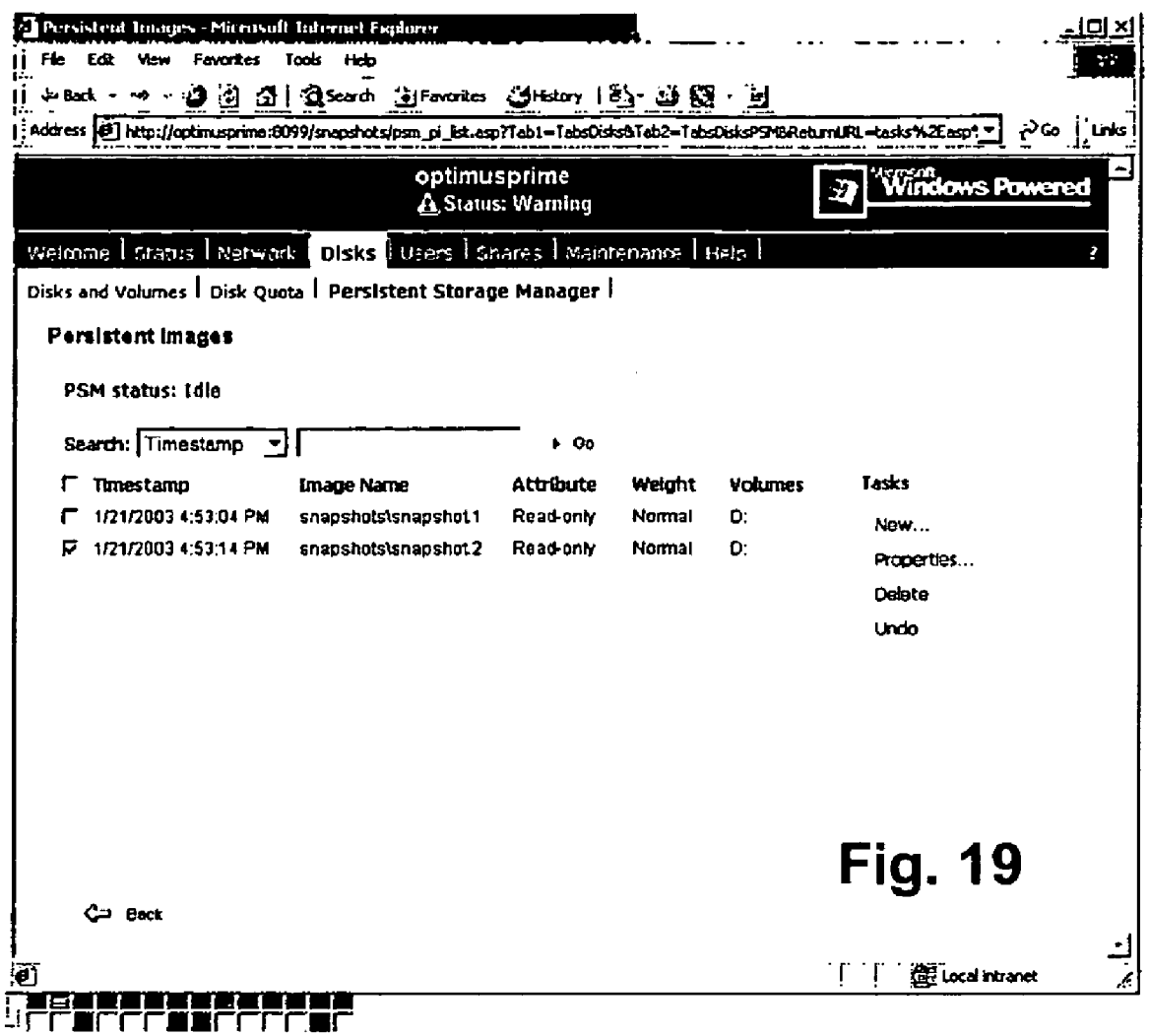
Figure 20:
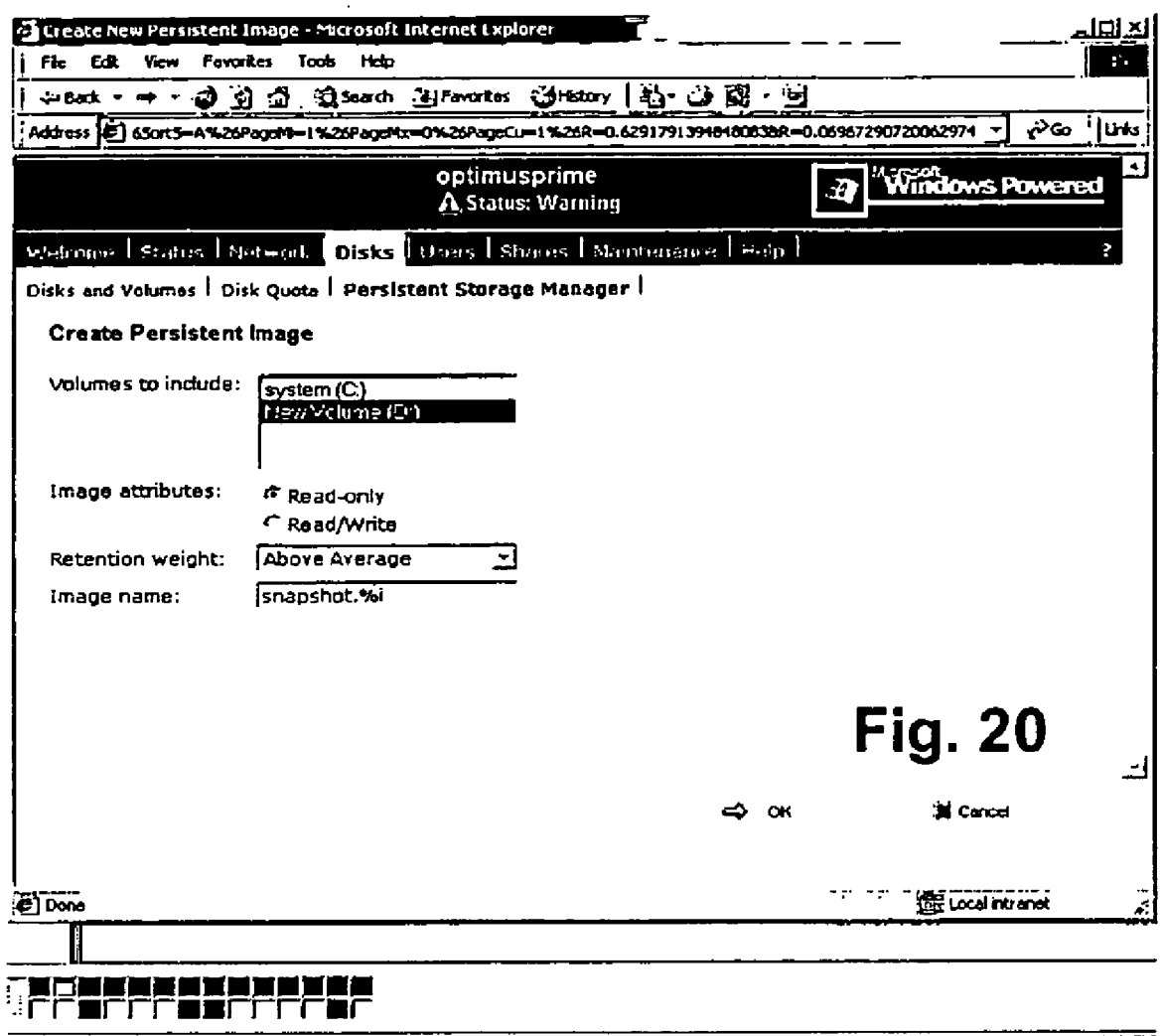
Figure 21:
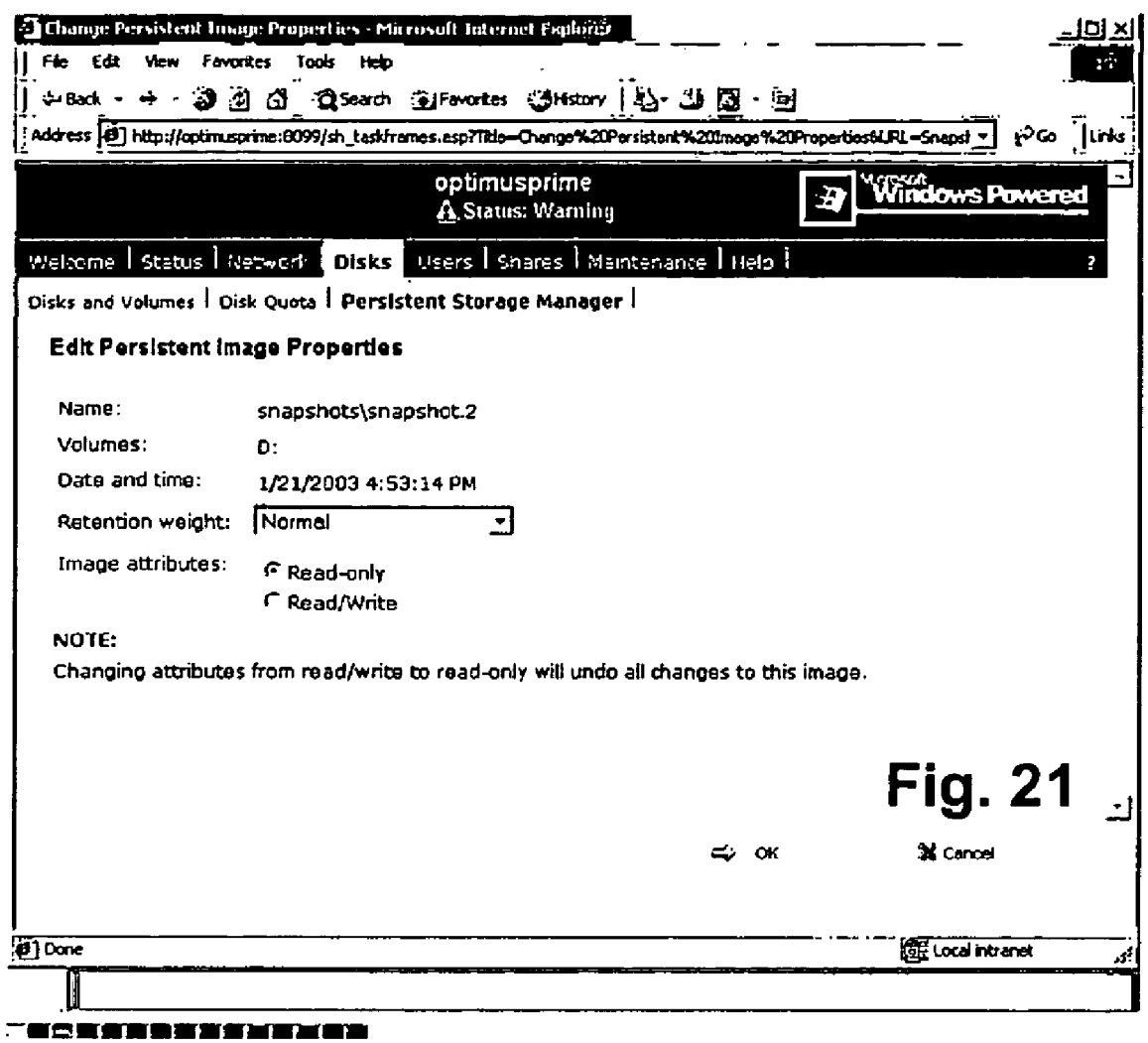
Figure 22:
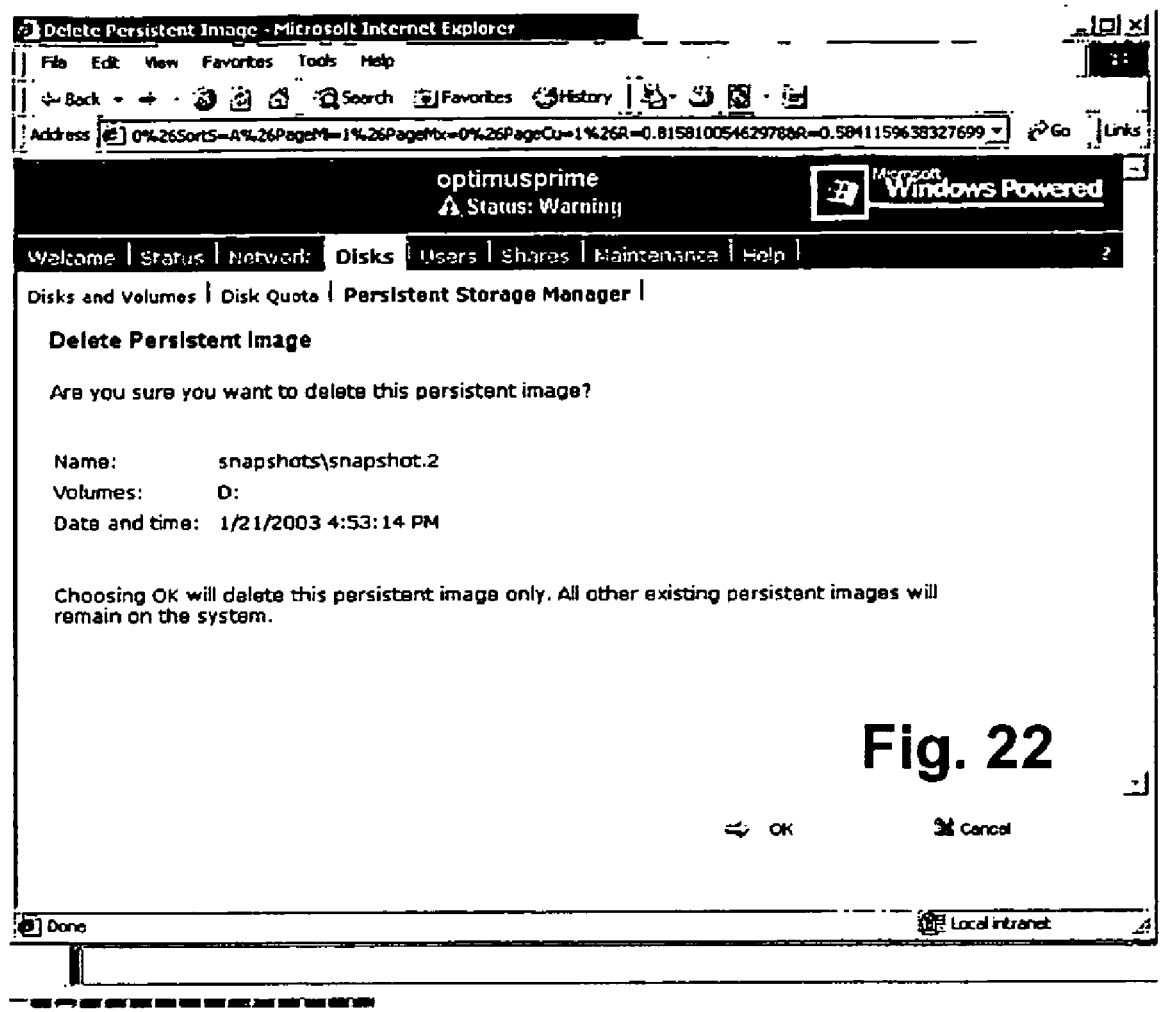
Figure 23:
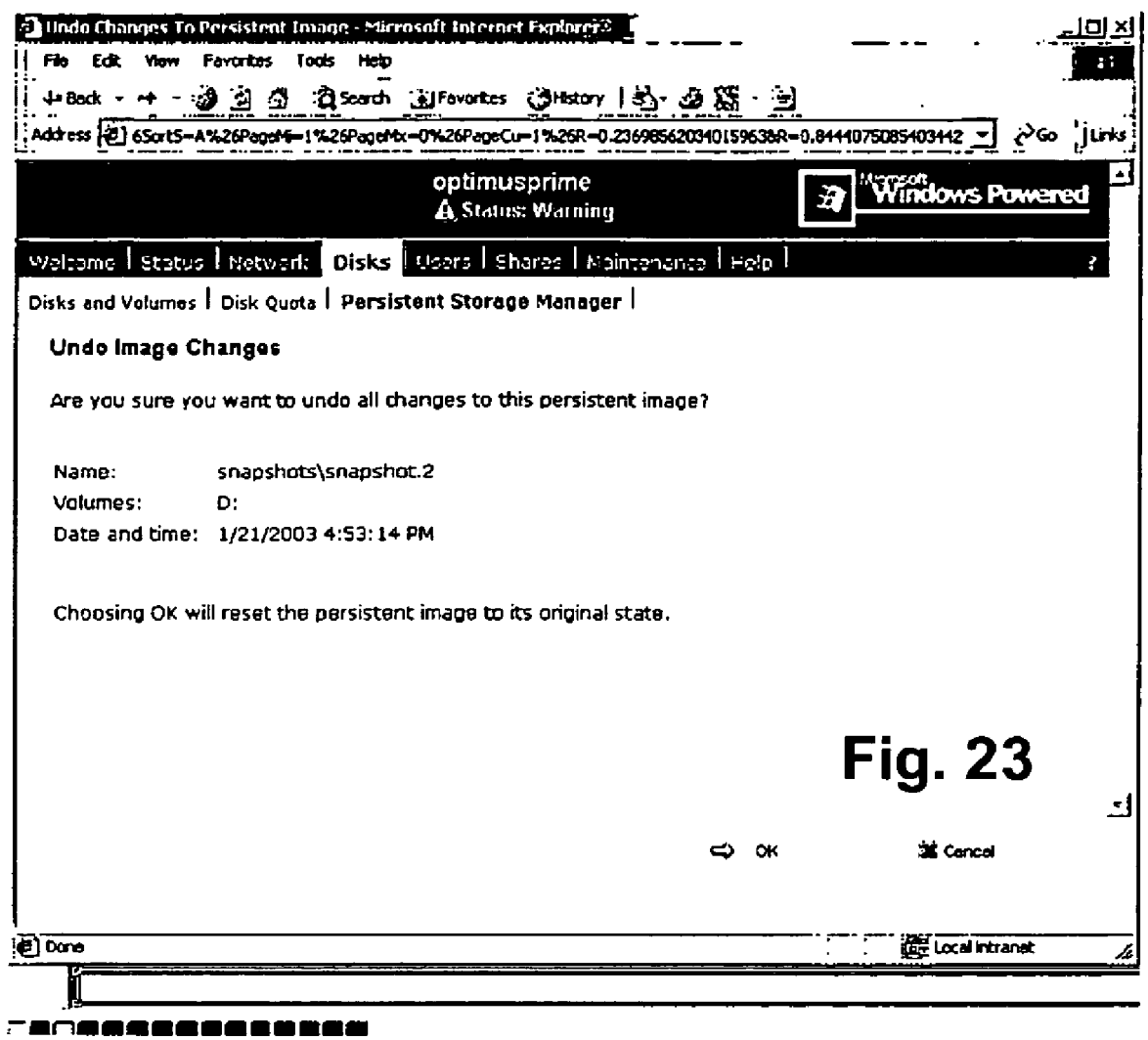

FIG. 19 illustrates a screen shot of the Persistent Images page. This page lists the persistent images currently being stored on the system. The user has several button options on the right hand side. By selecting "New," the user is taken to the page shown in FIG. 20, in which the user is able to create a new persistent image. By selecting "Properties," the user is taken to the page shown in FIG. 21, in which the user is able to edit several properties for a selected persistent image. By selecting "Delete," the user is taken to the page shown in FIG. 22, in which the user is able to confirm that he wants to delete the selected persistent image. Finally, by selecting "Undo," the user is taken to the page shown in FIG. 23, in which the user is able to undo all changes (e.g. "writes") to the selected persistent image. Choosing "OK" in FIG. 23 resets the persistent image to its original state.

Figure 24:
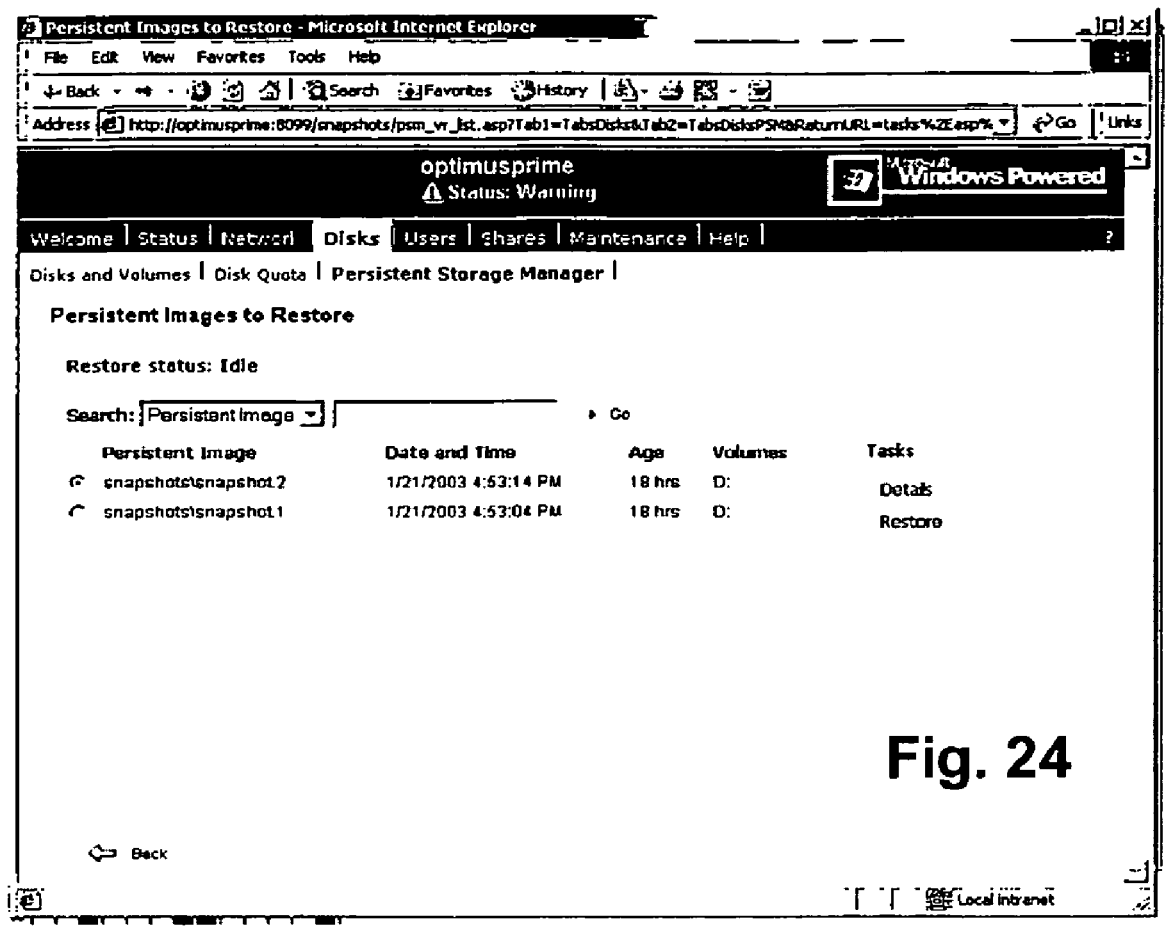
Figure 25:
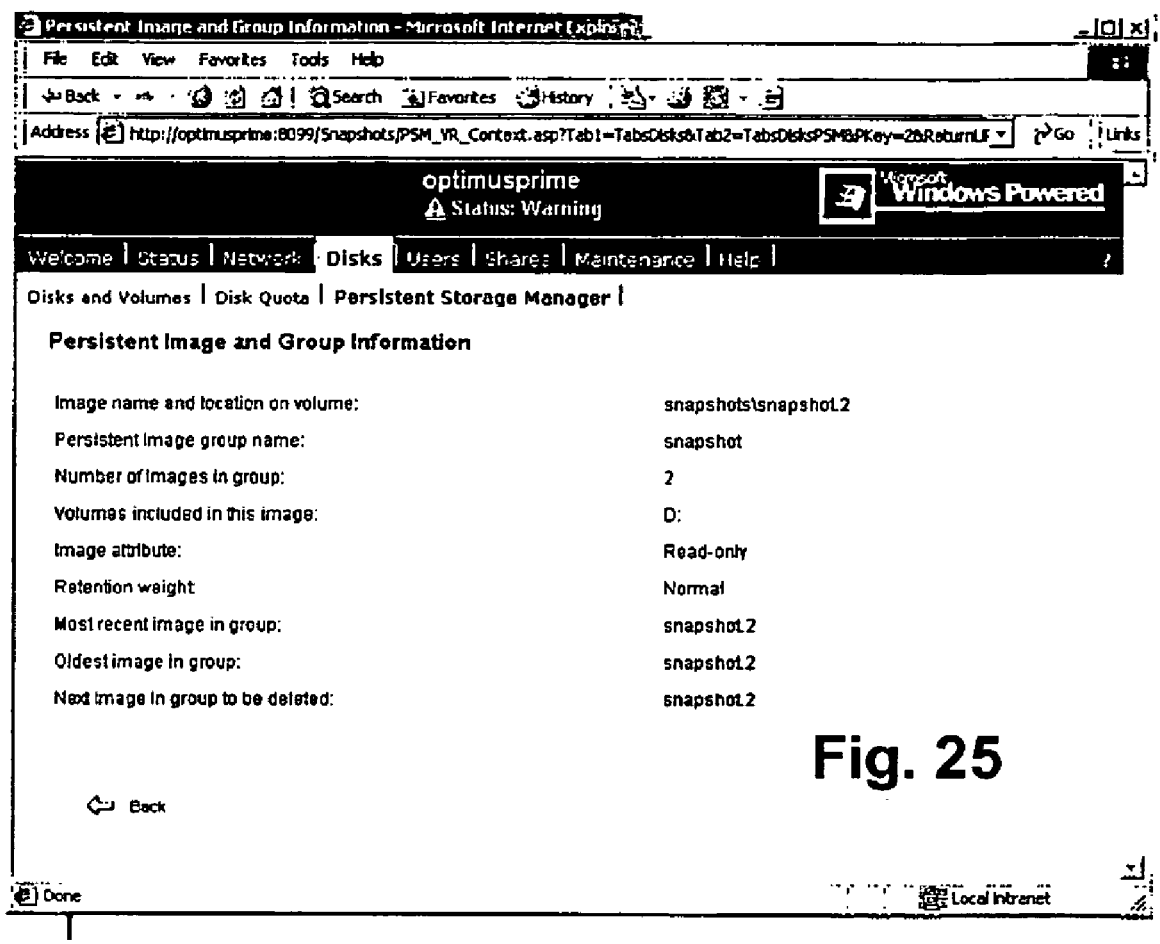
Figure 26:
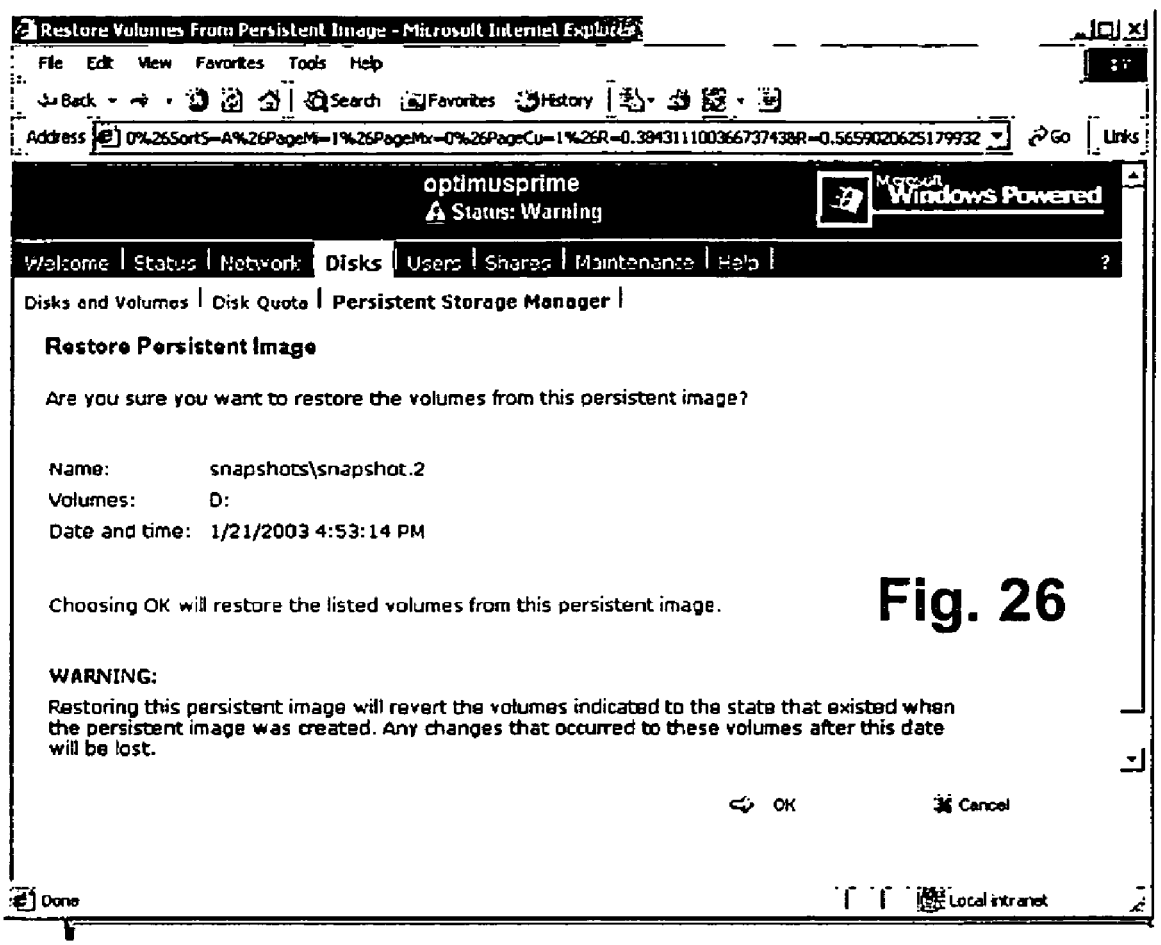

FIG. 24 illustrates a screen shot of the Persistent Images to Restore page. This page lists the persistent images currently being stored on the system and to which the user can restore the system, if desired. The user has several button options on the right hand side. By selecting "Details," the user is taken to the page shown in FIG. 25, in which the user is presented with detailed information about the selected persistent image. By selecting "Restore," the user is taken to the page shown in FIG. 26, in which the user is asked to confirm that the user really wants to restore the current volume to the selected snapshot image.

Figure 27:
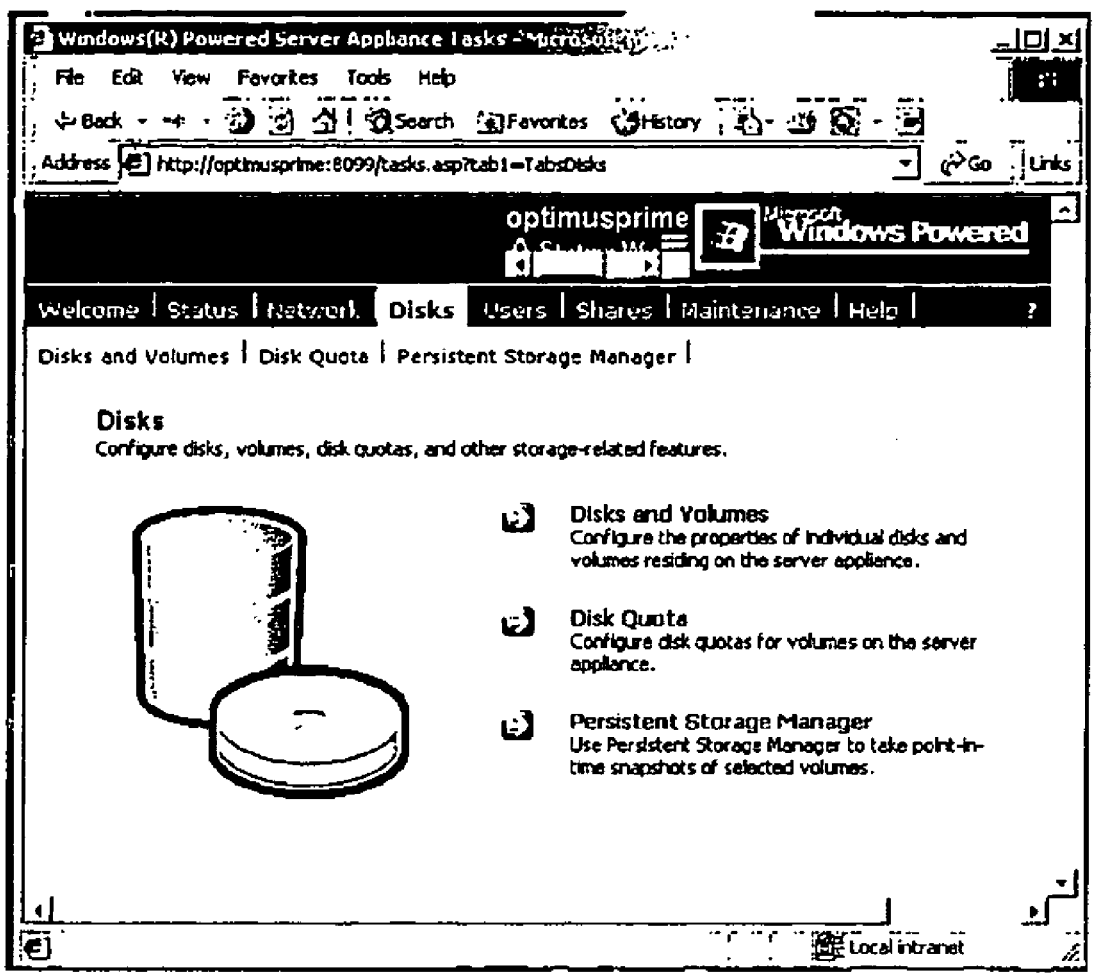
Figure 28:
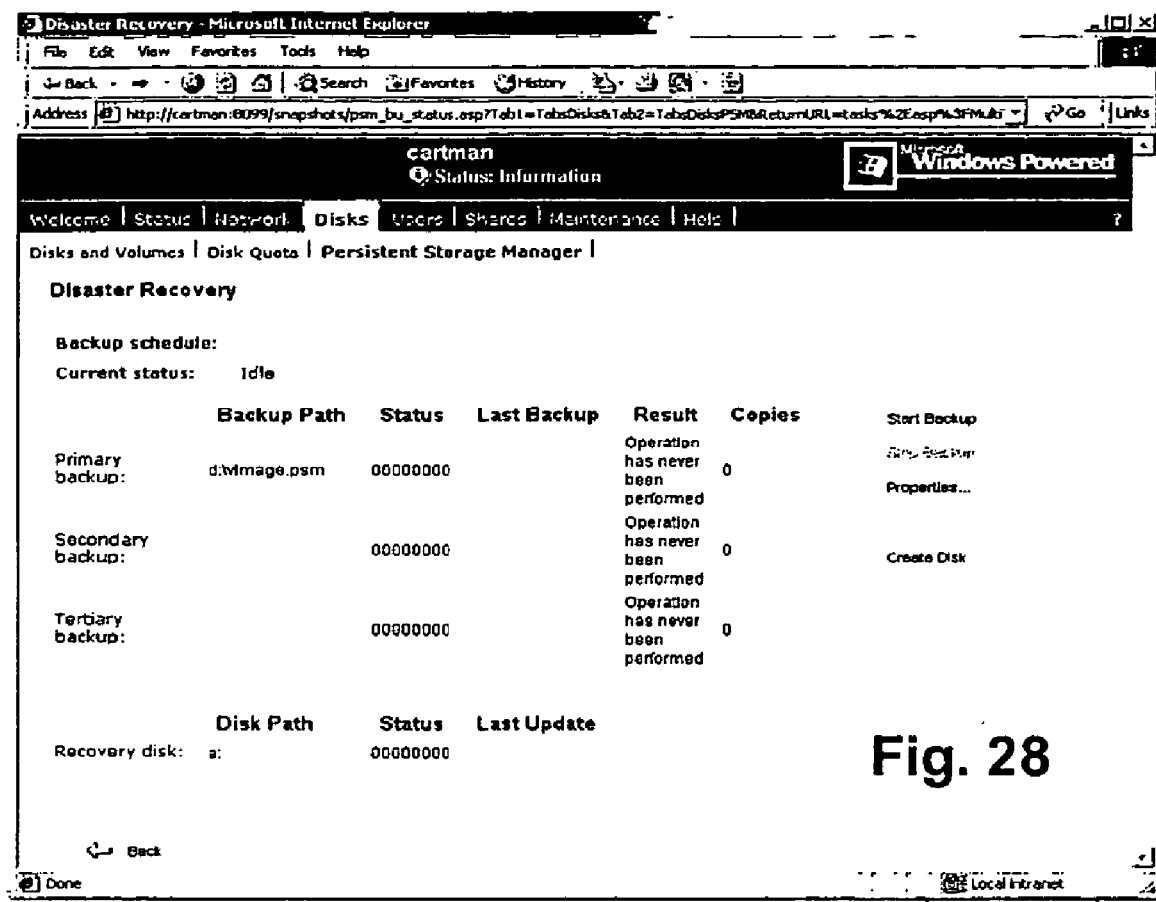
Figure 29:
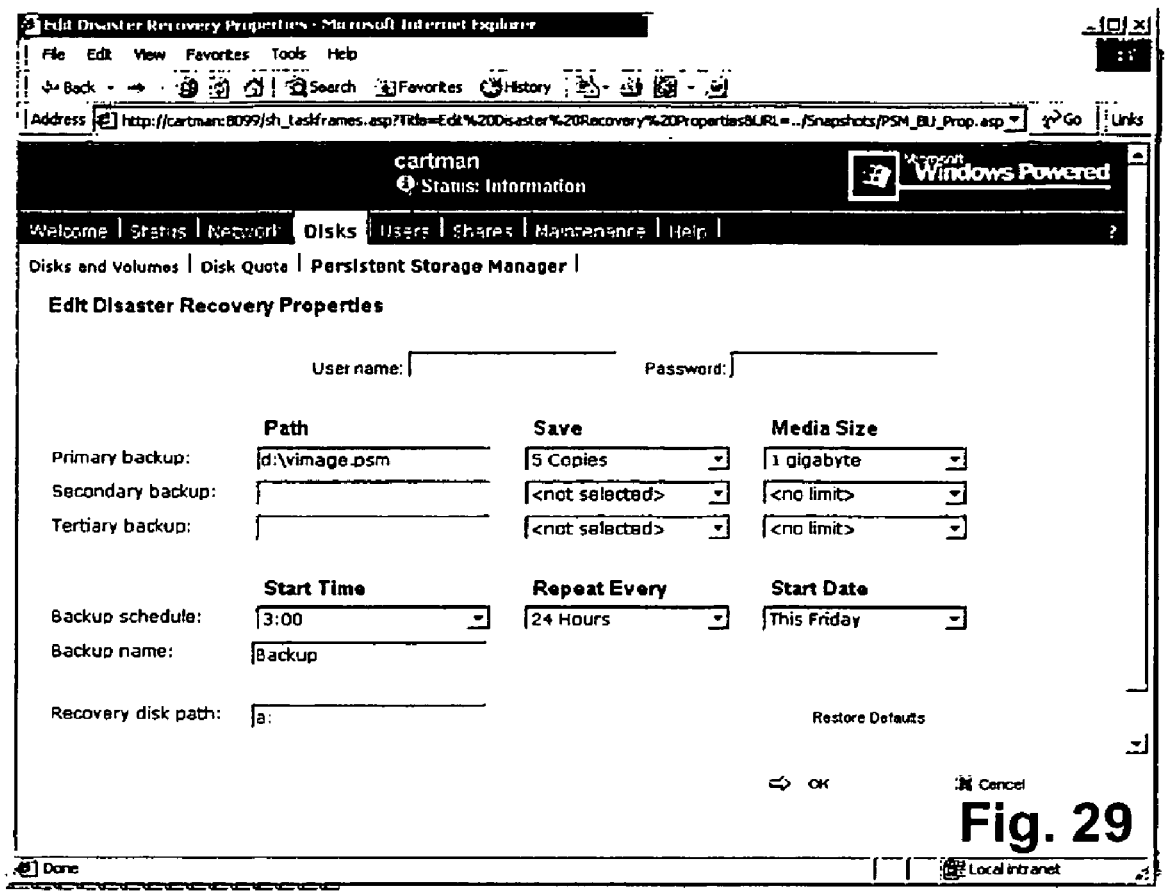
Figure 30:
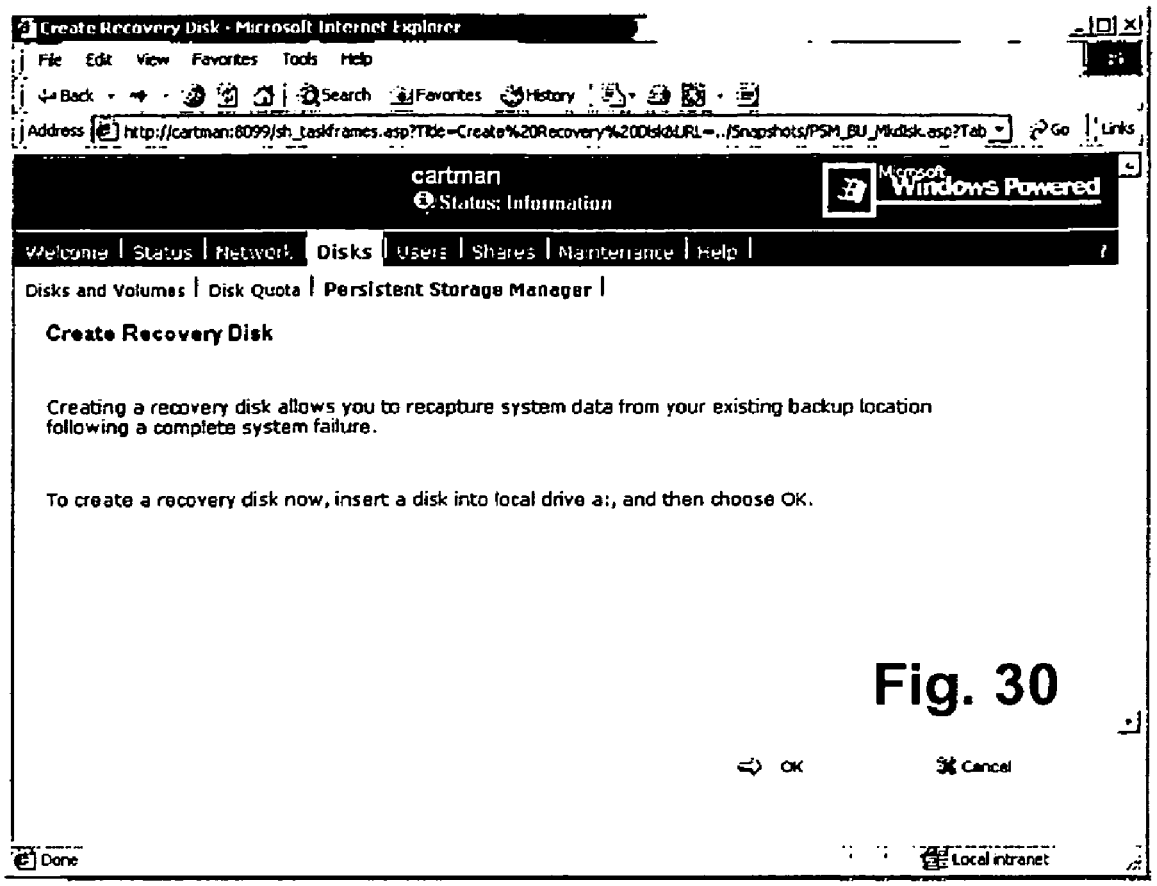
Figure 31:
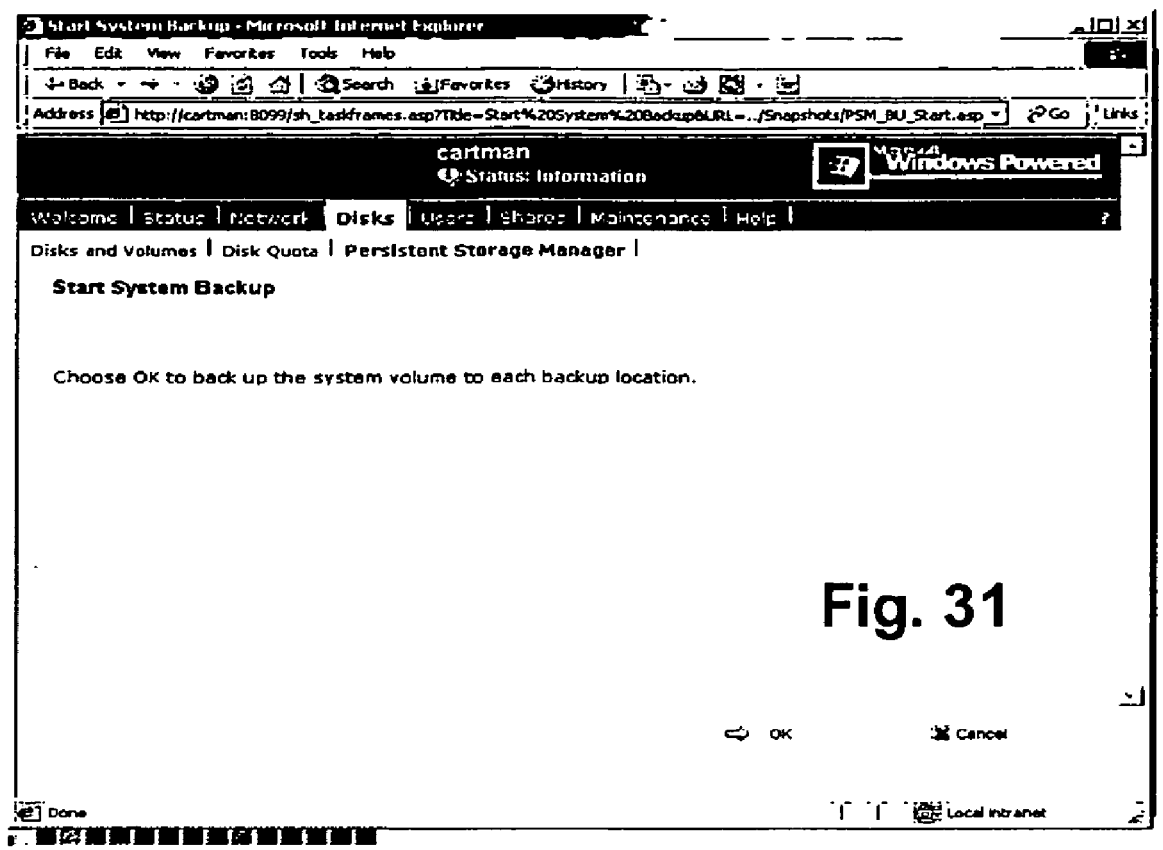

FIG. 27 illustrates a screen shot of the front page of the Disks and Volumes settings. By selecting "persistent Storage Manager," the user is taken to the page shown in FIG. 28, which displays the backup schedule currently being implemented for the server or computer. The user has several buttons on the right hand side of the page from which to choose. By selecting the "Properties" button, the user is user is taken to the page shown in FIG. 29, in which the user is able to specify when, where, and how backups of the system will be taken. For protection, this page is user and password protected. By selecting the "Create Disk" button, the user is taken to the page shown in FIG. 30, in which the user is able to request that a recovery disk be created. The recovery disk enables the user or system administrator to restore a volume in case of catastrophe. By selecting the "Start Backup" button, the user is taken to the page shown in FIG. 31, in which the user is able to confirm that he wants to start a backup immediately.

Figure 32:
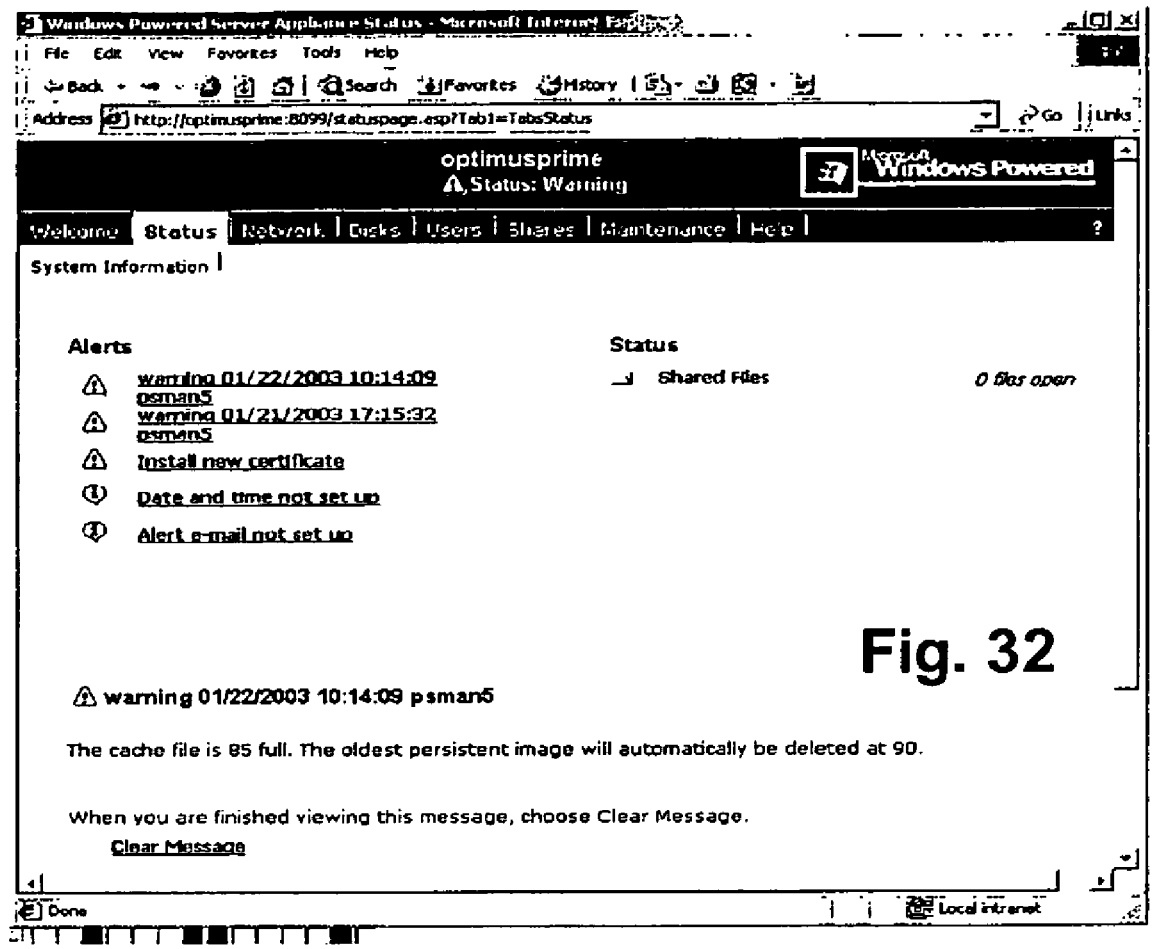

FIG. 32 merely illustrates a screen shot of the Status page presented, typically, to a system administrator. This page lists an overview of alerts and other information generated by the system that may be of interest or importance to the system administrator without requiring the administrator to view all of the previously described screens.

Hide and Unhide

Figure 34:
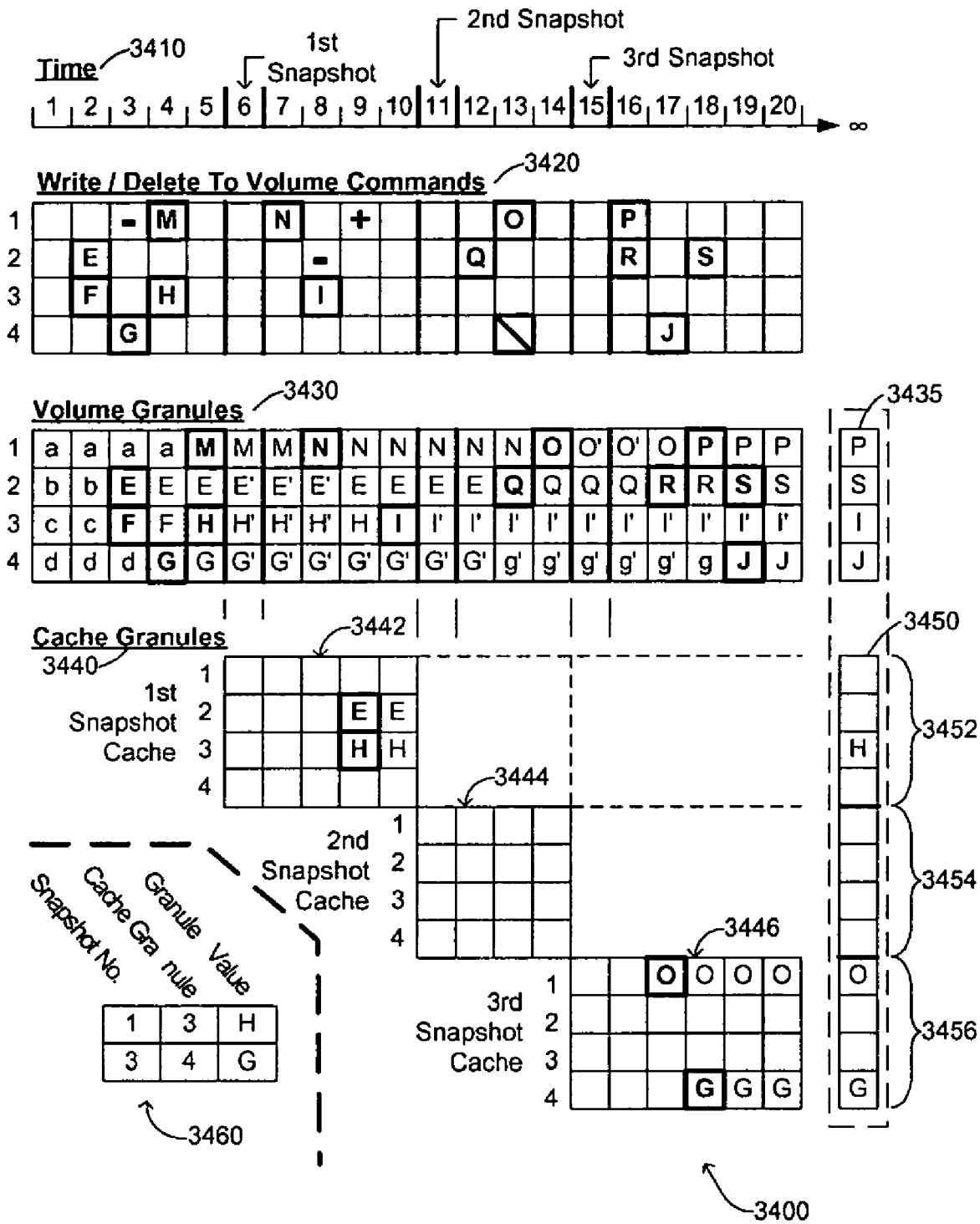
FIG. 34 is a graphical illustration of a series of exemplary disk-level operations performed by a preferred snapshot system of the present invention.

In accordance with a feature of a preferred method and system of the present invention, a volume address may be omitted from future snapshots, or hidden, as indicated by the minus sign in FIG. 34. It will be appreciated from a review of FIG. 34 that when a volume location is identified as no longer being subject to a snapshot, data at that location is not preserved before being replaced upon a write to that location even if there was a snapshot taken of the volume between the time that the omit command was made and the subsequent write occurred. Furthermore, it will be apparent from a review of FIG. 34 that a granule is not cached simply because an unhide command is given and then a write at that address occurs prior to any snapshot being taken. Conversely, if a granule needs caching at a location to which a hide command is given, then that granule is cached.

Tracking of Snapshot Data

Figure 35:
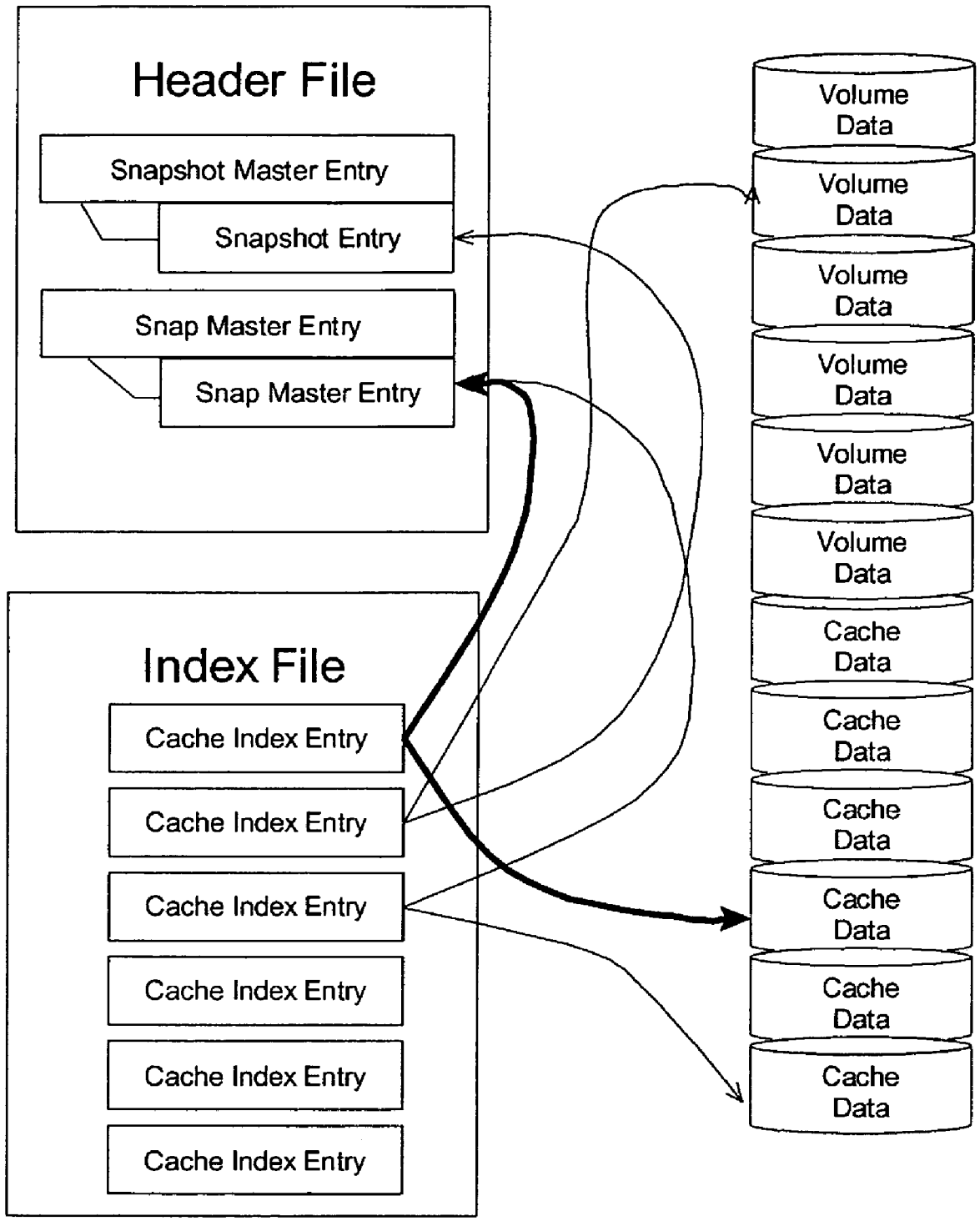
FIG. 35 is a diagram showing associations of various aspects of a preferred system of the present invention.
Figure 36:
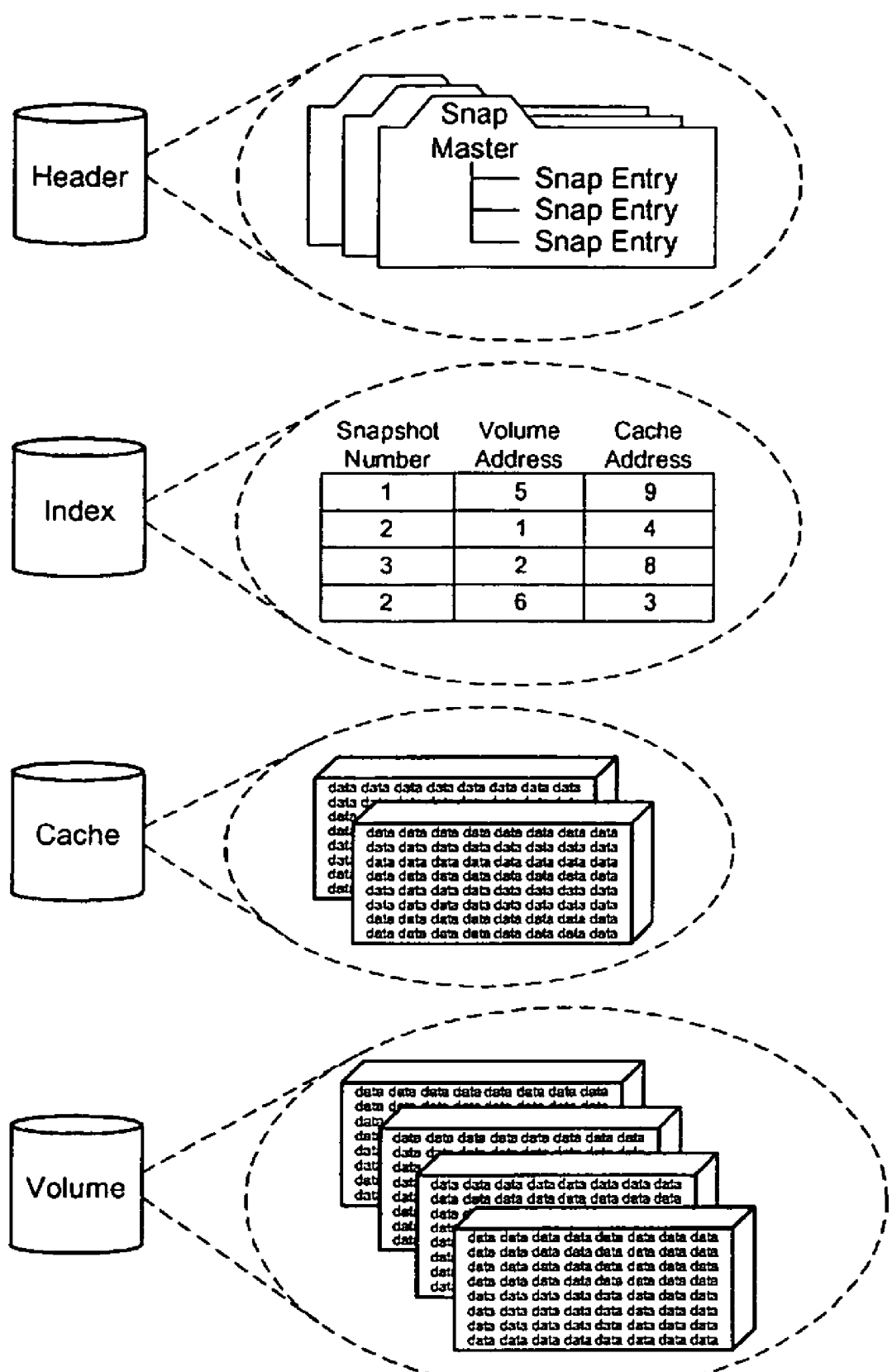
FIG. 36 is a diagram showing information contained in various components of a preferred system of the present invention.
Figure 37:
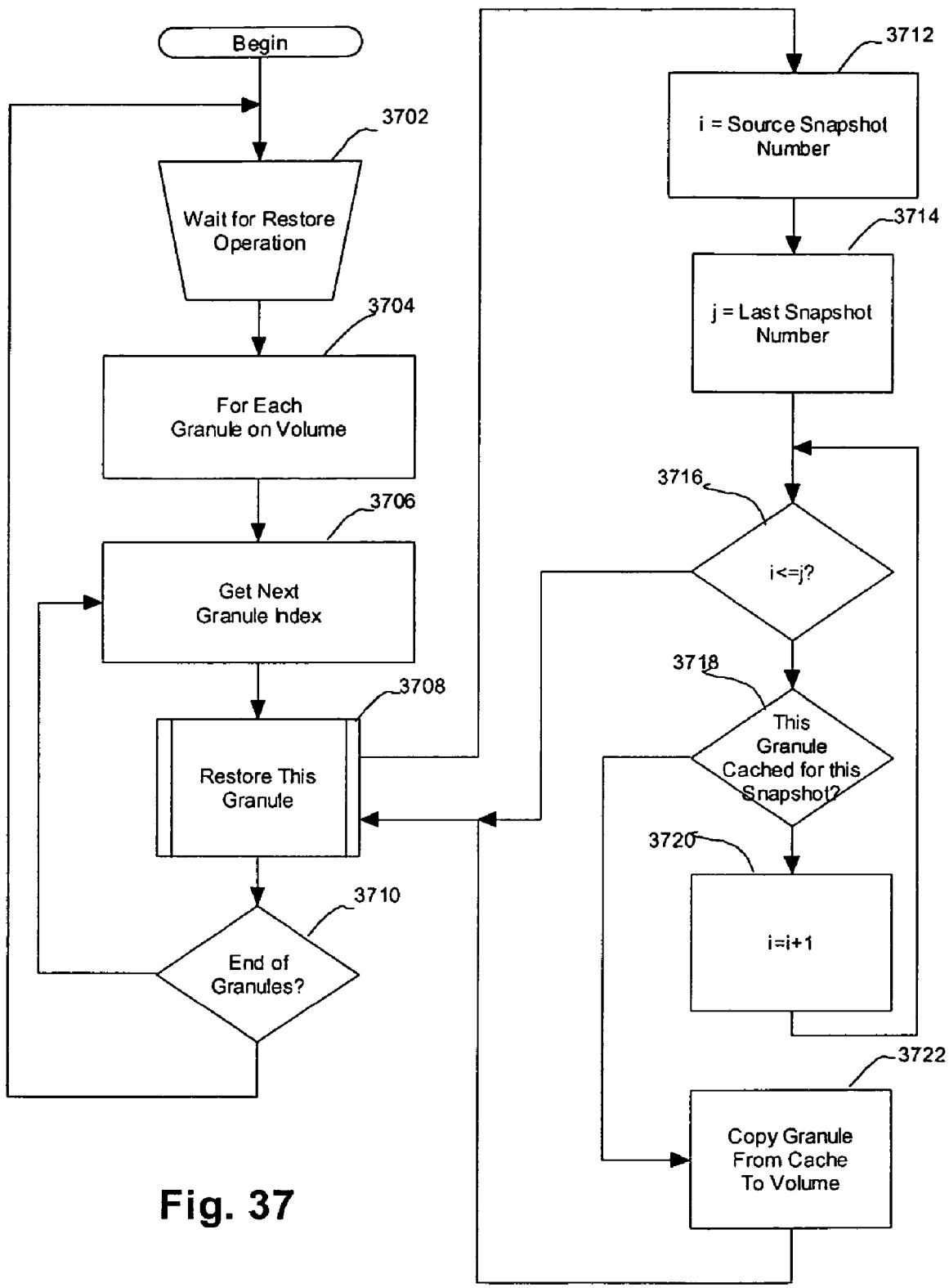
FIG. 37 is a flowchart showing method performed by a preferred embodiment of the present invention.

Snapshot data is tracked in order for the correct granule to be returned in response to reads from the snapshot. The logical structure for tracking snapshot data is illustrated in FIG. 35. A Header file is maintained on the volume (but is excepted from the data preservation method) and is utilized to record therein information about each snapshot. Specifically, the Header file includes a list of Snap Master records, each of which includes one or more Snapshot Entries. Each Snap Master corresponds to a data group (e.g., snapshots taken at the same time) and, in turn, each Snapshot Entry corresponds to a snapshot for a volume. Each Snapshot Entry includes Index Entries referenced by an Index file, which for respective snapshots map volume addresses to cache addresses where snapshot data has been cached. The physical structure of the Header file, Index file, Cache file (also referred to as a diff file), and volume are illustrated in FIG. 36. Basically, the Header file, Index file, and cache are all that is required to locate the correct snapshot data for a given snapshot. Furthermore, the Header file, Index file, and cache all comprise files so that upon a powering down of the computer, the information is not lost. Indeed, the updates to these files also is conducted in a manner so that upon an unexpected powering down or system crash during a write to the Header file, Index file, or cache, or committing of a write to the volume that replaces snapshot data, the integrity of the volume is maintained.

Snapshot Delete and Cache Scavenge

In another aspect of the present invention, there may be times when it is necessary or desirable to delete snapshots being maintained by the system of the present invention. Snapshot deletion requires some actions that are not required in less sophisticated systems. Since each snapshot may contain data needed by a previous snapshot, simply releasing the index entries (which are typically used to find data stored on the volume or in cache) and "freeing up" the cache granules associated with the snapshot may not work. As will be recalled from the above discussions, it is sometime necessary to consult different snapshot caches when trying to read a particular one; thus, there is a need for a way to preserve the integrity of the entire system when deleting undesired snapshots.

The present invention processes such deletions in two phases. First, when a snapshot is to be deleted, the snapshot directory is unlinked from the host operating system, eliminating user access. The snapshot master and each associated snapshot entry header records are then flagged as deleted. Note that this first phase does not remove anything needed by a previously created snapshot to return accurate data.

The second, or "scavenger," phase occurs immediately after a snapshot is created, a snapshot is deleted, and a system restart. The scavenger phase reads through all snapshot entries locating snapshots that have been deleted. For each snapshot entry that has been deleted, a search is made for all data granules associated with that snapshot that are not primed or required by a previous snapshot. Each such unneeded granule is then released from the memory index, the file index, and the cache file. Other granules that are required to support earlier snapshots remain in place.

When the scavenger determines that a deleted snapshot entry contains no remaining cache associations, it is deleted. When the last snapshot entry associated with a snapshot master entry is deleted, the snapshot master is deleted.

Persistence: Snapshot Reconstruction

In another aspect of the present invention, when the system computer is restarted after a system shutdown (whether intentional or through a system failure), the snapshot header and index files are used to reconstruct the dynamic snapshot support memory contents.

On restart, the memory structures are set to a startup state. In particular, a flag is set indicating that snapshot reconstruction is underway, the primed map is set to all entries prime, and the cache granule map set to all entries unused. The header file is then consulted to create a list of snapshot master entries, snapshot entries, and address of the next available cache file granule.

During the remainder of the reconstruction process, writes may occur to volumes that have active snapshots. Prior to completion of snapshot reconstruction, granule writes to blocks that are flagged prime are copied to the end of the cache file and recorded in a the memory index. The used cache granule map and next available granule address are likewise updated. One skilled in the art will appreciate that setting the prime table to all primed and writing only to the end of the granule cache file will record all first writes to the volume. At this phase, some redundant data is potentially preserved while the prime granule map is being recreated.

Each index entry is consulted in creation order sequence. Blank entries, entries that have no associated snapshot entry, and entries that are not associated with a currently available volume device are ignored. Each other entry is recorded in the memory index. If any duplicate entries are located, the subsequently recorded entry replaces the earlier entry. An entry is considered a duplicate if it records the same snapshot number, volume granule address, and cache granule address. The age of index entries is indicated by a time stamp or similar construct placed in the file index entry when the entry was originally created.

At this stage in reconstruction, the index in memory is complete. Each snapshot will then be consulted to create the single system wide primed granule map and used cache map.

For each memory index entry for the snapshot the associated primed granule map element is cleared and the granule cache map entry set.

On completion the flag indication snapshot reconstruction is reset. The cache granule map, primed map, memory index, and file index have been restored to include the state at shutdown, as well as all preserved volume writes that occurred during the reconstruction process.

Restoration of System to Another State

A preferred embodiment of the present invention also provides restore functionality that allows restoration of a volume to any state recorded in a snapshot while retaining all snapshots. This is accomplished by walking through the index while determining which granules are being provided by the cache for the restored snapshot. Those volume granules are replaced by the identified granules from cache. This replacement operation is subject to the same volume protection as any other volume writes, so the volume changes engendered by the restore are preserved in the snapshot set. Figure illustrates steps in such a restore operation.

The operation begins at Step 3702 when a restore command is received. In Step 3704 a loop through all volume granule addresses on the system is prepared. At Step 3706 the next volume granule address is read. At Step 3708 a process restores the selected granule by searching for the selected granule in each snapshot index commencing with the snapshot to be restored (Step 3712) and ending with the most recent snapshot (Step 3716). The process 12 and 3714 establishes index and end counters to traverse the snapshots. Block 371 6 compares the index "i" to the termination value "j". If the comparison indicates that all relevant snapshots have been searched the current volume value is unchanged from the restoration snapshot and the process returns to 3708. Block 3718 determines if the selected granule has been cached for the selected snapshot. If so the process continues at 3722 replacing the volume granule data with the located cache granule data and continuing to 3708. If the granule is not located in 3718 then block 3720 will increment the snapshot index "i" and continue execution at 3714.

Figure 38:
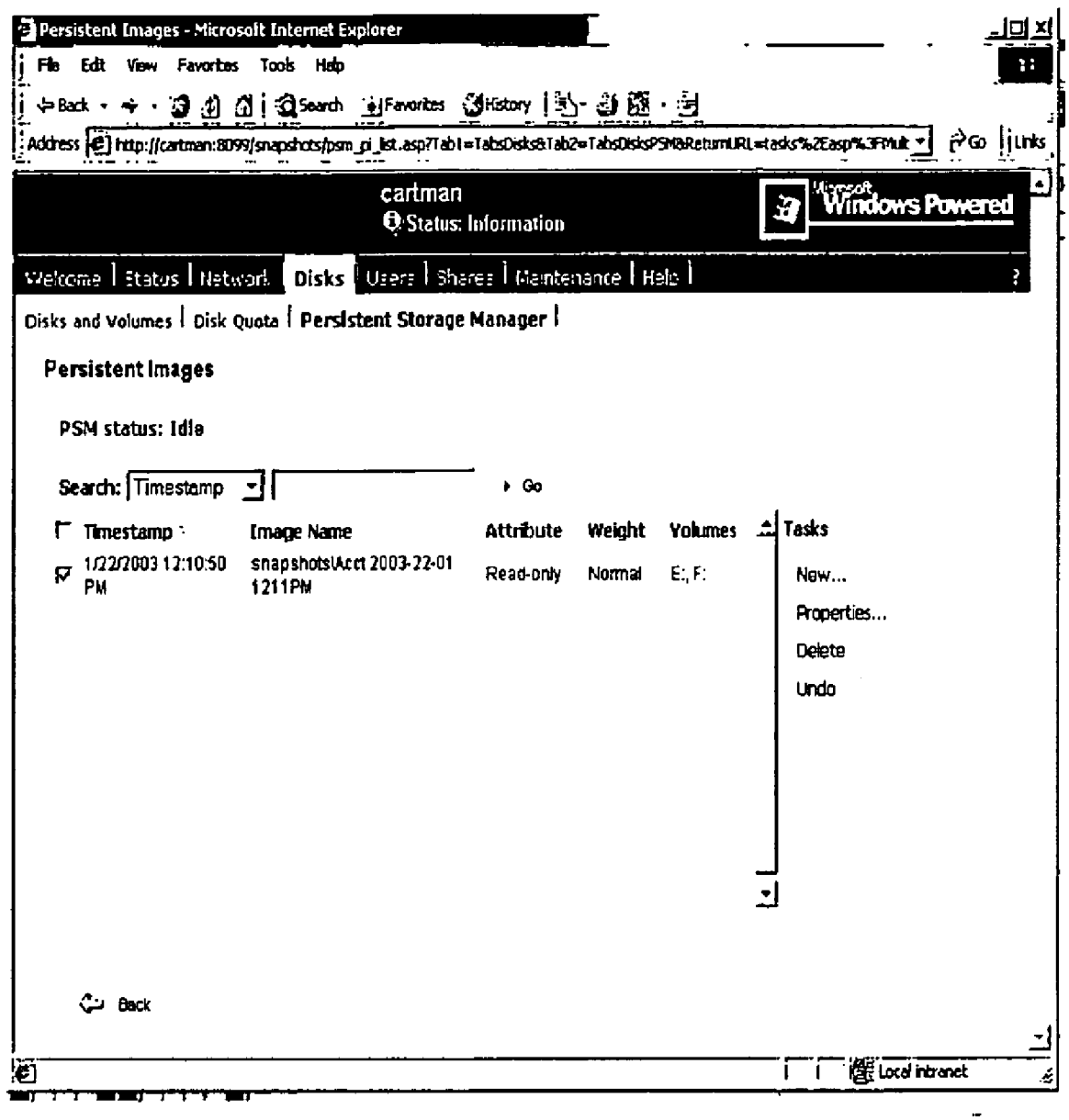
FIG. 38 is a screen shot of an exemplary user interface for use by a preferred embodiment of the present invention.
Figure 39:
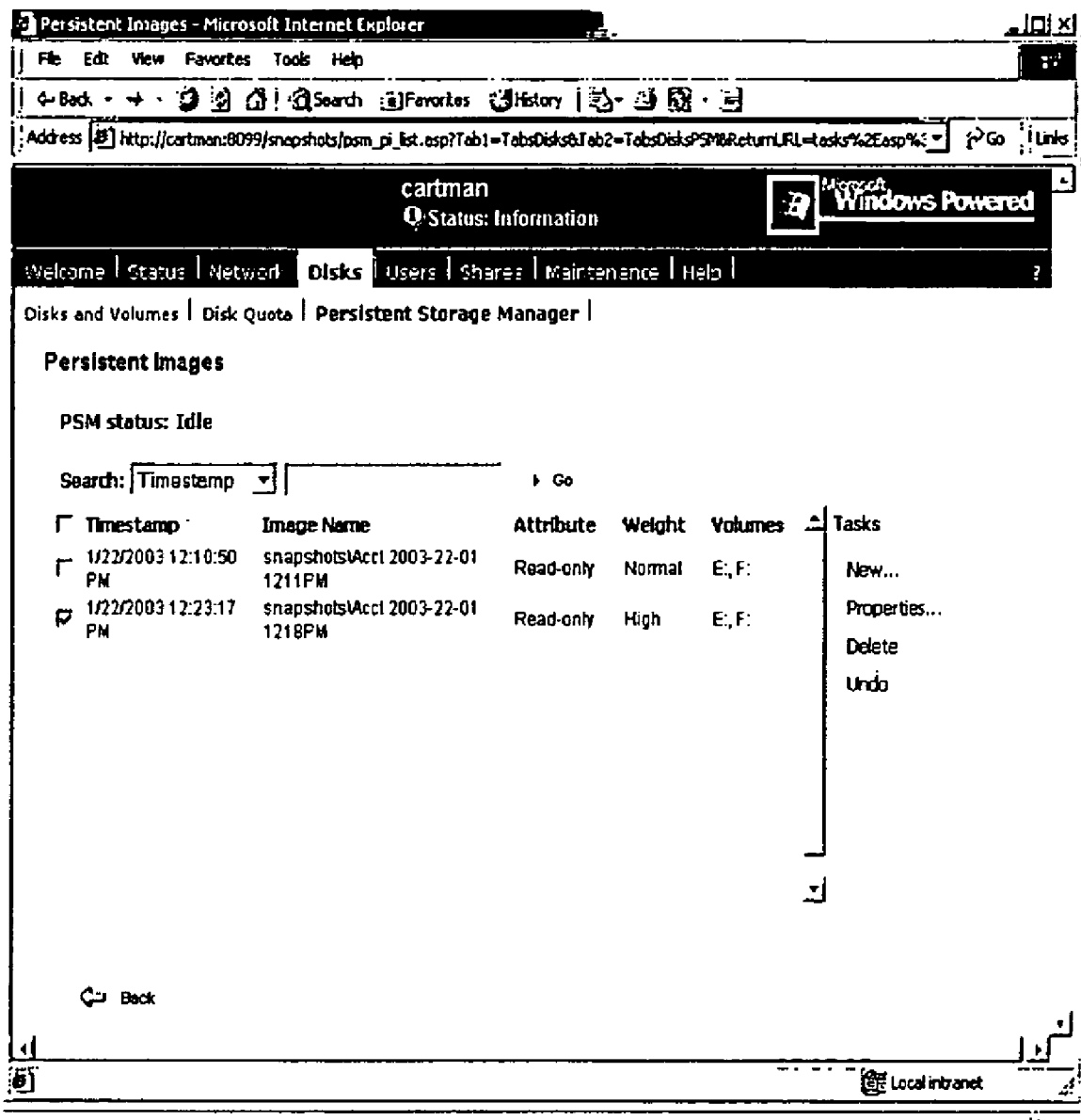
FIG. 39 is a screen shot of another exemplary user interface for use by a preferred embodiment of the present invention.
Figure 40:
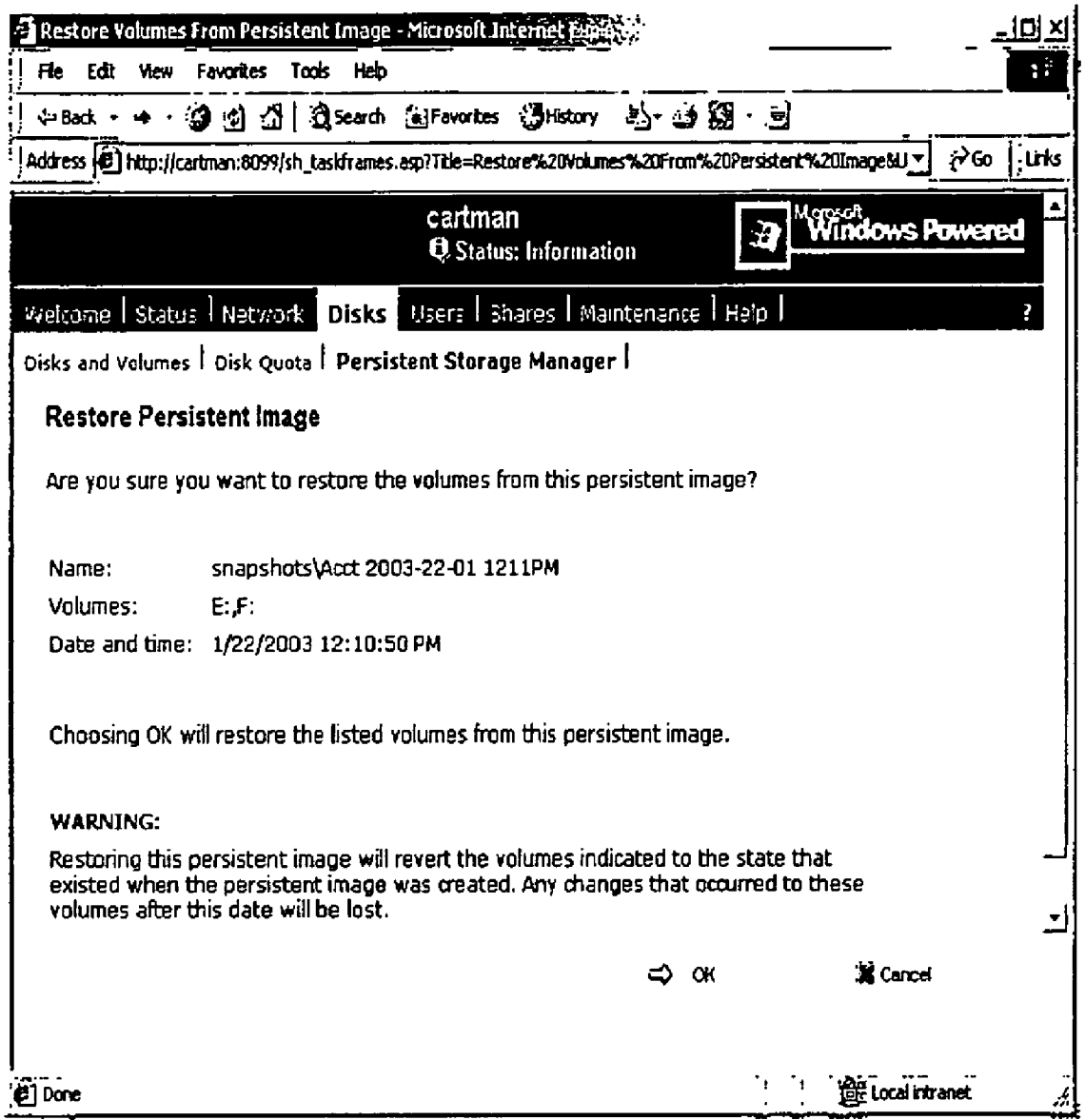
FIG. 40 is a screen shot of another exemplary user interface for use by a preferred embodiment of the present invention.
Figure 41:
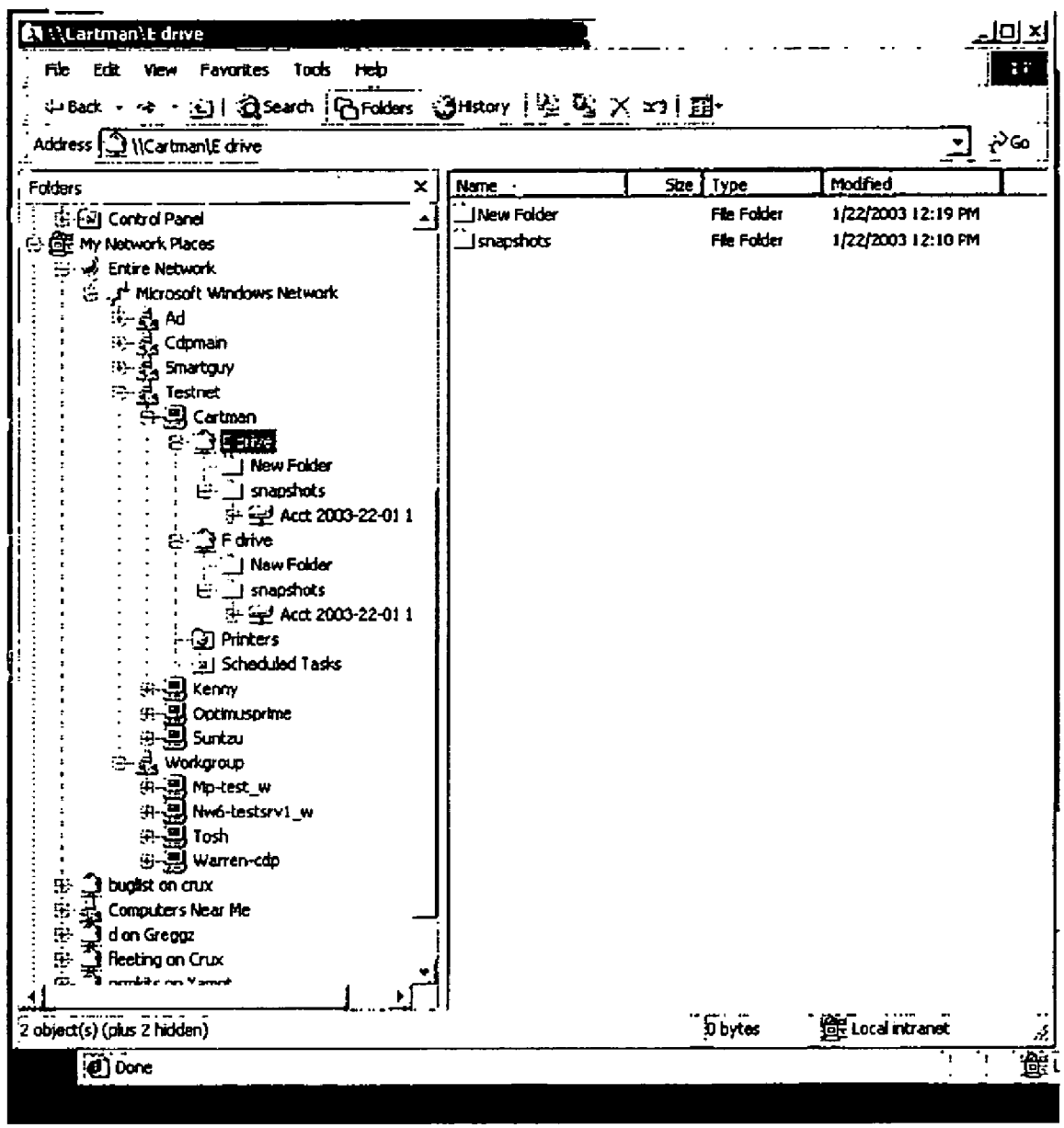
FIG. 41 is a screen shot of a folder tree as used by a preferred embodiment of the present invention.
Figure 42:
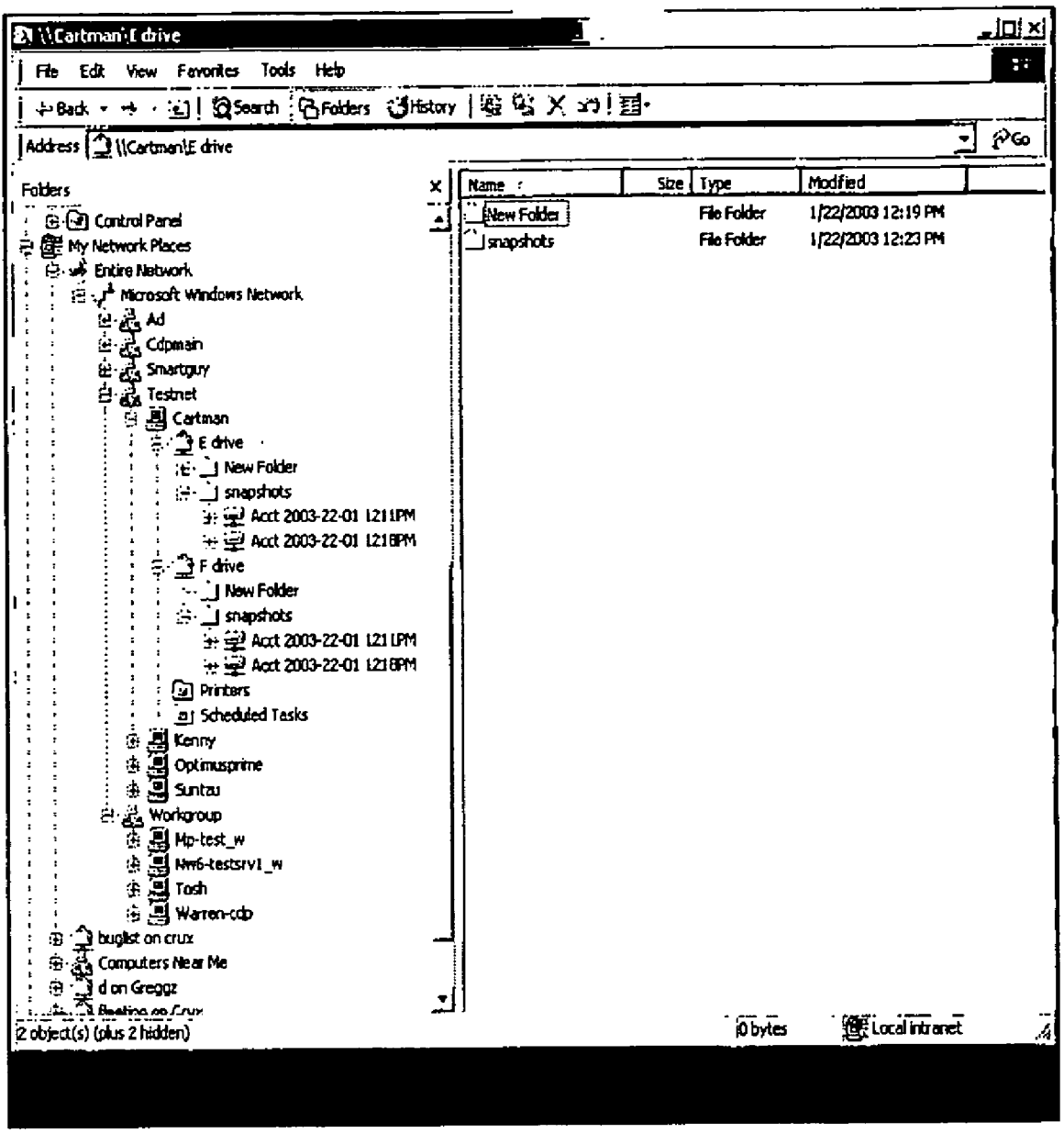
FIG. 42 is a screen shot of another folder tree as used by a preferred embodiment of the present invention.
Figure 43:
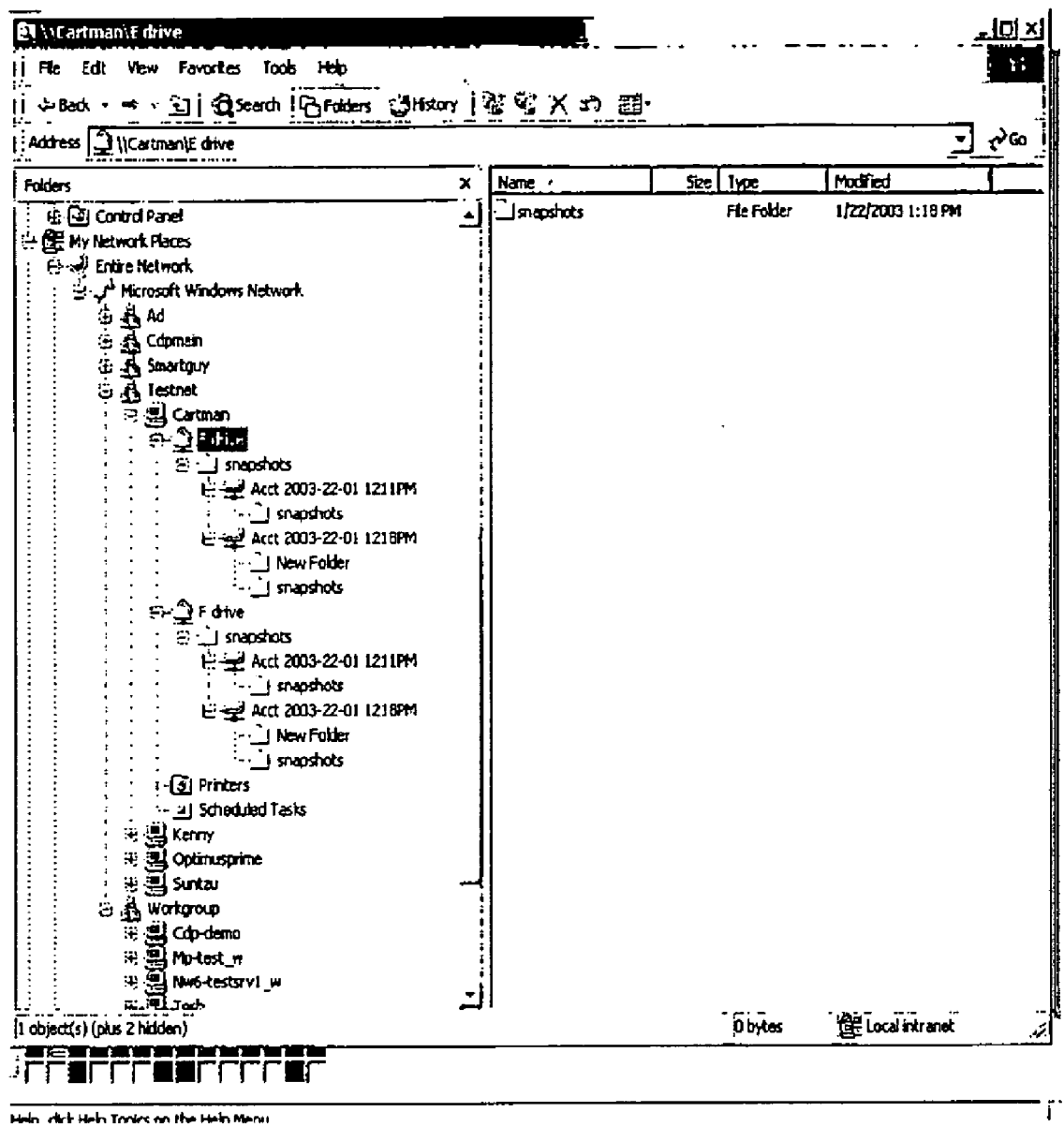
FIG. 43 is a screen shot of yet another folder tree as used by a preferred embodiment of the present invention.

The user experience in restoring the system to a previous snapshot is illustrated by screenshots in FIGS. 38 through 43. In FIG. 38, a snapshot has been taken at 12:11 PM of volumes E and F. Another snapshot is taken at 12:18 PM of volumes E and F as shown in FIG. 39. Furthermore, prior to the 12:18 PM snapshot but after the 12:11 PM snapshot a folder, titled "New Folder" was created on both volumes E and F, as shown in FIG. 41. Following the 12:18 PM snapshot, the user decides to restore the system to the state in which it existed at 12:11 PM. The user is presented a screen to confirm his intention to perform the restore operation as shown in FIG. 40. FIG. 42 illustrates the state of the system prior to the restore and FIG. 43 illustrates the state of the system following the restore. As will be noted, volume E and F no longer contain "new folder" that was created after the 12:11 PM snapshot; however, it should be noted that this folder does appear within the folder for the 12:18 PM snapshots of volumes E and F. This folder, and any data contained therein, can be read and copied there from into the current state of the system (i.e., the 12:11 PM state) even though the folder and data therein was not created until some time after 12:11 PM. Additionally, in accordance with a further feature of the invention, the user also could "restore" the system to the state that it was in when the 12:18 PM snapshot was taken, even though currently in the earlier, 12:11 PM state.

To insure against inadvertent reversions, an initiation sequence preferably is utilized in accordance with preferred embodiments of the present invention wherein a user's intention to perform the reversion operation on the computer system is confirmed prior to such operation. Preferred initiation sequences are disclosed, for example, in copending Witt International patent application serial No. PCT/US02/40106 filed Dec. 16, 2002, and Witt U.S. patent application Ser. No. 10/248,425 filed Jan. 18, 2003; Ser. No. 10/248,424 filed Jan. 19, 2003; Ser. No. 10/248,425 filed Jan. 19, 2003; Ser. No. 10/248,426 filed Jan. 19, 2003; Ser. No. 10/248,427 filed Jan. 19, 2003; Ser. No. 10/248,428 filed Jan. 19, 2003; Ser. No. 10/248,429 filed Jan. 19, 2003; and Ser. No. 10/248,430 filed Jan. 19, 2003, each of which is incorporated herein by reference.

Utilization of Snapshots in New and Useful Ways In view of the systems and methods of managing snapshots as now described in detail herein, and as exemplified by the source code of the U.S. provisional patent application and Appendix A that is incorporated by reference herein, revolutionary benefits and advantages now can be had by utilizing snapshots in many various contexts that, heretofore, simply would not have been practical if not, in fact, impossible. Several such utilizations of snapshots that are enabled by the systems and methods of managing snapshots disclosed herein, including by the incorporated code, are considered to be part of the present invention, and now are described below.

HDD Data History, Virus Protection, and Disaster Recovery

A conventional hard disk drive (HDD) controller, which may be located on a controller board within a computer or within the physical HDD hardware unit itself (hereinafter "HDD Unit"), includes the capability to execute software. Indeed, controller boards and HDD Units now typically when shipped from the manufacturer include their own central processing units (CPU), memory chips, buffers, and the like for executing software for processing reads and write to and from computer readable storage media. Furthermore, the software in these instances is referred to as "firmware" because the software is installed within the memory chips (such as flash RAM memory or ROM) of the controller boards or HDD Units. The firmware executes outside of the environment of the operating system of the computer utilizing the HDD storage and, therefore, is generally protected against alteration by software users of computers accessing the HDD and computer viruses, especially if implemented in ROM. Firmware thus operates "outside of the box" of the operating system. An example of HDD firmware utilized to make complete and incremental backup copies of a logical drive to a secondary logical drive for backup and fail over purposes is disclosed in U.S. patent application Ser. No. US 2002/0133747A1, which is incorporated herein by reference.

Figure 44:
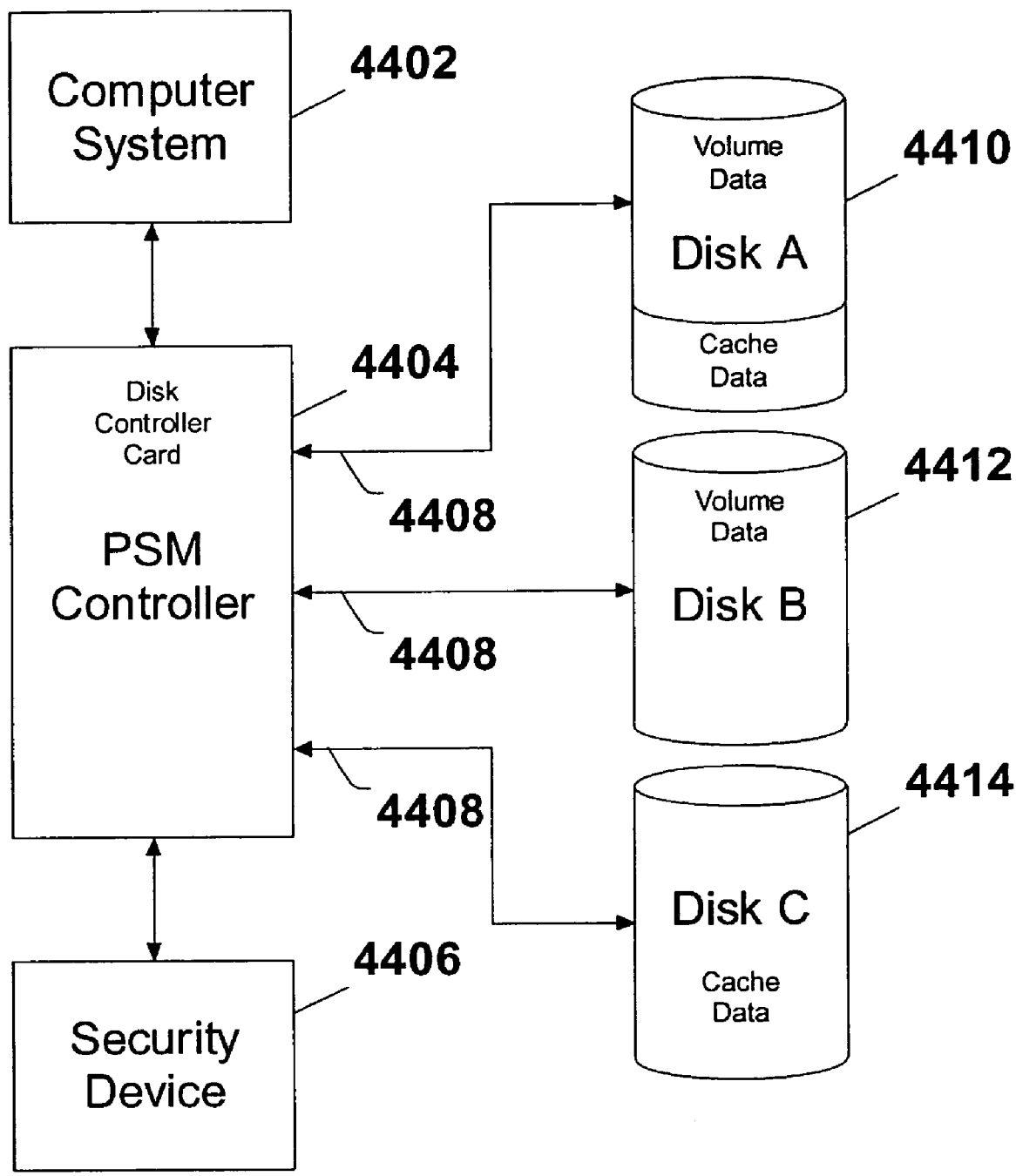
FIG. 44 is a firm ware implementation of a preferred embodiment of the present invention.
Figure 45:
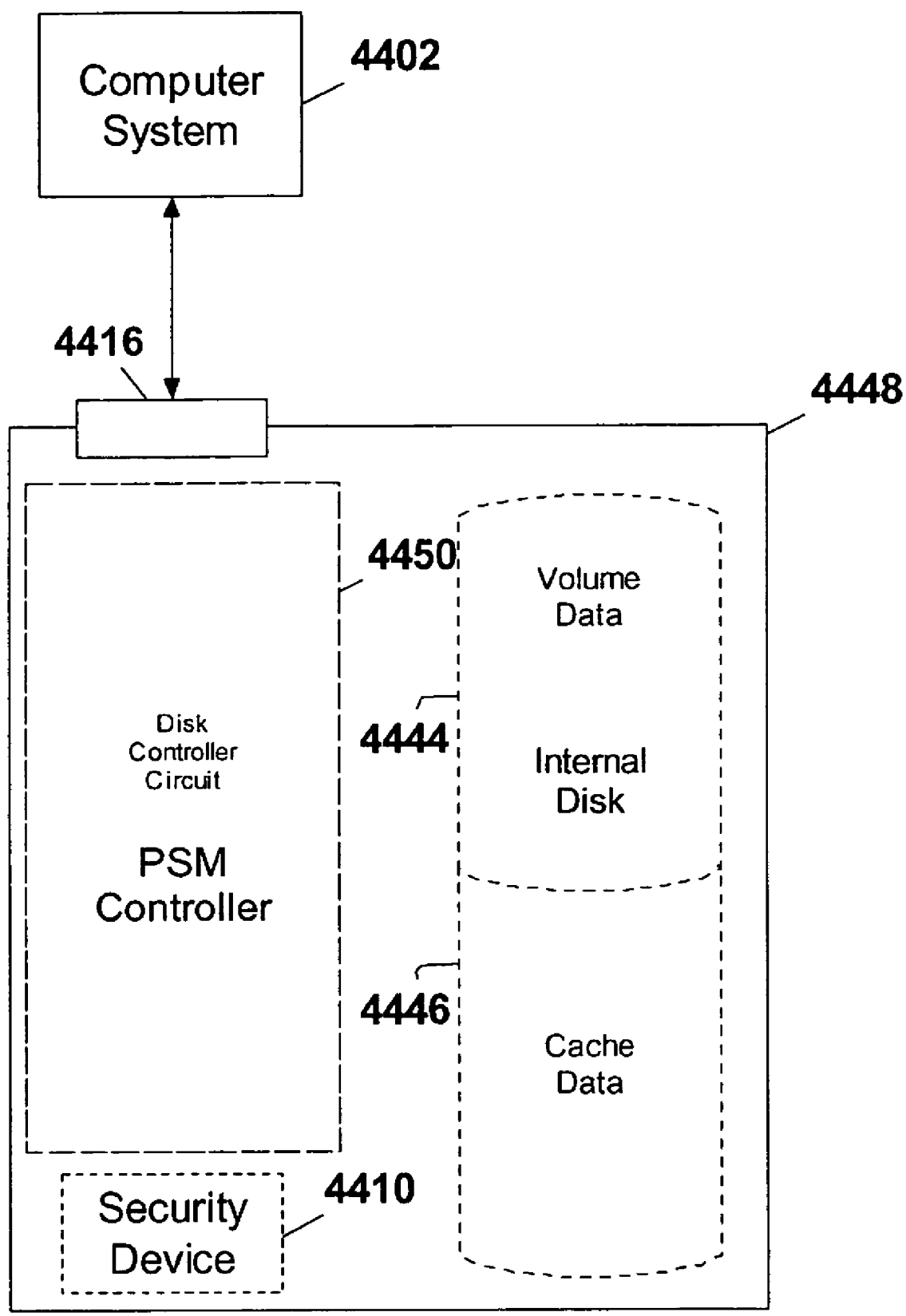
FIG. 45 is another firm ware implementation of a preferred embodiment of the present invention.

In accordance with the present invention, computer executable instructions for taking and maintaining snapshots is provided as part of the HDD firmware, such as in a HDD controller board (see FIG. 44) and in the HDD Unit itself (see FIG. 45). Accordingly, reads and writes to snapshots in accordance with the present invention are implemented by the HDD firmware.

Specifically, in FIG. 44, a HDD controller board or card 4404 having the HDD firmware for taking and maintaining the snapshots of the present invention (referenced by "PSM Controller") is shown as controlling disk I/O 4408 to HDD 4410, HDD 4412, and HDD 4414. HDD 4410 illustrates an example in which the finite data storage for preserving snapshot data coexists with a volume on the same HDD Unit. HDD 4412 and HDD 4414 illustrate the an example in which the finite data storage comprises its own HDD separate and apart from the volume of which snapshots are taken.

FIG. 44 also further illustrates the separation of the HDD firmware and its environment of execution from the computer system 4402.

With reference to FIG. 45, the HDD firmware is contained within the HDD Unit 4448 itself, which has a connector 4416 for communication with the computer system 4402. The HDD firmware is shown as residing in a disk controller circuit 4450 of the HDD Unit 4448. The storage system of the HDD is represented here as logically comprising a first volume 4444, which appears to the operating system of the computer system 4402 and is accessible thereby, and a second volume 4446 no which the snapshot data is preserved. The second volume 4446 does not appear to the operating system for its direct use.

Figure 46:
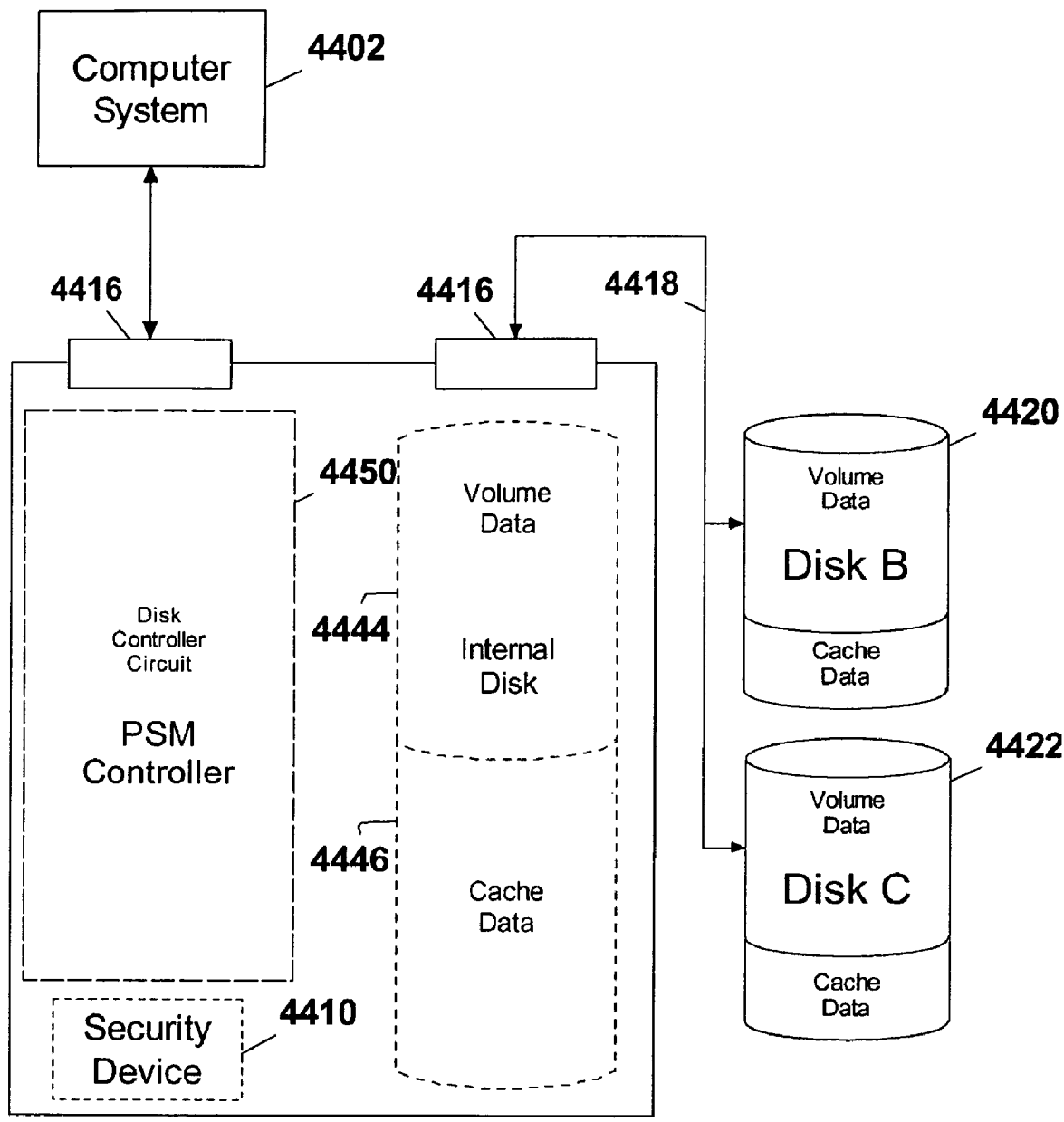
FIG. 46 is yet another firm ware implementation of a preferred embodiment of the present invention.

Optionally, the HDD Unit 4448 includes a second connector 4416 as shown in FIG. 46 for attachment of volume 4420 and volume 4422. As illustrated, the firmware of the HDD Unit 4448 also takes and maintains snapshots of each of these additional volumes, the cache data of each preferably being stored on the respective HDD.

It should be noted that a security device 4406 is provided in association with the HDD controller card 4404 in FIG. 44 and with the HDD controller circuit 4450 in FIGS. 45 and 46. The security device represents a switch, jumper, or the like that is physically toggled by a person. Preferably, the security device includes a key lock for which only an authorized computer user or administrator has a key for toggling the switch between at least two states (e.g., secure and insecure). In either case, when in a first state, the HDD controller receives and executes commands from the computer system which otherwise could destroy the data on the volume prior to its preservation in the finite data storage. Such commands include, for example, as a low level disk format, repartitioning, or SCSI manufacturer commands. Snapshot specific commands also could be provided for when in this state, whereby an authorized user or administrator could create snapshot schedules, delete certain snapshots if desired, and otherwise perform maintenance on and update as necessary the HDD firmware. When in a second state, however, the HDD controller would be "cutoff" from executing any such commands, thereby insuring beyond doubt the integrity of the snapshots and the snapshot system and method.

In a preferred embodiment, approximately 20% of the HDD capacity is allocated for the finite data storage for preserving snapshot data by the firmware. Accordingly, the data storage for preserving the snapshot data of a 200 gigabyte HDD, which costs only about US$300 today, would include a capacity of approximately 40 gigabytes, leaving 160 gigabytes available to the computer system for storage. Indeed, preferably only 160 gigabytes is presented to the operating system and made accessible. The other 40 gigabytes of data storage allocated for preserving the snapshot data preferably is not presented to the computer operating system.

It is believed that an average use of a computer, such as a desktop for home or business use, results in approximately a quarter megabyte of net changes per day for the entire 160 gigabyte HDD (i.e., there is a quarter megabyte difference on average when the HDD is viewed at day intervals). Preferably, the HDD firmware takes a new snapshot every day at some predetermined time or at some predetermined event. Under this scenario, snapshots can be taken and maintained for each for approximately one hundred and sixty thousand days, or 438 years (assuming the computer continues to be used during this time period). Essentially, a complete history of the state of the computer system as represented by the HDD each day automatically can be retained as a built in function of the HDD! If the snapshots maintained by the firmware are read only, rather than read write, and if the security device in accordance with preferred embodiments as shown, for example, in FIGS. 44, 44, and 44 is utilized, then the snapshots become a complete data history unchangeable after the fact by the user, a computer virus, etc. The integrity and security of the snapshots is insured. Indeed, it is believed that, because of the isolated execution of the firmware within the HDD Unit and protection by the security device from HDD commands that otherwise would destroy in wholesale fashion the volume data, the only way to damage or destroy the snapshots is to physically damage the HDD Unit itself. The high security of the HDD data history, in turn, gives rise to numerous advantages.

First, for instance, as a result of the HDD data history, disaster recovery can be performed by recovering data, files, etc., from any previous day in the life of the HDD Unit. Any daily snapshot throughout the life of the HDD Unit is available as it existed at the snapshot moment on that day. Indeed, the deletion of a file or infection thereof by a computer virus, for example, will not affect that file in any previously taken snapshot; accordingly, that file can be retrieved from a snapshot as it exited on the day prior to its deletion or infection.

Furthermore, the files of the snapshots of the HDD data history themselves can be scanned (remember that each snapshot is represented by a logical container on the base volume presented to the operating system of the computer) to determine when the virus was introduced into the computer system. This is especially helpful when virus definitions are later updated and/or when an antivirus computer program is later installed following infection of the computer system. The antivirus program thus is able to detect a computer virus in the HDD data history so that the computer system can be restored to the immediately previous day. Files and data not infected can also then be retrieved from the snapshots that were taken during the computer infection once the system has been restored to an uninfected state (remember that a reversion to a previous state does not delete, release, or otherwise remove snapshots taken in the intervening days that had followed the day of the state to which the computer is restored).

This extreme HDD data history also provides enormous dividends for forensic investigations, especially by law enforcement or by corporations charged with the responsibility of how their employees conduct themselves electronically. Once a daily snapshot is taken by the HDD firmware, it is as good as "locked" in a data vault and, in preferred embodiments, is unchangeable by any system user or software. The data representing the state of the HDD for each previous day is revealed, including email and accounting information. Furthermore, unless a user is expressly made aware of the snapshot functionality of the HDD firmware, or unless a user explores the "snapshot" folder preferably maintained on the root directory of the volume, the snapshots will be taken and maintained seamlessly without the knowledge of the user. Only the computer administrator need know of the snapshots that occur and, preferably with physical possession of the key to the security device, the administrator will know that the snapshots are true and secure.

The same benefits are realized if the HDD Unit is used in a file server, or if the HDD Unit is used as part of network attached storage. For example, forty average users of a 200 gigabyte HDD would each have access to HDD data history representing the state of their data as it existed for each day over a ten year period. In order to protect against physical damage to the HDD Unit, data of the HDD Unit can be periodically backed up in accordance with conventional techniques, including the making of a backup copy of one of the snapshots itself while continued, ongoing access to the HDD is permitted.

In continuing with the HDD data history example, the snapshots can be layered by taking a snapshot of a snapshot at a different, periodic interval. Accordingly, at the end of each week, a snapshot can be taken of the then current snapshot of that day of the week to comprise the "weekly" snapshot "series" or "collection." A weekly snapshots series and a monthly snapshot series then can be maintained by the HDD firmware. Presentation of these series to a user would include within a "snapshot" folder on the root directory two subfolders titled, for example, "weekly snapshots" and "daily snapshots." Within the "weekly snapshots" would appear a list of folders titled with the date of the day comprising the end of the week for each previous week, and within each such folder would appear the directory structure of the base volume in the state as it existed on that day. Within the "daily snapshots" would appear a list of folders titled with the date of each day for the previous days, and within each such folder would appear the directory structure of the base volume in the state as it existed on that day. This layering of the snapshots could further include a series of "monthly snapshots," a series of "quarterly snapshots," a series of "yearly snapshots," and so on and so forth. It should be noted that little additional data storage space would be consumed by taking and maintaining these different series of snapshots.

If desired, the data storage for preserving the snapshots could be managed so as to protect against the unlikely event that the data storage would be consumed to such an extent that the snapshot system would fail. Preferred methods for managing the finite data storage are disclosed, for example, in copending Green U.S. patent application Ser. Nos. 10/248,460; 10/248,461; and 10/248,462, all filed on Jan. 21, 2003, and each of which is incorporated herein by reference.

Accordingly, but for protection against physical damage to the HDD Unit itself, such as damage by fire or a baseball bat, all of the benefits of conventional snapshots and backups are realized without the time and storage capacity constraints by the seamless integration into the HDD firmware of the systems and methods present invention. Indeed, the taking and maintaining of the snapshots is unnoticeable to the casual eye.

Temporal Database Management and Analysis, National Security/Homeland Defense, and Artificial Intelligence Much academic and industry discussion has been focused in recent years on how to incorporate time as a factor in database management. See, for example, "Implementation Aspects of Temporal Databases," Kristian Torp, http://www.cs.auc.dk/ndb/phd_projects/torp.html (copyrighted 1998, 2000); "Managing Time in the Data Warehouse," Dr. Barry Devlin, InfoDB, Volume 11, Number 1 (June 1997); and "It's About Time! Supporting Temporal Data in a Warehouse," John Bair, InfoDB, Volume 10, Number 1 (February 1996), each of which is incorporated herein by reference.

As recognized by Kristian Torp, for example, multiple versions of data are useful in many application areas such as accounting, budgeting, decision support, financial services, inventory management, medical records, and project scheduling, to name but a few. Temporal relational database management systems (DBMSs) are currently being designed and implemented that add built in support for storing and querying multiple versions of data and represent improvements to conventional relational DBMSs that only provide built in support for one (the current) version of data. Kristian Torp proposes in his thesis techniques for timestamping versions of data in the presence of transactions.

Furthermore, a debate has arisen between whether time should be taken into account by database management programs themselves (the "incorporated" model), or whether time should be taken into account by applications that access the data from database management programs (the "layered" model).

The snapshot method and system of the present invention introduces yet a third, heretofore unknown and otherwise impractical, if not impossible, means for accounting for time as a factor in database management. Indeed, the method of taking and maintaining multiple snapshots inherently takes time into account, as time inherently is a critical factor in managing snapshot data. Thus, by taking and maintaining snapshots of data, each snapshots represents an instance of that data (it's state at that snapshot time) and the series of snapshots represent the evolution of that data. Moreover, the higher the frequency of snapshots, the greater the resolution and less the granularity of the evolution of the data as a function of time. Accordingly by utilizing snapshot technology preferably as provided by the systems and methods of the present invention, non temporal relational database management systems can be snapshot on an ongoing basis, with the combination of all the snapshots data thereof thereby comprising a temporal data store.

Furthermore, within the context of referring to a temporal database, the present invention is considered to provide a temporal data store comprising a plurality of temporal data groups. In this regard, each temporal data group is unique to a point in time and includes one or more snapshots taken at that particular point in time, with the object of each snapshot comprising (1) a logical container, such as a file, a group of files, a volume, or portion of any thereof; or (2) a computer readable storage medium, or any portion thereof. Thus, except in the case where a data group is writable, all data in a dataset necessarily shares in common the characteristic that the data is as it existed at the dataset time point. For example, a snapshot of a first volume at a first time point and a snapshot of a second volume at that same time point, together, may comprise a temporal data group. In juxtaposition, snapshots forming part of a collection or series each is taken at a different time point and, therefore, will not coexist within the same data group as another snapshot of the series, although each snapshot of the series will have in common the same object.

As with multiple versions of data in conventional DBMSs, the temporal data store provided by the present invention efficiently provides multiple versions of data in the form of snapshot series or collections for analysis in many application areas such as accounting, budgeting, decision support, financial services, inventory management, medical records, and project scheduling. Furthermore, neither an incorporated architecture nor a layered architecture is necessary if the snapshot technology is utilized for managing and analyzing the temporal data. A series of snapshots continuously taken of the data suffices, and neither database management programs nor specific applications interfacing with such database management programs need to specifically be rewritten or modified to now account for time as a dimension. Running of the applications in the "current" time while reading the temporal data from the various instances of the data contained within the snapshot folders of the base volume in accordance with the present invention readily provides the solution now sought by so many others for accounting for time as a factor in database management.

Above and beyond providing advantages of conventional DBMSs, the temporal data store of the present invention further provides the ability to conduct multiple "what if" scenarios starting at any snapshot of a data group within a snapshot series. Specifically, because of the additional cache provided in conjunction for each snapshot for writes to the snapshot above and beyond the cache provided for preservation of the snapshot data from the volume, the present invention includes the ability to return to the "pristine" snapshot (original snapshot without write thereto) by simply clearing the write cache. Multiple scenarios thus may be run for each snapshot starting at the same snapshot time (i.e., "temporal juncture" of the various scenarios), and an analysis can be conducted of the results of each scenario and compared to the others in contrasting and drawing intelligence from the different results. In running the different scenarios, a different rule sets can be applied to each snapshot for each scenario and within the context of each snapshot folder without altering the current state of the system and without permanently destroying the original snapshot. Moreover, because all snapshots are presented in the current state of the system, "what if" scenarios can be conducted on various, different snapshots in parallel. This ability to utilize snapshot technology to a run "what if" scenario on a snapshot, as well as to return to the pristine snapshot and rerun a different "what if" scenario using a different rule set, all while doing in parallel a similar analysis on other snapshots, provides a heretofore unknown and incredibly powerful analytical tool for data mining and data exploration. Moreover, by considering consecutive snapshots in a series in this analysis, data evolution can also be analyzed from each temporal juncture of the series.

The implications for utilization of the snapshot technology of the present invention in intelligence gathering, especially for counter terrorism and national security interest, are staggering. Currently, the storage capacity required for the ability to run the magnitude of equivalent scenarios provided by the present invention is impractical if not impossible, even for the National Security Administration (or the recently created Department of Homeland Defense). For example, multiple rule sets for data mining and exploration in intelligence gathering can now be applied to snapshots of the data captured by the governmental intelligence agencies and different scenarios for each temporal juncture in snapshot series run in parallel. As a result of the present invention, for each temporal juncture of each snapshot identified for investigation, a system no longer need be restored to its previous state at a temporal juncture, the scenario executed, the system restored again to the same temporal juncture, and the next scenario executed, and so on and so forth. Consequently, the implications are staggering. Snapshots existing on every day between Jan. 1, 2001, and Sep. 11, 2001, of email traffic passing through a particular node of the Internet backbone can be conveniently analyzed under different rules sets and investigative algorithms to determine which would be more effective and what information could have/was known or available within the data archives that might have forewarned authorities to the tragic events that happened on Sep. 11, 2001.

It will also be apparent to those of ordinary skill in the art that the ability to "backtrack" to a previous temporal juncture and execute a different rule set also provides enormous advantages and additional functionality to artificial intelligence.

In summary, revolutionary advancements in data analysis and intelligence can now be had in areas such as medical information analysis (especially patient information analysis); financial analysis, including financials market analysis; communications analysis (such as email correspondence), especially for intelligence pertaining to terrorism and other national security/homeland defense interests; and Internet Archiving and analysis. In each of these examples, the relevant data in the state as it existed for points in time can be readily analyzed online by appropriate algorithms, routines, and programs, especially those utilizing artificial intelligence and backtracking techniques.

Backups

While it will now be readily evident that the methods and systems for taking and maintaining snapshots of the present invention far exceeds the mere use of a snapshot for creation of a backup copy onto some backup medium, such use of a snapshot nevertheless remains valid. Thus, in accordance with a feature of the present invention, a snapshot of a volume is represented as a logical drive when a backup of that volume is to be made. Thus, the backup program obtains the data of the snapshot by reading from the logical drive and writing the data read there from onto the backup medium, such as tape. Alternatively, the backup method and system of U.S. patent application Ser. No. 2002/0133747A1 is utilized in creating a backup. Moreover, a preferred embodiment of the present invention includes the combination of the backup method and system of U.S. patent application Ser. No. 2002/0133747A1 with the inventive snapshot method and system as generally represented by the code of the incorporated provisional patent application and described in detail above. Indeed, the backup may be made by reading not from the base volume itself, but from the most recent snapshot, thereby allowing continuous reads and writes to the base volume during the backup process.

In view of the foregoing detailed description of preferred embodiments of the present invention, it readily will be understood by those persons skilled in the art that the present invention is susceptible of broad utility and application. While various aspects have been described in the context of HTML and web page uses, the aspects may be useful in other contexts as well. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto, or presented in any continuing application, and the equivalents thereof.

Thus, for example, it is contemplated within the scope of the present invention that the finite data storage for preserving snapshot data, while having a fixed allocation in preferred embodiments of the present invention, nevertheless may have a dynamic capacity that "grows" as needed as disclosed, for example, in U.S. Pat. No. 6,473,775, issued Oct. 29, 2002, which is incorporated herein by reference.

The invention claimed is:

1. A computer-readable medium having computer-executable instructions, comprising:
    a snapshot manager to manage snapshot operations that include:
    creating a snapshot of designated data of a first storage, wherein units of the designated data modified since the snapshot are preserved prior to modification by being stored in a second storage;
    subsequently deleting the snapshot;
    at predefined events, scanning units of preserved data in the second storage to identify those units associated with the deleted snapshot while not associated with another undeleted snapshot; and
    freeing areas in the second storage occupied by the identified units.

2. The computer-readable medium as in claim 1, wherein a unit of preserved data in the second storage is associated with more than one snapshot.

3. The computer-readable medium as in claim 1, wherein the predefined events include after a snapshot is created.

4. The computer-readable medium as in claim 1, wherein the predefined events include after a snapshot is deleted.

5. The computer-readable medium as in claim 1, wherein the predefined events include after a computer system executing the instructions has been restarted.

6. The computer-readable medium as in claim 1, wherein the first and second storages are allocated from a storage of finite capacity.

7. A method of managing snapshots for designated data in a first storage of a computer system, comprising:
    creating a snapshot of the designated data in the first storage, wherein units of the designated data modified since the snapshot are preserved prior to modification by being stored in a second storage of the computer system;
    subsequently deleting the snapshot;
    at predefined events, scanning units of preserved data in the second storage to identify those units associated with the deleted snapshot while not associated with another undeleted snapshot; and
    freeing areas in the second storage occupied by the identified units.

8. The computer system as in claim 7, wherein a unit of preserved data in the second storage is associated with more than one snapshot.

9. The computer system as in claim 7, wherein the predefined events include after a snapshot is created.

10. The computer system as in claim 7, wherein the predefined events include after a snapshot is deleted.

11. The computer system as in claim 7, wherein the predefined events include after the computer system has been restarted.

12. The computer system as in claim 7, wherein the first and second storages are allocated from a storage of finite capacity of the computer system.

* * * * *